(12) United States Patent
Sahita et al.

(10) Patent No.: US 11,556,341 B2
(45) Date of Patent: *Jan. 17, 2023

(54) APPARATUSES, METHODS, AND SYSTEMS FOR INSTRUCTIONS TO COMPARTMENTALIZE CODE

(71) Applicant: Intel Corporation, Santa Clara, CA (US)

(72) Inventors: Ravi Sahita, Portland, OR (US); Deepak Gupta, Portland, OR (US); Vedvyas Shanbhogue, Austin, TX (US); David Hansen, Portland, OR (US); Jason W. Brandt, Austin, TX (US); Joseph Nuzman, Haifa (IL); Mingwei Zhang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/341,068

(22) Filed: Jun. 7, 2021

(65) Prior Publication Data

US 2022/0012059 A1 Jan. 13, 2022

Related U.S. Application Data

(63) Continuation of application No. 16/833,478, filed on Mar. 27, 2020, now Pat. No. 11,029,957.

(51) Int. Cl.
*G06F 9/30* (2018.01)
*G06F 9/38* (2018.01)
*G06F 12/14* (2006.01)

(52) U.S. Cl.
CPC ........ *G06F 9/30145* (2013.01); *G06F 9/3842* (2013.01); *G06F 12/1441* (2013.01); *G06F 2212/1052* (2013.01)

(58) Field of Classification Search
None
See application file for complete search history.

(56) References Cited

U.S. PATENT DOCUMENTS

| 5,721,855 A | 2/1998 | Hinton et al. |
| 6,158,676 A | 12/2000 | Hughes |

(Continued)

FOREIGN PATENT DOCUMENTS

| GB | 2574270 A | 12/2019 |
| WO | 2019/212579 A1 | 11/2019 |

OTHER PUBLICATIONS

Final Office Action, U.S. Appl. No. 16/177,028, dated Feb. 22, 2022, 10 pages.

(Continued)

*Primary Examiner* — Steven G Snyder
(74) *Attorney, Agent, or Firm* — Nicholson De Vos Webster & Elliott LLP

(57) ABSTRACT

Systems, methods, and apparatuses relating to instructions to compartmentalize memory accesses and execution (e.g., non-speculative and speculative) are described. In one embodiment, a compartment manager circuit is to determine, when a compartment control register of a hardware processor core is set to an enable value, that a first subset of code requested for execution on the hardware processor core in user privilege is within a first compartment of memory, load a first compartment descriptor for the first compartment into one or more registers of the hardware processor core from the memory, check if the first compartment is marked in the first compartment descriptor, within the one or more registers of the hardware processor core, as a management compartment, and, when the first compartment is marked in the first compartment descriptor as the management compartment, allowing the first subset of the code within the first compartment to load a second compartment descriptor for a (Continued)

second compartment of the memory into the one or more registers of the hardware processor core from the memory, switching execution from the first subset of code within the first compartment to a second subset of code in user privilege within the second compartment, allowing speculative memory accesses for the second subset of code only within the second compartment, and preventing a memory access outside of the second compartment for the second subset of code as indicated by the second compartment descriptor stored within the one or more registers of the hardware processor core.

24 Claims, 32 Drawing Sheets

(56) References Cited

U.S. PATENT DOCUMENTS

| | | | |
|---|---|---|---|
| 6,185,676 | B1 | 2/2001 | Poplingher et al. |
| 7,272,831 | B2 | 9/2007 | Cota-Robles et al. |
| 7,769,964 | B2 | 8/2010 | Newburn et al. |
| 10,394,716 | B1 | 8/2019 | Piry et al. |
| 10,642,744 | B2 | 5/2020 | Boggs et al. |
| 10,909,046 | B2* | 2/2021 | Murphy ............ G06F 12/0842 |
| 11,010,067 | B2* | 5/2021 | Durham ............ G06F 12/1425 |
| 11,403,394 | B2* | 8/2022 | O'Farrell ............ G06F 9/3842 |
| 2003/0009692 | A1 | 1/2003 | Smith et al. |
| 2003/0033510 | A1 | 2/2003 | Dice |
| 2006/0143485 | A1 | 6/2006 | Naveh et al. |
| 2008/0046668 | A1 | 2/2008 | Newburn et al. |
| 2008/0052499 | A1 | 2/2008 | Koc |
| 2008/0109625 | A1 | 5/2008 | Erlingsson et al. |
| 2008/0155679 | A1 | 6/2008 | Sebot et al. |
| 2009/0089564 | A1 | 4/2009 | Brickell et al. |
| 2014/0189302 | A1 | 7/2014 | Subbareddy et al. |
| 2015/0178513 | A1 | 6/2015 | Conti et al. |
| 2016/0170769 | A1 | 6/2016 | Lemay |
| 2016/0285896 | A1 | 9/2016 | Caprioli |
| 2019/0004961 | A1 | 1/2019 | Boggs et al. |
| 2019/0042263 | A1 | 2/2019 | Sukhomlinov et al. |
| 2019/0050230 | A1 | 2/2019 | Branco et al. |
| 2019/0114422 | A1 | 4/2019 | Johnson et al. |
| 2019/0205142 | A1 | 7/2019 | Ghosh |
| 2019/0227804 | A1 | 7/2019 | Mukherjee et al. |
| 2019/0272239 | A1 | 9/2019 | Hagersten et al. |
| 2019/0303161 | A1 | 10/2019 | Nassi et al. |
| 2019/0324756 | A1 | 10/2019 | Chappell et al. |
| 2019/0339977 | A1 | 11/2019 | Wallach |
| 2019/0347102 | A1 | 11/2019 | Okazaki |
| 2019/0354368 | A1 | 11/2019 | Okazaki |
| 2019/0377677 | A1 | 12/2019 | Kamikubo et al. |
| 2019/0384726 | A1* | 12/2019 | Murphy ............ G06F 9/45558 |
| 2020/0133679 | A1 | 4/2020 | Brandt et al. |
| 2020/0210070 | A1 | 7/2020 | Durham |
| 2020/0372129 | A1 | 11/2020 | Gupta |
| 2021/0081530 | A1* | 3/2021 | O'Farrell ............ G06F 21/554 |
| 2021/0349634 | A1* | 11/2021 | Durham ............ G06F 3/062 |

OTHER PUBLICATIONS

Intel, "Intel® Architecture Instruction Set Extensions and Future Features Programming Reference", Reference No. 319433-032, Jan. 2018, 137 pages.
AMD, "Software Techniques for Managing Speculation on AMD Processors," White Paper, Revision Jan. 24, 2018, Retrieved from: https://developer.amd.com/wp-content/resources/Managing-Speculation-on-AMD-Processors.pdf, Jan. 24, 2018, 8 pages.
AMD, "Software Techniques for Managing Speculation on AMD Processors," White Paper, Revision Jul. 10, 2018, Retrieved from: https://developer.amd.com/wp-content/resources/90343-B_SoftwareTechniquesforManagingSpeculalion_WP_7-18Update_FNL.pdf, Jul. 10, 2018, 8 pages.
Anonymous, "Disabling Indirect Branch Prediction (and thus speculation after indirect branch . . . Hacker News", Jan. 4, 2018, Available Online at <https://news.ycombinator.com/item?id=16069950>, Retrieved on Mar. 19, 2020, 1 page.
Arm, "Arm V8.5-A CPU Updates," Version 1.1, Oct. 23, 2018, pp. 1-12.
Arm, "Whitepaper—Cache Speculation Side-channels," Version 2.4, Oct. 12, 2018, pp. 1-21.
Arm, "Whitepaper—Addressing Spectre Variant 1 (CVE-2017-5753) in Software," Version 1.0, Oct. 12, 2018, pp. 1-14.
European Search Report and Search Opinion, EP App. No. 19183503.2, dated Apr. 3, 2020, 9 pages.
European Search Report and Search Opinion, EP App. No. 20208101.4, dated May 17, 2021, 08 pages.
Final Office Action, U.S. Appl. No. 16/177,028, dated Feb. 23, 2021, 52 pages.
Intel, "Control-Flow Enforcement Technology Preview," Revision 2.0, Document No. 334525-002, Jun. 2017, 145 pages.
Intel, "Deep Dive: Managed Runtime Speculative Execution Side Channel Mitigations", Developer Zone, Available Online at <https://web.archive.org/web/20190514204814/https://software.intel.com/security-software-guidance/insights/deep-dive-managed-runtime-speculative-execution-side-channel-mitigations>, May 2019, 11 pages.
Intel, "Intel (Registered) 64 and IA-32 Architectures Software Developer Manuals," Oct. 12, 2016, Updated—May 18, 2018, 19 pages.
Intel, "Intel (Registered) Architecture Instruction Set Extensions and Future Features Programming Reference," Ref. No. 319433-034, May 2018, 145 pages.
Intel, "Intel Analysis of Speculative Execution Side Channels," White paper, Revision 1.0, Document No. 336983-001, Jan. 2018, 12 pages.
Intel, "Intel(registered) 64 and IA-32 Architectures Software Developer's Manual", Order No. 325462-071US, Available Online at <https://software.intel.com/sites/default/files/managed/39/c5/325462-sdm-vol-1-2abcd-3abcd.pdf>, Oct. 2019, 5038 pages.
Intel, "Intel(registered) Software Guard Extensions (Intel(registered) SGX)", Developer Guide, Available Online at <https://software.intel.com/sites/default/files/managed/33/70/intel-sgx-developer-guide.pdf>, 2020, pp. 1-52.
Intel, "Speculative Execution Side Channel Mitigations," Revision 1.0, Jan. 2018, 15 pages.
Intel, "Speculative Execution Side Channel Mitigations," Revision 2.0, May 2018, 21 pages.
Intel, "Speculative Execution Side Channel Mitigations," Revision 3.0, May 2018, 23 pages.
Non-Final Office Action, U.S. Appl. No. 16/177,028, dated Aug. 5, 2020, 47 pages.
Notice of Allowance, U.S. Appl. No. 16/833,478, dated Mar. 26, 2021, 5 pages.
Notice of Allowance, U.S. Appl. No. 16/833,478, dated Feb. 3, 2021, 9 pages.
Office Action, EP App. No. 19183503.2, dated Dec. 22, 2020, 9 pages.
Paolo Bonzini, "Reading privileged memory with a side-channel | Hacker News", Jan. 4, 2018 (Jan. 4, 2018), Retrieved from the Internet: URL:https://news.ycombinator.com/item?id=16065845 [retrieved on May 13, 2020], 23 pages. (Year: 2018).
S. Lee, M. Shih, P. Gera, T. Kim, H. Kim, and M. Peinado, "Inferring Fine-grained Control Flow Inside SGX Enclaves with Branch Shadowing," in USENIX Security Symposium, 19 pages; Aug. 16-18, 2017 (Year: 2017).
Swiat, "Mitigating speculative execution side channel hardware vulnerabilities", Microsoft Security Response Center, Security Research & Defense, Mar. 15, 2018, pp. 1-14.
Valles et al. "Performance Insights to Intel Hyper-Threading Technology"; 2009; 14 pages; Accessed on Oct. 27, 2015 at: https://software.intel.com/en-us/articles/performance-insights-to-intel-hyper-threading-technology (Year: 2009).
Non-Final Office Action, U.S. Appl. No. 16/177,028, dated Aug. 9, 2021, 44 pages.
Intention to grant, EP App. No. 19183503.2, dated May 17, 2022, 6 pages.

(56) References Cited

OTHER PUBLICATIONS

Intention to grant, EP App. No. 20208101.4, dated Jun. 1, 2022, 7 pages.
Non-Final Office Action, U.S. Appl. No. 16/177,028, dated Aug. 16, 2022, 8 pages.

* cited by examiner

EXAMPLE FORMAT FOR COMPARTMENT DESCRIPTOR 160

| FIELD NAME 302 | FIELD WIDTH 304 | DESCRIPTION 306 |
|---|---|---|
| SBX_RBASE0 | 64 bits | Base address for linear range 0 (slice 0) |
| SBX_RBASE1 | 64 bits | Base address for linear range 1 |
| SBX_RBASE2 | 64 bits | Base address for linear range 2 |
| SBX_RBASE3 | 64 bits | Base address for linear range 3 |
| SBX_RBASE4 | 64 bits | Base address for linear range 4 |
| SBX_RBASE5 | 64 bits | Base address for linear range 5 |
| SBX_RBASE6 | 64 bits | Base address for linear range 6 |
| SBX_RBASE7 | 64 bits | Base address for linear range 7 |
| Reserved MBZ | 64 bytes | Reserved for future expansion to up to 16 ranges |
| SBX_EXIT_RIP | 64 bits | RIP after exiting the compartment |
| SBX_ATTRIBUTES | 64 bits | Flags that control compartment behavior e.g., Bit 0: Management Compartment Other bits may be defined to control other behaviors. For example: 1. if specific instructions are allowed in the compartment, and/or 2. if speculation is restricted in the compartment |

FIG. 3

EXAMPLE FORMAT FOR COMPARTMENT THREAD DESCRIPTOR 162

| FIELD NAME 402 | FIELD WIDTH 404 | DESCRIPTION 406 |
|---|---|---|
| SBX_EXIT_RSP | 64 bits | RSP after exiting the compartment |
| SBX_EXIT_RSSP | 64 bits | RSSP after exiting the compartment |
| SBX_EXIT_REASON | 64 bits | EXIT_REASON_SBX_EXIT, _ILLEGAL_INST, _ACCESS_VIOL, _NO_REASON (software can define meaning of this reason, e.g., where hardware does not use this reason code). All other values are reserved for future use. |
| SBX_EXIT_QUAL | 64 bits | For EXIT_REASON_ILLEGAL_INST, this provides additional information such as instruction length and opcode. For all other exit reasons, this field is zero. |
| SBX_RIP | 64 bits | Tenant RIP |
| SBX_RSP | 64 bits | Tenant RSP (if RSP switch enabled) |
| SBX_RSSP | 64 bits | Tenant RSSP (if RSP switch enabled) |

FIG. 4

AN UNTRUSTED SCRIPTING LANGUAGE
THREAD STAYS INSIDE ISOLATE

WHEN THE SCRIPTING LANGUAGE THRED CALLS
OUT INTO GENERAL PURPOSE LANGUAGE CODE

LINEAR ADDRESS CHECKING MANAGEMENT DATA STRUCTURES (E.G., 2 BITS ARE USED FOR PERMISSION) (E.G., 14 BITS ARE USED SLICE INDEXING)

| SLICE 4 | SLICE 3 | SLICE 2 | SLICE 1 |
|---|---|---|---|
| SLICE 8 | SLICE 7 | SLICE 6 | SLICE 5 |

COMPARTMENT TABLE (GLOBAL) 1902 → COMPART4 1902A | COMPART5 | COMPART6 | COMPART7

PERMISSION TABLE 1904 → COMPART4 1904A

ALLOCATION TABLE 1906

FIG. 19

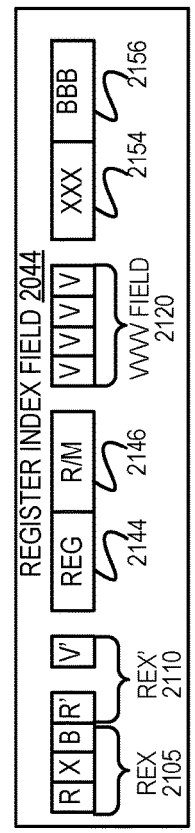
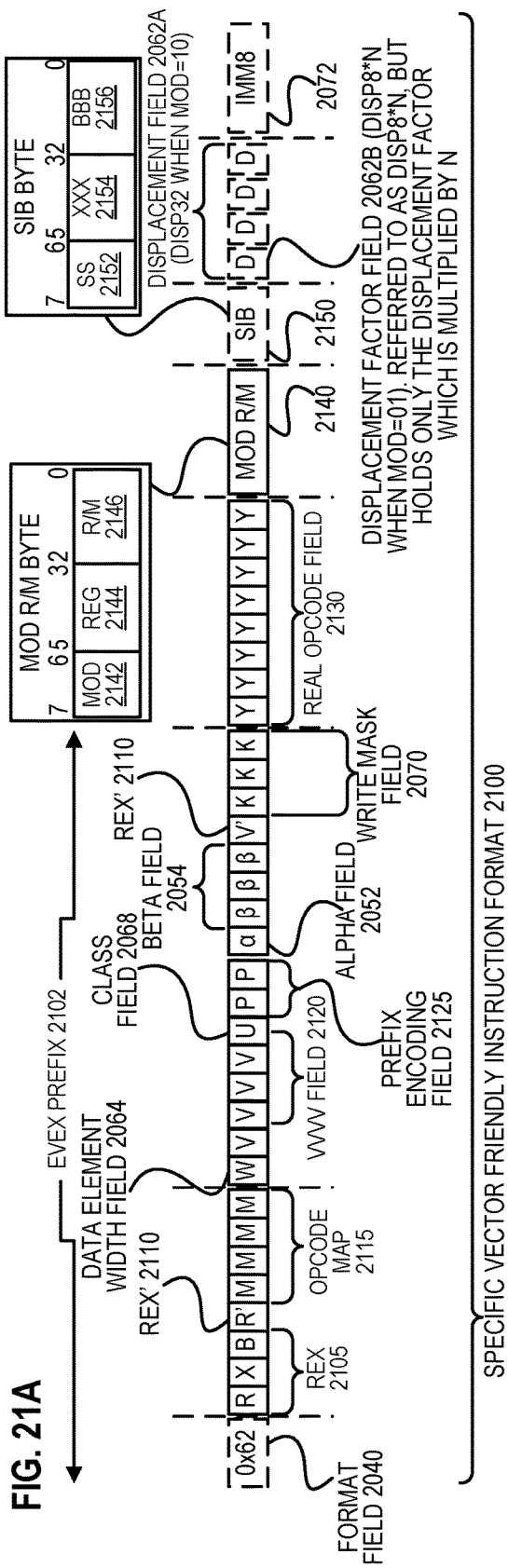
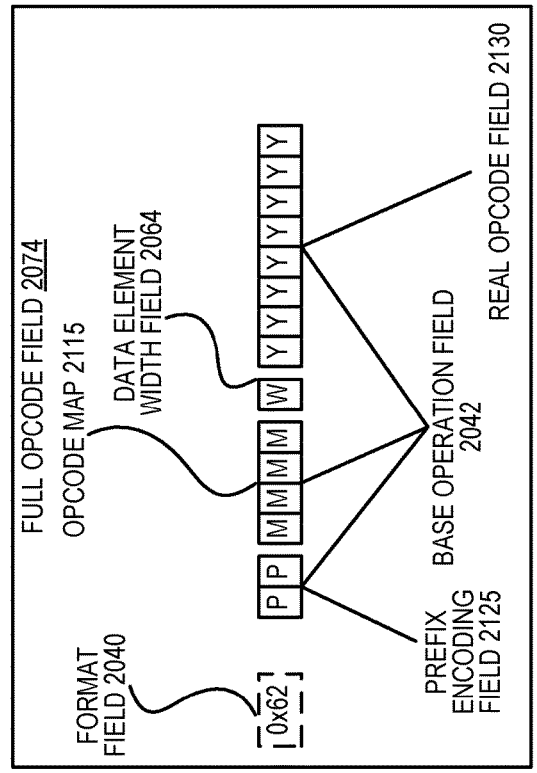
FIG. 21A
FIG. 21B
FIG. 21C

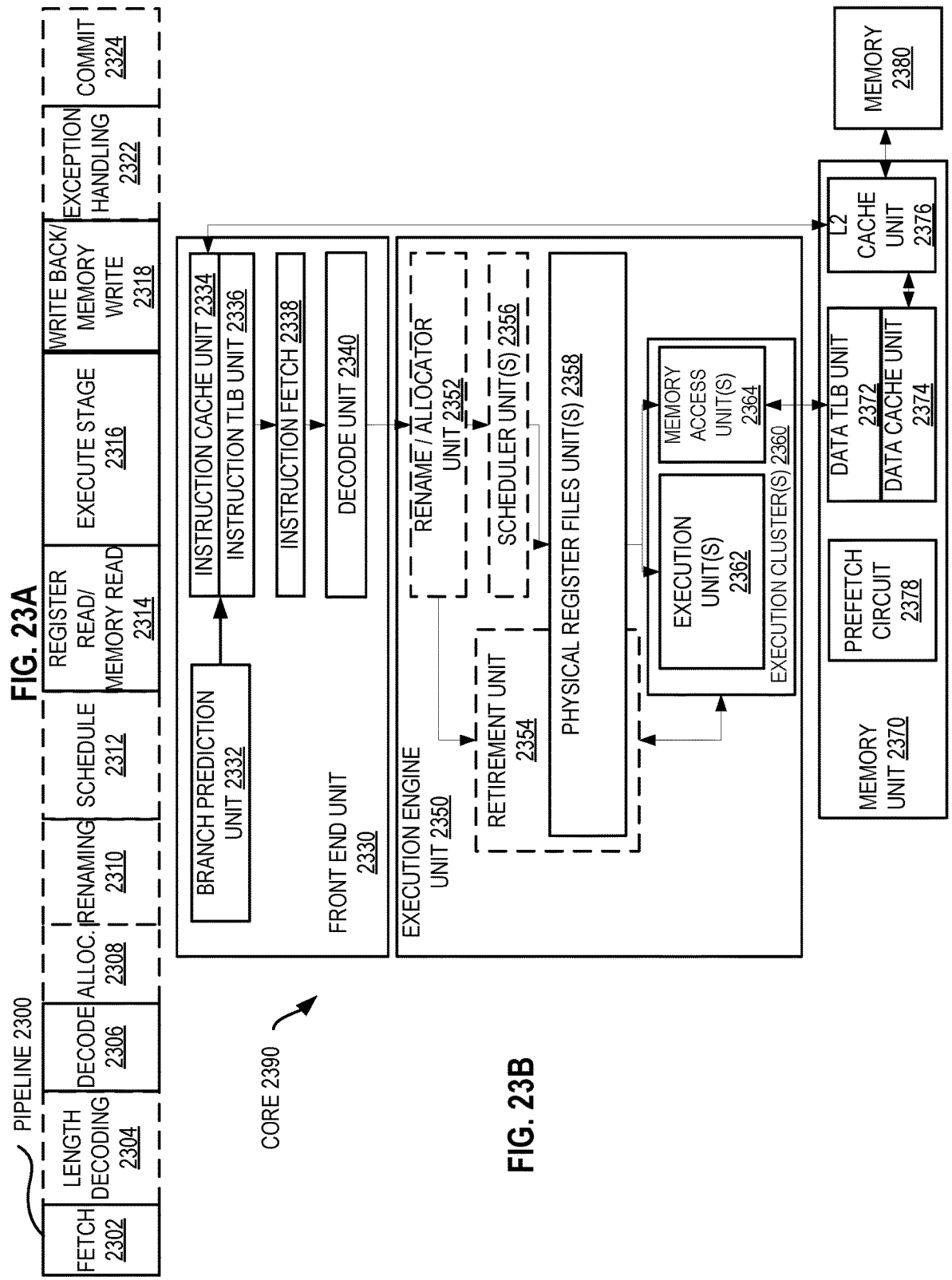

APPARATUSES, METHODS, AND SYSTEMS FOR INSTRUCTIONS TO COMPARTMENTALIZE CODE

CROSS-REFERENCE TO RELATED APPLICATIONS

The present patent application is a continuation application claiming priority from U.S. patent application Ser. No. 16/833,478, filed Mar. 27, 2020, and titled "Apparatuses, Methods, and Systems for Instructions to Compartmentalize Code", which is incorporated herein by reference in its entirety.

TECHNICAL FIELD

The disclosure relates generally to electronics, and, more specifically, an embodiment of the disclosure relates to circuitry to implement instructions to compartmentalize code.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3 illustrates an example format for a compartment descriptor according to embodiments of the disclosure.

FIG. 4 illustrates an example format for a compartment thread descriptor according to embodiments of the disclosure.

FIG. 19 illustrates linear address checking management data structures according to embodiments of the disclosure.

FIG. 21A is a block diagram illustrating fields for the generic vector friendly instruction formats in FIGS. 20A and 20B according to embodiments of the disclosure.

FIG. 21B is a block diagram illustrating the fields of the specific vector friendly instruction format in FIG. 21A that make up a full opcode field according to one embodiment of the disclosure.

FIG. 21C is a block diagram illustrating the fields of the specific vector friendly instruction format in FIG. 21A that make up a register index field according to one embodiment of the disclosure.

FIG. 23A is a block diagram illustrating both an exemplary in-order pipeline and an exemplary register renaming, out-of-order issue/execution pipeline according to embodiments of the disclosure.

FIG. 23B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
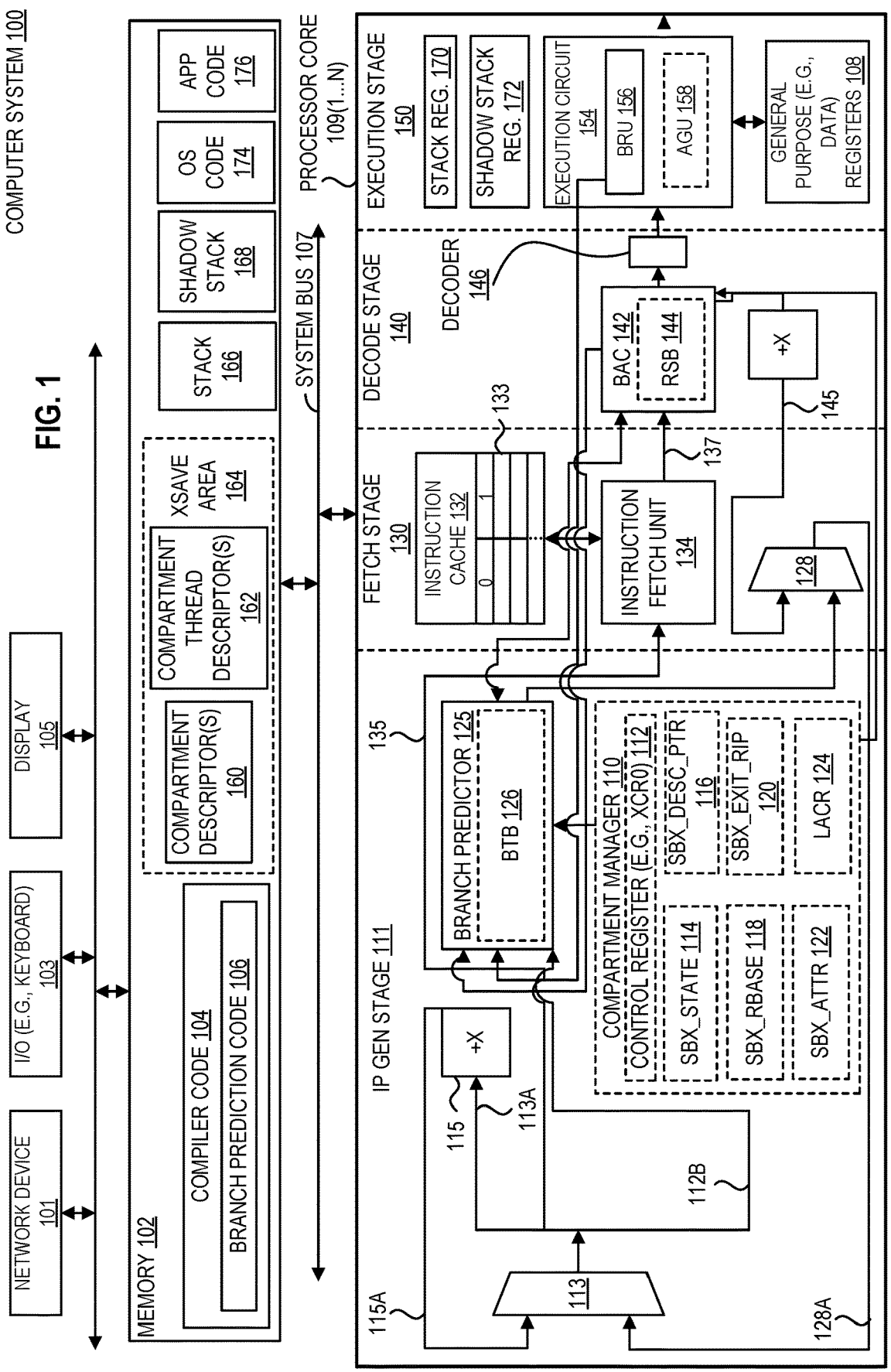
FIG. 1 illustrates a block diagram of a computer system including a hardware processor core that includes a compartment manager according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In certain embodiments, a processor includes hardware and/or instruction(s) to compartmentalize code (e.g., memory accesses, execution, and/or access to architectural and micro-architectural state, etc., for that code). For example, instruction(s) to provide scalable software compartmentalization. Software sandboxing may be used in browsers or other just-in-time workloads such as code written in a general-purpose language (e.g., a class-based, object-oriented language) or code written in a scripting language (e.g., a just-in-time complied language). However, certain embodiments of software sandboxing have limited resiliency against logic flaws and memory corruption attacks which can be used for type-confusion, use-after-free, and/or information disclosure attacks leading to sandbox evasion. Certain speculative cache side-channel attacks may utilize untrusted code execution in a process to leak sensitive data with software-only sandboxing.

Thus, certain embodiments herein are directed to a hardware processor (e.g., architecture and an instruction set architecture (e.g., ISA) for hardware compartmentalization (e.g., hardware sandboxing) to split a process into sub-processes and restrict data accesses for sub-process components within the process. Certain embodiments herein split memory (e.g., a single address space in memory) into multiple compartments managed and/or controlled by the hardware processor (and/or instructions) to prevent any data access outside a compartment unless explicitly shared. Certain embodiments herein allow speculative (e.g., memory) accesses are permitted within a compartment and/or prevent speculative (e.g., memory) accesses across (e.g., between) compartments. Certain embodiments herein utilize compartments that are not merely process isolation, e.g., where the impact of using separate processes to isolate components that normally operate within the same address space are decreased performance (e.g., due to scheduling and an increased number of instructions (assuming the number of instructions per cycle (IPC) is the same) and memory costs (e.g., due to replicated runtime infrastructure).

Certain embodiments herein utilize software components, software flows, and a processor (e.g., and its ISA) to enable: efficient hardware-based isolation between compartments, a (e.g., privileged) management compartment for permission(s) management, an un-compartment for native (e.g., legacy) code compatibility, and/or shared memory between compartments for communications between compartments. Certain embodiments herein thus provide increased performance for light-weight contexts for hardware-isolated compartments (e.g., sandboxes) and/or scalability for a large number of compartments for server usages, such as, but not limited to, a scripting language engine, intermediate binary representations, scripting language isolates, scripting language nodes, etc. Certain embodiments use a compartment dedicated to providing communication services between compartments via shared memory.

In certain embodiments, the software components include a management runtime that manages permissions for other compartments (e.g., non-management compartments), an un-compartment mode of operation of each processor core (e.g., logical processor implemented by the core) that provides a default permission set for native (e.g., existing) code, and a compartment runtime mode of operation of the processor where software provides services to the compartmentalized (e.g., sandboxed) code.

In certain embodiments, the hardware components include a compartment (e.g., sandbox) descriptor that is an in-memory structure interpreted by the processor as a compartment (e.g., sandbox) control structure, a linear prefix that is the linear address range for which compartments are enabled (e.g., where an address generation unit of a processor core enforces compartments to operate within this linear address region), a linear slice of 1 of N regions corresponding to the compartment accessible memory (e.g., where an address generation unit of a processor core enforces permissions based on the region), a linear slice protection key that indicated the permissions for the N slices (e.g., with a register holding the readable, writeable, and/or executable (RWX) permissions for each slice (e.g., 64 B slice, 4 KB slice, 2 MB slice, 1 GB slice, any other multiple of 64 B, or any other slice size) for a compartment, and/or compartmentalization instructions (e.g., SBXxx instructions) for compartmentalization that are used by the operating system (OS) and/or the management compartment. In one embodiment, the memory slices correspond to linear memory that is backed by volatile memory (e.g., DRAM) or to btyeaddressable persistent memory, including configurations such as one-level memory (1LM) and two-level memory (2LM).

In one embodiment, compartmentalization hardware touch points can be broken down to support in following areas: control structures management by OS and new instructions for management runtime, instruction handling in a compartment, and memory access handling in a compartment. Turning now to FIG. 1, an example core architecture is depicted. FIG. 1 illustrates a block diagram of a computer system 100 including a hardware processor core 109 that includes a compartment manager 110 (e.g., compartment manager circuit) according to embodiments of the disclosure. Processor core 109 includes multiple components (e.g., microarchitectural prediction and caching mechanisms) that may be shared by multiple contexts. For example, branch target buffer (BTB) 126, instruction cache 132, and/or return stack buffer (RSB) 144 may be shared by multiple contexts.

Certain embodiments include a compartment manager 110 to utilize the hardware components and/or instruction(s) to compartmentalize code (e.g., memory and cached microarchitectural state for the code), for example, to allow or deny speculative memory accesses. Speculative execution (e.g., and speculative memory accesses) may be used by a processor (e.g., processor core 109) to improve performance. In one embodiment of speculative execution, instructions are executed ahead of knowing that they are required, such that without speculative execution, the processor would need to wait for prior instructions to be resolved before executing subsequent ones. By executing instructions speculatively, performance can be increased by minimizing latency and extracting greater parallelism. The results may be discarded if it is discovered that the instructions were not needed after all. One form of speculative execution involves the control flow of a program, e.g., instead of waiting for all branch instructions to resolve to determine which operations are needed to execute, the processor predicts the control flow (e.g., using branch predictor 125). The predictions may be correct, which allows high performance to be achieved by hiding the latency of the operations that determine the control flow and increasing the parallelism the processor can extract by having a larger pool of instructions to analyze. However, if a prediction is wrong, then the work that was executed speculatively is discarded and the processor will be redirected to execute down the correct instruction path in certain embodiments.

Depicted computer system 100 includes a branch predictor 125 and a branch address calculator 142 (BAC) in a pipelined processor core 109(1)-109(N) according to embodiments of the disclosure. Referring to FIG. 1, a pipelined processor core (e.g., 109(1)) includes an instruction pointer generation (IP Gen) stage 111, a fetch stage 130, a decode stage 140, and an execution stage 150. In one embodiment, processor 100 includes multiple cores 109(1-N), where N is any positive integer. In another embodiment, processor 100 includes a single core. In certain embodiments, each processor core 109(1-N) instance supports multithreading (e.g., executing two or more parallel sets of operations or threads on a first and second logical core), and may do so in a variety of ways including time sliced multithreading, simultaneous multithreading (e.g., where a single physical core provides a logical core for each of the threads that physical core is simultaneously multithreading), or a combination thereof (e.g., time sliced fetching and decoding and simultaneous multithreading thereafter). In the depicted embodiment, each single processor core 109(1) to 109(N) includes an instance of branch predictor 125. Branch predictor 125 may include a branch target buffer (BTB) 126. Branch predictor 125 may be coupled to a branch resolution unit (BRU) 156 (e.g., in execution circuit 154). BRU 156 may insert a special instruction, prior to the indirect branch instructions, to cause a store of the branch targets in the branch registers (e.g., within branch predictor 125). For example, when the compiler code 104 is translating a "high level" indirect branch instruction into machine level instruction, the compiler code 104 will generate a set BR instruction, that is to be executed prior the actual indirect branch instruction, in certain embodiments.

In certain embodiments, branch target buffer 126 stores (e.g., in a branch predictor array) the predicted target instruction corresponding to each of a plurality of branch instructions (e.g., branch instructions of a section of code that has been executed multiple times). In the depicted embodiment, a branch address calculator (BAC) 142 is included which accesses (e.g., includes) a return stack buffer 144 (RSB). In certain embodiments, return stack buffer 144 is to store (e.g., in a stack data structure of last data in is the first data out (LIFO)) the return addresses of any CALL instructions (e.g., that push their return address on the stack).

Branch address calculator (BAC) 142 is used to calculate addresses for certain types of branch instructions and/or to verify branch predictions made by a branch predictor (e.g., BTB). In certain embodiments, the branch address calculator performs branch target and/or next sequential linear address computations. In certain embodiments, the branch address calculator performs static predictions on branches based on the address calculations.

In certain embodiments, the branch address calculator 142 contains a return stack buffer 144 to keep track of the return addresses of the CALL instructions. In one embodiment, the branch address calculator attempts to correct any improper prediction made by the branch predictor 125 to reduce branch misprediction penalties. As one example, the branch address calculator verifies branch prediction for those branches whose target can be determined solely from the branch instruction and instruction pointer.

In certain embodiments, the branch address calculator 142 maintains the return stack buffer 144 utilized as a branch prediction mechanism for determining the target address of return instructions, e.g., where the return stack buffer operates by monitoring all "call subroutine" and "return from subroutine" branch instructions. In one embodiment, when the branch address calculator detects a "call subroutine" branch instruction, the branch address calculator pushes the address of the next instruction onto the return stack buffer, e.g., with a top of stack pointer marking the top of the return stack buffer. By pushing the address immediately following each "call subroutine" instruction onto the return stack buffer, the return stack buffer contains a stack of return addresses in this embodiment. When the branch address calculator later detects a "return from subroutine" branch instruction, the branch address calculator pops the top return address off of the return stack buffer, e.g., to verify the return address predicted by the branch predictor 125. In one embodiment, for a direct branch type, the branch address calculator is to (e.g., always) predict taken for a conditional branch, for example, and if the branch predictor does not predict taken for the direct branch, the branch address calculator overrides the branch predictor's missed prediction or improper prediction.

The core 109 in FIG. 1 includes circuitry to validate branch predictions made by the branch predictor 125. Each branch predictor 125 entry (e.g., in BTB 126) may further includes a valid field and a bundle address (BA) field which are used to increase the accuracy and validate branch predictions performed by the branch predictor 125, as is discussed in more detail below. In one embodiment, the valid field and the BA field each consist of one-bit fields. In other embodiments, however, the size of the valid and BA fields may vary. In one embodiment, a fetched instruction is sent (e.g., by BAC 142 from line 137) to the decoder 146 to be decoded, and the decoded instruction is sent to the execution circuit (e.g., unit) 154 to be executed, for example, with any memory accesses requests to be serviced by address generation unit 158 (e.g., the unit that calculates an address used by the core to access (e.g., main) memory 102). In one embodiment, the (e.g., linear) address checks for a compartment are performed at the address generation unit 158.

Depicted computer system 100 includes a network device 101, input/output (I/O) circuit 103 (e.g., keyboard), display 105, and a system bus (e.g., interconnect) 107.

In one embodiment, the branch instructions stored in the branch predictor 125 are pre-selected by a compiler as branch instructions that will be taken. In certain embodiments, the compiler code 104, as shown stored in the memory 102 of FIG. 1, includes a sequence of code that, when executed, translates source code of a program written in a high-level language into executable machine code. In one embodiment, the compiler code 104 further includes additional branch predictor code 106 that predicts a target instruction for branch instructions (for example, branch instructions that are likely to be taken (e.g., pre-selected branch instructions)). The branch predictor 125 (e.g., BTB 126 thereof) is thereafter updated with target instruction for a branch instruction. In one embodiment, software manages a hardware BTB, e.g., with the software specifying the prediction mode or with the prediction mode defined implicitly by the mode of the instruction that writes the BTB also setting a mode bit in the entry.

Memory 102 may include compartment descriptors 160, compartment thread descriptors 162, an XSAVE area 164 (e.g., the location to store an extended processor state into), stack 166, shadow stack 168, operating system (OS) code 174, application (e.g., program) code 176, or any combination thereof. In certain embodiments, one or more values of compartment descriptors 160 and/or compartment thread descriptors 162 are stored into an XSAVE area 164 (e.g., an area not accessible by user privilege code).

In certain embodiments, processor core 109 includes a stack register 170 and/or a shadow stack register 172.

In certain embodiments, one or more shadow stacks may be included and used to protect an apparatus and/or method from tampering and/or increase security. The shadow stack(s) (e.g., shadow stack 168 in FIG. 1) may represent one or more additional stack type of data structures that are separate from the stack (e.g., stack 166 in FIG. 1). In one embodiment, the shadow stack (or shadow stacks) is used to store control information but not data (e.g., not parameters and other data of the type stored on the stack, e.g., that user-level application programs are to write and/or modify). In one embodiment, the control information stored on the shadow stack (or stacks) is return address related information (e.g., actual return address, information to validate return address, and/or other return address information). In one example, the shadow stack is used to store copies of a return addresses for a thread, e.g., a return address corresponding to a thread whose context or other data has been previously pushed on the (e.g., data) stack. For example, when functions or procedures have been called, a copy of a return address for the caller may have been pushed onto the shadow stack. The return information may be a shadow stack pointer (SSP), e.g., that identifies the most recent element (e.g., top) of the shadow stack. In certain embodiments, the shadow stack may be read and/or written to in user level mode (for example, current privilege level (CPL) equal to three, e.g., a lowest level of privilege) or in a supervisor privilege level mode (for example, a current privilege level (CPL) less than three, e.g., a higher level of privilege than CPL=3). In one embodiment, multiple shadow stacks may be included, but only one shadow stack (e.g., per logical processor) at a time may be allowed to be the current shadow stack. In certain embodiments, there is a (e.g., one) register 170 of the processor to store the (e.g., current) stack pointer. In certain embodiments, there is a (e.g., one) register 172 of the processor to store the (e.g., current) shadow stack pointer.

In embodiments of computing, memory 102 includes a virtual machine monitor code, e.g., to manage one or more virtual machines (VMs), where a VM is an emulation of a computer system. In certain embodiments, VMs are based on a specific computer architecture and provide the functionality of an underlying physical computer system. Their implementations may involve specialized hardware, firmware, software, or a combination. In certain embodiments, Virtual Machine Monitor (VMM) (also known as a hypervisor) is a software program that, when executed (e.g., in supervisor mode but not in user mode), enables the creation, management, and governance of VM instances and manages the operation of a virtualized environment on top of a physical host machine. A VMM is the primary software behind virtualization environments and implementations in certain embodiments. When installed over a host machine (e.g., processor) in certain embodiments, a VMM facilitates the creation of VMs, e.g., each with separate operating systems (OS) and applications. The VMM may manage the backend operation of these VMs by allocating the necessary computing, memory, storage and other input/output (I/O) resources, such as, but not limited to, an input/output memory management unit (IOMMU). The VMM may provide a centralized interface for managing the entire operation, status and availability of VMs that are installed over a single host machine or spread across different and interconnected hosts. In certain embodiments, switching between VMs requires a switch of the processor core to a supervisor mode (e.g., instead of staying in a user mode).

As discussed below, depicted core (e.g., branch predictor 125 thereof) includes access to one or more registers. In certain embodiments, core include one or more general purpose register(s) 108.

In certain embodiments, each entry for the branch predictor 125 (e.g., in BTB 126 thereof) includes a tag field and a target field. In one embodiment, the tag field of each entry in the BTB stores at least a portion of an instruction pointer (e.g., memory address) identifying a branch instruction. In one embodiment, the tag field of each entry in the BTB stores an instruction pointer (e.g., memory address) identifying a branch instruction in code. In one embodiment, the target field stores at least a portion of the instruction pointer for the target of the branch instruction identified in the tag field of the same entry. Moreover, in other embodiment, the entries for the branch predictor 125 (e.g., in BTB 126 thereof) includes one or more other fields. In certain embodiments, an entry does not include a separate field to assist in the prediction of whether the branch instruction is taken, e.g., if a branch instruction is present (e.g., in the BTB), it is considered to be taken.

As shown in FIG. 1, the IP Gen mux 113 of IP generation stage 111 receives an instruction pointer from line 114A. The instruction pointer provided via line 115A is generated by the incrementer circuit 115, which receives a copy of the most recent instruction pointer from the path 113A. The incrementer circuit 115 may increment the present instruction pointer by a predetermined amount, to obtain the next sequential instruction from a program sequence presently being executed by the core.

In one embodiment, upon receipt of the IP from IP Gen mux 113, the branch predictor 125 compares a portion of the IP with the tag field of each entry in the branch predictor 125 (e.g., BTB 126). If no match is found between the IP and the tag fields of the branch predictor 125, the IP Gen mux will proceed to select the next sequential IP as the next instruction to be fetched in this embodiment. Conversely, if a match is detected, the branch predictor 125 reads the valid field of the branch predictor entry which matches with the IP. If the valid field is not set (e.g., has logical value of 0) the branch predictor 125 considers the respective entry to be "invalid" and will disregard the match between the IP and the tag of the respective entry in this embodiment, e.g., and the branch target of the respective entry will not be forwarded to the IP Gen Mux. On the other hand, if the valid field of the matching entry is set (e.g., has a logical value of 1), the branch predictor 125 proceeds to perform a logical comparison between a predetermined portion of the instruction pointer (IP) and the branch address (BA) field of the matching branch predictor entry in this embodiment. If an "allowable condition" is present, the branch target of the matching entry will be forwarded to the IP Gen mux, and otherwise, the branch predictor 125 disregards the match between the IP and the tag of the branch predictor entry. In some embodiment, the entry indicator is formed from not only the current branch IP, but also at least a portion of the global history.

More specifically, in one embodiment, the BA field indicates where the respective branch instruction is stored within a line of cache memory 132. In certain embodiments, a processor is able to initiate the execution of multiple instructions per clock cycle, wherein the instructions are not interdependent and do not use the same execution resources.

For example, each line of the instruction cache 132 shown in FIG. 1 includes multiple instructions (e.g., six instructions). Moreover, in response to a fetch operation by the fetch unit 134, the instruction cache 132 responds (e.g., in the case of a "hit") by providing a full line of cache to the fetch unit 134 in this embodiment. The instructions within a line of cache may be grouped as separate "bundles." For example, as shown in FIG. 1, the first three instructions in a cache line 133 may be addressed as bundle 0, and the second three instructions may be address as bundle 1. Each of the instructions within a bundle are independent of each other (e.g., can be simultaneously issued for execution). The BA field provided in the branch predictor 125 entries is used to identify the bundle address of the branch instruction which corresponds to the respective entry in certain embodiments. For example, in one embodiment, the BA identifies whether the branch instruction is stored in the first or second bundle of a particular cache line.

In one embodiment, the branch predictor 125 performs a logical comparison between the BA field of a matching entry and a predetermined portion of the IP to determine if an "allowable condition" is present. For example, in one embodiment, the fifth bit position of the IP (e.g. IP[4]) is compared with the BA field of a matching (e.g., BTB) entry. In one embodiment, an allowable condition is present when IP [4] is not greater than the BA. Such an allowable condition helps prevent the apparent unnecessary prediction of a branch instruction, which may not be executed. That is, when less than all of the IP is considered when doing a comparison against the tags of the branch predictor 125, it is possible to have a match with a tag, which may not be a true match. Nevertheless, a match between the IP and a tag of the branch predictor indicates a particular line of cache, which includes a branch instruction corresponding to the respective branch predictor entry, may about to be executed. Specifically, if the bundle address of the IP is not greater than the BA field of the matching branch predictor entry, then the branch instruction in the respective cache line is soon to be executed. Hence, a performance benefit can be achieved by proceeding to fetch the target of the branch instruction in certain embodiments.

As discussed above, if an "allowable condition" is present, the branch target of the matching entry will be forwarded to the IP Gen mux in this example. Otherwise, the branch predictor will disregard the match between the IP and the tag. In one embodiment, the branch target forwarded from the branch predictor is initially sent to a Branch Prediction (BP) resteer mux 128, before it is sent to the IP Gen mux. The BP resteer mux 128, as shown in FIG. 1, may also receive instruction pointers from other branch prediction devices. In one embodiment, the input lines received by the BP resteer mux will be prioritized to determine which input line will be allowed to pass through the BP resteer mux onto the IP Gen mux.

In addition to forwarding a branch target to the BP resteer mux, upon detecting a match between the IP and a tag of the branch predictor, the BA of the matching branch predictor entry is forwarded to the Branch Address Calculator (BAC) 142. The BAC 142 is shown in FIG. 1 to be located in the decode stage 140, but may be located in other stage(s). The BAC of may also receive a cache line from the fetch unit 134 via line 137.

The IP selected by the IP Gen mux is also forwarded to the fetch unit 134, via data line 135 in this example. Once the IP is received by the fetch unit 134, the cache line corresponding to the IP is fetched from the instruction cache 132. The cache line received from the instruction cache is forwarded to the BAC, via data line 137.

Upon receipt of the BA in this example, the BAC will read the BA to determine where the pre-selected branch instruction (e.g., identified in the matching branch predictor entry) is located in the next cache line to be received by the BAC (e.g., the first or second bundle of the cache line). In one embodiment, it is predetermined where the branch instruction is located within a bundle of a cache line (e.g., in a bundle of three instructions, the branch instruction will be stored as the second instruction).

In alternative embodiments, the BA includes additional bits to more specifically identify the address of the branch instruction within a cache line. Therefore, the branch instruction would not be limited to a specific instruction position within a bundle.

After the BAC determines the address of the pre-selected branch instruction within the cache line, and has received the respective cache line from the fetch unit 134, the BAC will decode the respective instruction to verify the IP truly corresponds to a branch instruction. If the instruction addressed by BA in the received cache line is a branch instruction, no correction for the branch prediction is necessary. Conversely, if the respective instruction in the cache line is not a branch instruction (i.e., the IP does not correspond to a branch instruction), the BAC will send a message to the branch predictor to invalidate the respective branch predictor entry, to prevent similar mispredictions on the same branch predictor entry. Thereafter, the invalidated branch predictor entry will be overwritten by a new branch predictor entry.

In addition, in one embodiment, the BAC will increment the IP by a predetermined amount and forward the incremented IP to the BP resteer mux 128, via data line 145, e.g., the data line 145 coming from the BAC will take priority over the data line from the branch predictor. As a result, the incremented IP will be forwarded to the IP Gen mux and passed to the fetch unit in order to correct the branch misprediction by fetching the instructions that sequentially follow the IP.

In certain embodiments, the compartment manager 110 manages one of more compartments as discussed herein, e.g., while alleviating information being leaked across compartments by directly or indirectly observing the information stored.

Computing system 100 (e.g., compartment manager 110) may include a control register 112 (e.g., XCR0 register). In one embodiment, one or more bits of the control register 112 store a value, and when the value is a first value, the compartmentalization features are enabled for the core 109 and when the value is a second, different value, the compartmentalization features are disabled for the core 109. The control register 112 may have a format that includes the enable/disable field for memory compartmentalization, and may include one or more of the following: bit 0 must be 1 (e.g., where an attempt to write 0 to this bit causes a general protection fault (#GP) exception), bit 1, if set to 1, the XSAVE feature set (saving state to XSAVE area 164) can be used to manage the general purpose registers 108 (e.g., XMM0-XMM15 in 64-bit mode; otherwise XMM0-XMM7), bit 2, is set to 1, advanced vector extension (AVX) instructions can be executed and the XSAVE feature set can be used to manage the upper halves of the general purpose registers (e.g., YMM0-YMM15 in 64-bit mode; otherwise YMM0-YMM7), bit 3, if set to 1, memory protection extension (MPX) instructions can be executed and the XSAVE feature set can be used to manage the bounds registers BND0-BND3, bit 4, if set to 1, MPX instructions can be executed and the XSAVE feature set can be used to manage the BNDCFGU and BNDSTATUS registers, bit 5, if set to 1, AVX-512 instructions can be executed and the XSAVE feature set can be used to manage the opmask registers k0-k7, bit 6, if set to 1, AVX-512 instructions can be executed and the XSAVE feature set can be used to manage the upper halves of the general purpose registers 108 (e.g., ZMM0-ZMM15 in 64-bit mode; otherwise ZMM0-ZMM7), bit 7, if set to 1, AVX-512 instructions can be executed and the XSAVE feature set can be used to manage the upper general purpose registers 108 (e.g., ZMM16-ZMM31, only in 64-bit mode), or bit 9, if set to 1, the XSAVE feature set can be used to manage the protection key rights register for user pages (PKRU) register.

Computing system 100 (e.g., compartment manager 110) may include a compartment (e.g., sandbox (SBX)) state register 114 to store the current state for a compartment, a compartment (e.g., sandbox (SBX)) description pointer to store a pointer to the compartment descriptor 160 (and/or compartment thread descriptor 162) for a particular compartment, a compartment (e.g., sandbox (SBX)) base register 118 to store the base address for a linear range, a compartment (e.g., sandbox (SBX)) exit instruction pointer (e.g., IP, EIP, or RIP) register 120 to store the instruction pointer to be used when exiting a compartment, a compartment (e.g., sandbox (SBX)) attribute register 122 to store one or more bits to indicate if a compartment is a management compartment or not, what, if any, of certain instructions are allowed or disallowed in the compartment, and/or if speculation is allowed or prevented within a compartment), and/or a linear address checking register(s) (LACR) 124. Although the above are discussed as being stored in a certain register, it should be understood that other data storage may be used to store the compartment management data, e.g., secure storage within core 109 when data is loaded from compartment descriptor 160 (and/or compartment thread descriptor 162).

Core 109 may include a segment register to store a value indicating a current privilege level of software operating on a logical core, e.g., separately for each logical core. In one embodiment, current privilege level is stored in a current privilege level (CPL) field of a code segment selector register of segment register. In certain embodiments, processor core 109 requires a certain level of privilege (e.g., supervisor privilege instead of user privilege) to perform certain actions, for example, actions requested by a particular logical core (e.g., actions requested by software running on that particular logical core). An instance of a compartment manager 110 may be in each core 109(1-N) of computer system 100. A single instance of a compartment manager 110 may be anywhere in computer system 100, e.g., a single instance of compartment manager 110 used for all cores 109(1-N) present.

In one embodiment, model specific registers 112 include configuration and/or control registers. In one embodiment, control registers are separate/distinct from model specific registers. In one embodiment, one or more (e.g., model specific) registers are (e.g., only) written to at the request of the OS running on the processor, e.g., where the OS operates in privileged (e.g., system) mode, but not for code running in non-privileged (e.g., user) mode. In one embodiment, a model specific register is only be written to by software running in supervisor mode, and not by software running in user mode and/or is only accessible to a management compartment.

In certain embodiments, decoder 146 decodes an instruction according to this disclosure, and that decoded instruction is executed by the execution circuit 154, for example, to manage compartments within memory 102. Examples of compartments within memory are discussed below in reference to FIGS. 5, and 11-19.

Each core 109 of computer system 100 may be the same (e.g., symmetric cores) or a proper subset of one or more of the cores may be different than the other cores (e.g., asymmetric cores). In one embodiment, a set of asymmetric cores includes a first type of core (e.g., a lower power core) and a second, higher performance type of core (e.g., a higher power core).

In certain embodiments, a computer system includes multiple cores that all execute a same instruction set architecture (ISA). In certain embodiments, a computer system includes multiple cores, each having an instruction set architecture (ISA) according to which it executes instructions issued or provided to it and/or the system by software. In this specification, the use of the term "instruction" may generally refer to this type of instruction (which may also be called a macro-instruction or an ISA-level instruction), as opposed to: (1) a micro-instruction or micro-operation that may be provided to execution and/or scheduling hardware as a result of the decoding (e.g., by a hardware instruction-decoder) of a macro-instruction, and/or (2) a command, procedure, routine, subroutine, or other software construct, the execution and/or performance of which involves the execution of multiple ISA-level instructions.

In some such systems, the system may be heterogeneous because it includes cores that have different ISAs. A system may include a first core with hardware, hardwiring, microcode, control logic, and/or other micro-architecture designed to execute particular instructions according to a particular ISA (or extensions to or other subset of an ISA), and the system may also include a second core without such microarchitecture. In other words, the first core may be capable of executing those particular instructions without any translation, emulation, or other conversion of the instructions (except the decoding of macro-instructions into micro-instructions and/or micro-operations), whereas the second core is not. In that case, that particular ISA (or extensions to or subset of an ISA) may be referred to as supported (or natively supported) by the first core and unsupported by the second core, and/or the system may be referred to as having a heterogeneous ISA.

In other such systems, the system may be heterogeneous because it includes cores having the same ISA but differing in terms of performance, power consumption, and/or some other processing metric or capability. The differences may be provided by the size, speed, and/or microarchitecture of the core and/or its features. In a heterogeneous system, one or more cores may be referred to as "big" because they are capable of providing, they may be used to provide, and/or their use may provide and/or result in a greater level of performance, power consumption, and/or some other metric than one or more other "small" or "little" cores in the system.

A processor may contain other shared structures dealing with state including, for example, prediction structures, caching structures, a physical register file (renamed state), and buffered state (a store buffer). Prediction structures, such as branch predictors or prefetchers, may store state about past execution behavior that is used to predict future behavior. A processor may use these predictions to guide speculation execution, achieving performance that would not be possible otherwise. Caching structures, such as caches or TLBs, may keep local copies of shared state so as to make accesses by the processor very fast.

Shared structures are a security risk. Information can be leaked across contexts by directly or indirectly observing the information stored. Further, behavior in a victim context can be influenced by training from within an attacking context. The disclosure herein alleviates some of these problems in certain embodiments by utilizing memory compartmentalization, for example, clearing/flushing/re-keying shared structures setup in one compartment so that compartment (e.g., code therein) cannot influence the execution of another compartment.

Figure 2:
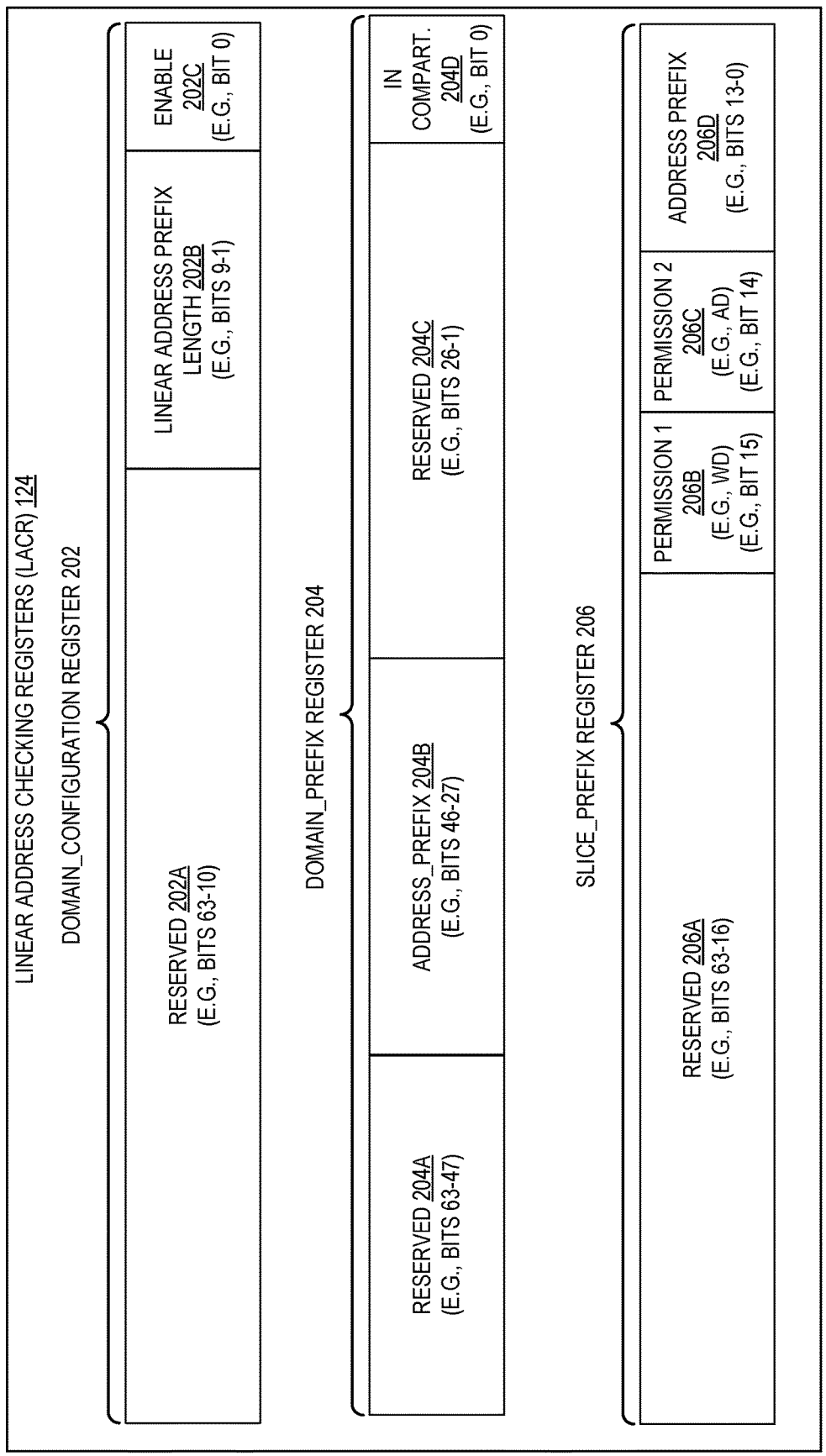
FIG. 2 illustrates example formats for linear address checking registers according to embodiments of the disclosure.

FIG. 2 illustrates example formats for linear address checking registers 124 according to embodiments of the disclosure. Depicted linear address checking registers 124 (e.g., each being 64 bits wide or wider) includes a domain configuration register 202, a domain prefix register 204, and a slice prefix register 206.

An example format of domain configuration register 202 includes one or more of: reserved field 202A, linear address prefix length field 202B, enable field 202C. An example format of domain prefix register 204 includes one or more of: a first reserved field 204A, address prefix field 204B, a second reserved field 204C, and an "in compartment" field 204D. An example format of slice prefix register 206 includes one or more of: reserved field 206A, first permission field 206B (e.g., to store a bit that indicate a write disable (WD), that when set, denies a memory write to that slice), a second permission field 206C (e.g., to store a bit that indicate an access disable (AD), that when set, denies a memory access to that slice), and an address prefix field 206D. A slice prefix register may include an execute disable (XD) bit, that when set, denies execution of code within that slice. Further discussion of an example domain, slice, and compartment is below in reference to FIG. 16.

In certain embodiments, domain configuration register 202 (e.g., IA32_DOMAIN_CONFIG MSR) is a (e.g., model specific) register that determines (e.g., for each core, or for each logical processor of a plurality of logical processors of a core) whether the feature of compartmentalization is enabled or not in field 202C and specifies the length of bits in field 202B for address domain selection located in domain prefix register 204 (e.g., IA32_DOMAIN_PREFIX MSR). In certain embodiments, domain prefix register 204 (e.g., IA32_DOMAIN_PREFIX) is a (e.g., model specific) register that contains the bits for address domain checking in field 204B. In one such embodiment, there is only one address domain (e.g., a single address space) so this register contains the bits for checking whether it is compartment memory or not, for example, with the address prefix field 204B storing the content while its length is specified by field 202B in domain configuration register 202. In one embodiment, domain configuration register 202 and domain prefix register 204 are programmable by code with supervisor privilege (e.g., ring 0 accessible) and slice prefix register 206 is programmable by code with user privilege (e.g., ring 3 accessible). In certain embodiments, slice prefix register 206 stores the bits for slice selection, e.g., one of a plurality (e.g., eight) slices as indicated by address prefix field 206D, and permission one field 206B being a first permission (e.g., WD) for that slice and permission two field 206B being a second permission (e.g., AD) for that slice, e.g., and a third permission (e.g., XD) for that slice. Thus, linear address checking registers 124 may be used to enforce memory compartmentalization. The data within linear address checking registers may stored in a compartment descriptor 160 and/or compartment thread descriptor 162.

Certain embodiments of memory compartmentalization utilize (e.g., swap into a core and out of a core) compartment descriptors 160 and/or compartment thread descriptors 162.

FIG. 3 illustrates an example format for a compartment descriptor 160 according to embodiments of the disclosure. In FIG. 3, each entry in compartment descriptor 160 includes a field name 302, e.g., a name of a particular linear range (e.g., slice) of memory, etc. per description 306 (which description 306 may not be an entry in each line in compartment descriptor 160), and a field 304 having an indicated width (e.g., to store data indicating the base address for that particular linear range). In FIG. 3, compartment descriptor 160 may thus store multiple base addresses for each respective linear range (e.g., slice), an instruction pointer (e.g., RIP) for an instruction to execute once exiting a compartment (e.g., which may be one or more slices as discussed herein), and attributes, for example, a bit indicating if a compartment is a management compartment, if a proper subset of instructions of the ISA are allowed to be executed in a compartment, and/or is speculative execution is allowed in a compartment. In one embodiment, each compartment includes its own compartment descriptor 160.

FIG. 4 illustrates an example format for a compartment thread descriptor 162 according to embodiments of the disclosure. In certain embodiments, each thread in a compartment can have its own compartment thread descriptor 162. In FIG. 4, each entry in compartment thread descriptor 162 includes a field name 402, per description 406 (which description 406 may not be an entry in each line in compartment thread descriptor 162), and a field 404 having an indicated width (e.g., to store data according to the description 406). In one embodiment, an entry in compartment thread descriptor 162 includes one or any combination of: a field for a return stack pointer (RSP) after exiting the compartment (e.g., to be stored into stack register 170 in FIG. 1), a field for return shadow stack pointer (RSSP) after exiting the compartment (e.g., to be stored in shadow stack register 172 in FIG. 1), a field that indicates a reason for exiting the compartment (e.g., execution of an SBXEXIT instruction or otherwise), a field that indicates further information (e.g., qualities) when an instruction that is marked as being an instruction not allowed to be executed in the compartment (e.g., thread) is requested to be executed in the compartment (e.g., the information can be that instructions length and opcode), a field that indicates the instruction pointer (e.g., RIP) for tenant code (e.g., code running inside of a compartment), a field that indicates the RSP for the tenant code, or a field that indicates the RSSP for the tenant code.

Figure 5:
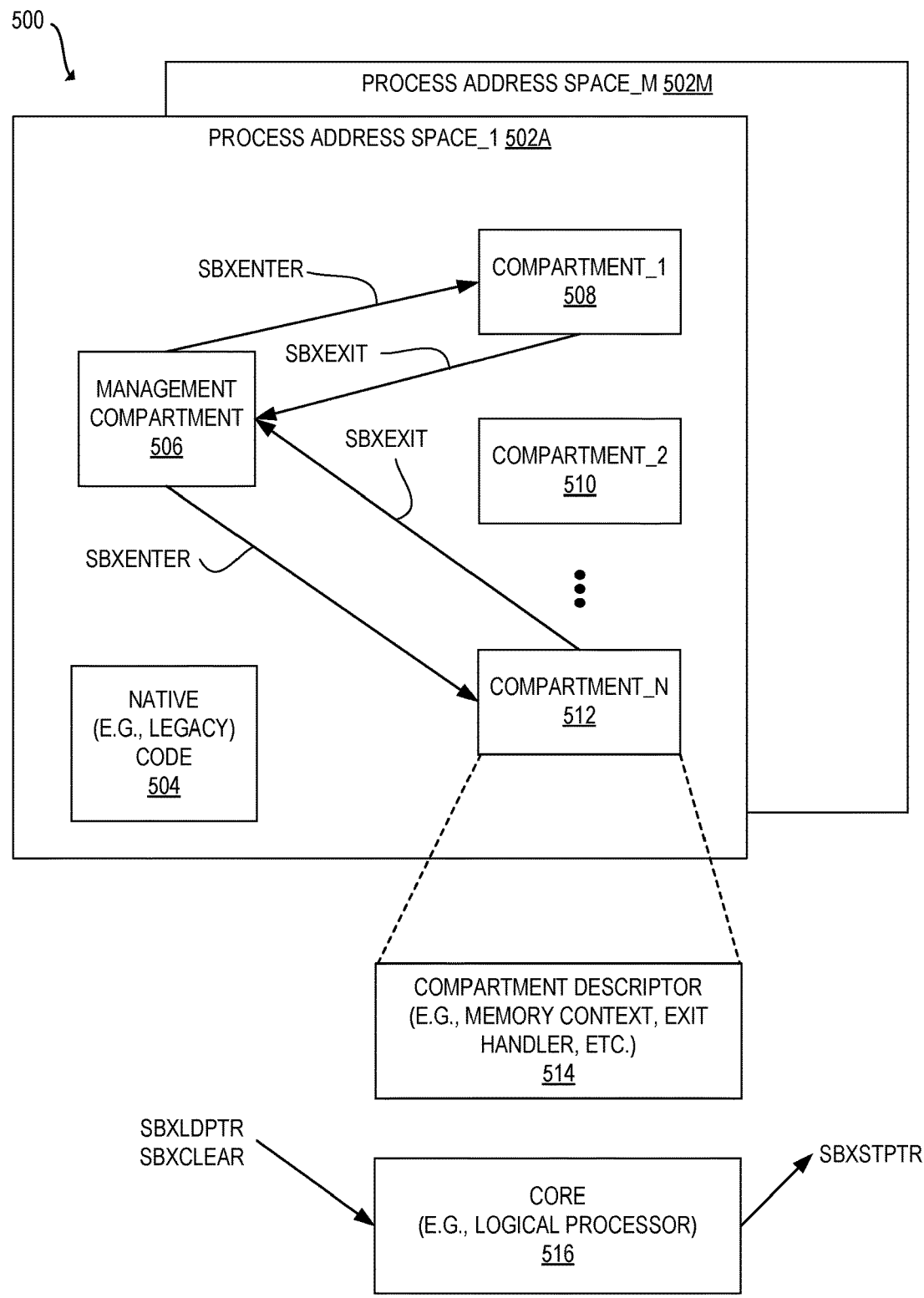
FIG. 5 illustrates a compartment execution model according to embodiments of the disclosure.

FIG. 5 illustrates a compartment execution model 500 according to embodiments of the disclosure. In FIG. 5, there is a first process address space 502A (e.g., and may include a second or more process address space 502M). Native (e.g., legacy) code 504 is within the process address space 502A within memory. As depicted, a management compartment 506 has been initialized (e.g., by marking the management attribute for that compartment's compartment descriptor 160 as discussed in reference to FIG. 3), along with a first compartment 508, and one or more other compartments (e.g., second compartment 510 and third or more compartment 512). For example, with each compartment having a respective compartment descriptor 514. In certain embodiments, core (e.g., logical processor) 516 is executing code in management compartment 506 and can execute a compartment enter instruction (e.g., SBXENTER mnemonic) to enter a compartment. For example, to enter first compartment 508 and that compartment 508 can execute an exit instruction (e.g., SBXEXIT mnemonic) to exit the compartment into management compartment 506. In some embodiments, switching a compartment descriptor switches other state such as encryption keys that may be used for all memory load/store operations inside the compartment. This embodiment may be used to further isolate architectural state (e.g., memory, registers, etc.), and micro-architectural state (e.g., branch predictors, load/store queues, fill buffers, etc.). The encryption keys for the compartment may be derived from a combination of key material for the context in which the compartment is executing (such as a trusted execution environment, e.g. SGX enclaves, TDX trust domains), and tweak keys that are specific to the compartment descriptor. The encryption keys may be used for confidentiality, integrity, and replay-protection of data in the compartment.

As discussed below in reference to FIG. 6, core 516 (e.g., at the request of management compartment 506) may execute a load pointer instruction to load a pointer to (e.g., secure) memory storing the compartment descriptor for a (e.g., non-management) compartment into core 516. Then management compartment 506 may execute a compartment enter instruction (e.g., SBXENTER mnemonic) to load that compartment's descriptor into core 516 and enter execution within that compartment. As discussed below in reference to FIG. 6, core 516 (e.g., at the request of management compartment 506) may execute a store pointer instruction to store a pointer to (e.g., secure) memory storing the compartment descriptor for a (e.g., non-management) compartment from the core 516.

In certain embodiments, management compartment 506 can access the slices of first compartment 508 and second compartment 510, but first compartment 508 cannot access the slices of second compartment 510 and second compartment 510 cannot access the slices of first compartment 508. In certain embodiments, management compartment 506 can access the slices of first compartment 508, second compartment 510, and third (or more) compartment 512, but the first compartment 508, second compartment 510, and third (or more) compartment 512 can only access the slices in their own compartment. In certain embodiments, each compartment can access code outside of any compartment (e.g., native code 504).

In certain embodiments, the management compartment 506 forms a hierarchical structure of access permissions, e.g., such that management compartment 506 is permitted to access the slices of first compartment 508, and delegates its management authority specifically such that compartment 508 can access the slice of second compartment 510 but second compartment 510 cannot access the memory slices of first compartment 508 or management compartment 506.

Compartment hardware may be exposed to the software as an X-feature. Referring again to FIG. 1, a core 109 may include a control register 112 such that the compartment management by the hardware is enabled by setting a (e.g. [SBX_EN]) bit to enable the features. For example, when this bit is set, the core 109 (e.g., logical processor) is to save additional internal state (e.g., a compartment descriptor) in the XSAVE area 164. This internal state may be internally cached (e.g., maintained) within core. The internal state may include values for sbx_state 114, sbx_desc_ptr 116, sbx_rbase0 . . . 7 118, etc. as discussed herein. In certain embodiments, core 109 includes a compartment state register 114 (e.g., SBX_STATE) to store a current state (e.g., operating mode) to be used by core (e.g., by compartment manager 110). When (e.g., XCR0[SBX_EN]) enable bit for compartment manager 110 is set in control register 112, the core 109 (e.g., logical processor) then checks the sbx_state internal register 114. Possible states for compartment state register 114 include 00 for SBX_CLEAR state (e.g., to cause the current compartment to be removed (e.g., so that it is not accessible)), 01 for SBX_OUTSIDE state (e.g., operating outside a compartment), 10 for SBX_INSIDE state (e.g., operating within a compartment and/or within native code 504 in FIGS. 5), and 11 for SBX_SUSPENDED state.

In one embodiment, when (e.g., XCR0[SBX_EN]) enable bit changes value from 1 to 0, sbx_state register 114 is reset to 00 (e.g., to cause the current compartment to be removed (e.g., so that it is not accessible)). In certain embodiments, executing a clear compartment instruction (e.g., SBXCLEAR mnemonic) resets this register 114 to 00. In one embodiment, executing an extended state restore instruction (e.g., XRESTOR mnemonic) with (e.g., XCR0[SBX_EN]) enable set to 1 will restore the value of this register 114 from XSAVE area 164.

A core may include as part of its ISA one or more compartmentalization instructions. The instructions may include one or any combination of: a load compartment descriptor pointer instruction (e.g., SBXLDPTR mnemonic), a store compartment descriptor pointer instruction (e.g., SBXSTPTR mnemonic), a clear compartment instruction (e.g., SBXCLEAR mnemonic), a compartment enter instruction (e.g., SBXENTER mnemonic), or a compartment exit instruction (e.g., SBXEXIT mnemonic). An operating system (OS) may use one or more of these instructions to set up one or more compartments.

Figure 6:
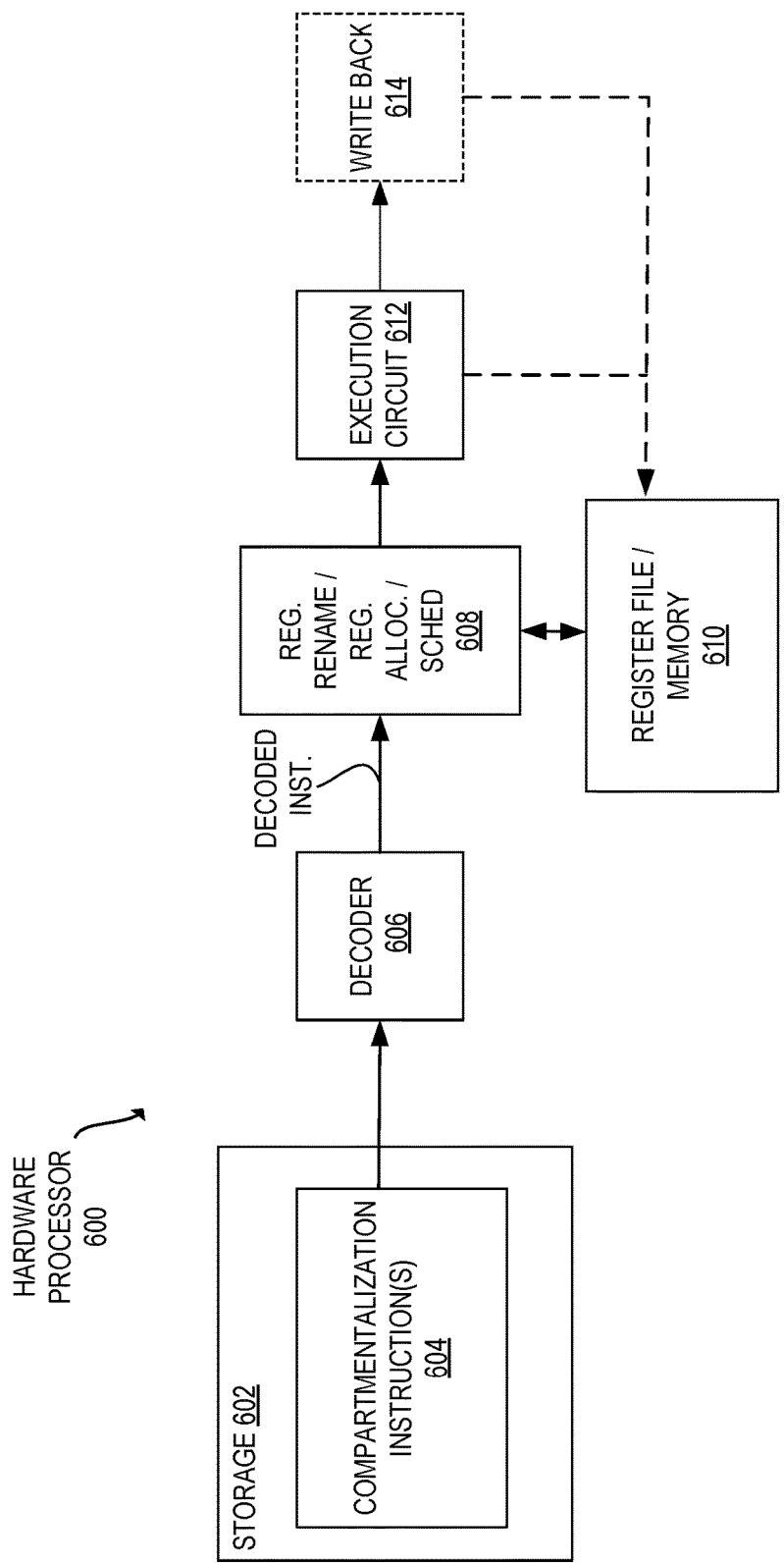
FIG. 6 is a block flow diagram illustrating execution of one or more compartmentalization instructions according to embodiments of the disclosure.

FIG. 6 is a block flow diagram illustrating execution of one or more compartmentalization instructions 604 by processor 600 according to embodiments of the disclosure. Instruction(s) 604 may include a load compartment descriptor pointer instruction (e.g., SBXLDPTR mnemonic) that, when decoded and executed, loads the compartment descriptor pointer into core 109 (e.g., into compartment descriptor pointer register 116 from compartment descriptor 160 in memory 102), cache the compartment ranges and permissions into internal registers (e.g., registers 118, 120, 122, 124, etc.), set compartment mode (e.g., sbx_mode) in register 114 to SBX_OUTSIDE, or any combination thereof.

Instruction(s) 604 may include a store compartment descriptor pointer instruction (e.g., SBXSTPTR mnemonic) that, when decoded and executed, writes out the compartment descriptor pointer to memory (e.g., stores the pointer into an XSAVE area 164), for example, without altering any value in the compartment mode register (e.g., sbx_state register 114).

Instruction(s) 604 may include a clear compartment instruction (e.g., SBXCLEAR mnemonic) that, when decoded and executed, clears a compartment descriptor, for example, clearing all internal processor state for that compartment descriptor (e.g., to disallow any future entry into that compartment, such as, but not limited to, disallowing future execution of a compartment enter instruction for that compartment). In one embodiment, a clear compartment instruction takes as input a linear address of the compartment descriptor in the process address space (e.g., the compartment descriptor must be in the management compartment's memory).

Instruction(s) 604 may include a compartment enter instruction (e.g., SBXENTER mnemonic) that, when decoded and executed, installs the data for a compartment descriptor (e.g., from memory 102 into core 109 in FIG. 1) e.g., and enters execution within the compartment. In certain embodiments, the compartment enter instruction takes as an operand the compartment descriptor pointer currently stored in compartment descriptor pointer register 116 (e.g., SBX_DESC_PTR) and loads the corresponding data from memory 102 for that compartment descriptor into core 109, e.g., and enters execution of code within the compartment. In one embodiment, pseudocode for execution of a compartment enter instruction includes:

```
if (lp.CPL != 3) //where lp is an identifier of a logical processor (lp)
    #GP // general protection fault
if (lp.sbx_mode == SBX_INSIDE)
// follow "Illegal Instruction" flow for a compartment
lp.sbx_lrange[0...n-1] ← sbx_desc_ptr->sbx_lrange[0...n-1]
lp.RIP ← sbx_desc_ptr->SBX_RIP
lp.sbx_desc_ptr ← sbx_desc_ptr
lp.sbx_mode ← SBX_INSIDE //compartment is now active
```

In certain embodiments, software is responsible for managing (e.g., all) other registers. In some embodiments, operands are passed to SBXENTER to, optionally, flush, clear, and/or re-key common shared hardware state (such as Branch predictors, micro-architectural buffers, etc.) to prevent one compartment from causing speculative execution in another compartment, for example, and enforce a load fence to resolve any pending loads before the target compartment starts executing.

Instruction(s) 604 may include a compartment exit instruction (e.g., SBXEXIT mnemonic) that, when decoded and executed, uninstalls the data for a compartment descriptor (e.g., from core 109 into memory 102 in FIG. 1) e.g., and exits execution within the compartment. In one embodiment, pseudocode for execution of a compartment exit instruction includes:

```
if (lp.sbx_mode != SBX_INSIDE)
    #GP //
lp.sbx_desc_ptr->SBX_RIP ← lp.RIP
lp.sbx_desc_ptr->len ← instruction length
lp.sbx_desc_ptr->EXIT_REASON ← EXIT_REASON_SBX_EXIT
lp.sbx_desc_ptr->EXIT_QUAL ← 0
lp.RIP ← lp.sbx_desc_ptr->SBX_EXIT_RIP
lp.sbx_mode ← SBX_OUTSIDE //compartment is now inactive
```

In one embodiment, e.g., in response to a request to perform an operation, a compartmentalization instruction (e.g., macro-instruction) 604 is fetched from storage 602 and sent to decoder 606 (e.g., decoder circuit 146 in FIG. 1). In the depicted embodiment, the decoder 606 (e.g., decoder circuit) decodes the instruction into a decoded instruction (e.g., one or more micro-instructions or micro-operations). The decoded instruction is then sent for execution, e.g., via scheduler circuit 608 to schedule the decoded instruction for execution.

In certain embodiments, (e.g., where the processor/core supports out-of-order (OoO) execution), the processor includes a register rename/allocator circuit coupled to register file/memory circuit 610 (e.g., unit) to allocate resources and perform register renaming on registers (e.g., registers associated with the instruction). In certain embodiments, (e.g., for out-of-order execution), the processor includes one or more scheduler circuits 608 coupled to the decoder. The scheduler circuit(s) may schedule one or more operations associated with decoded instructions, including one or more operations decoded from a synchronization instruction, for execution on the execution circuit 612.

In certain embodiments, a write back circuit 614 is included to write back results of an instruction to a destination (e.g., write them to a register(s) and/or memory), for example, so those results are visible within a processor (e.g., visible outside of the execution circuit that produced those results).

One or more of these components (e.g., decoder 606, register rename/register allocator/scheduler 608, execution circuit 612, register file/memory 610, or write back circuit 614) may be in a single core of a hardware processor (e.g., and multiple cores each with an instance of these components.

Figure 7:
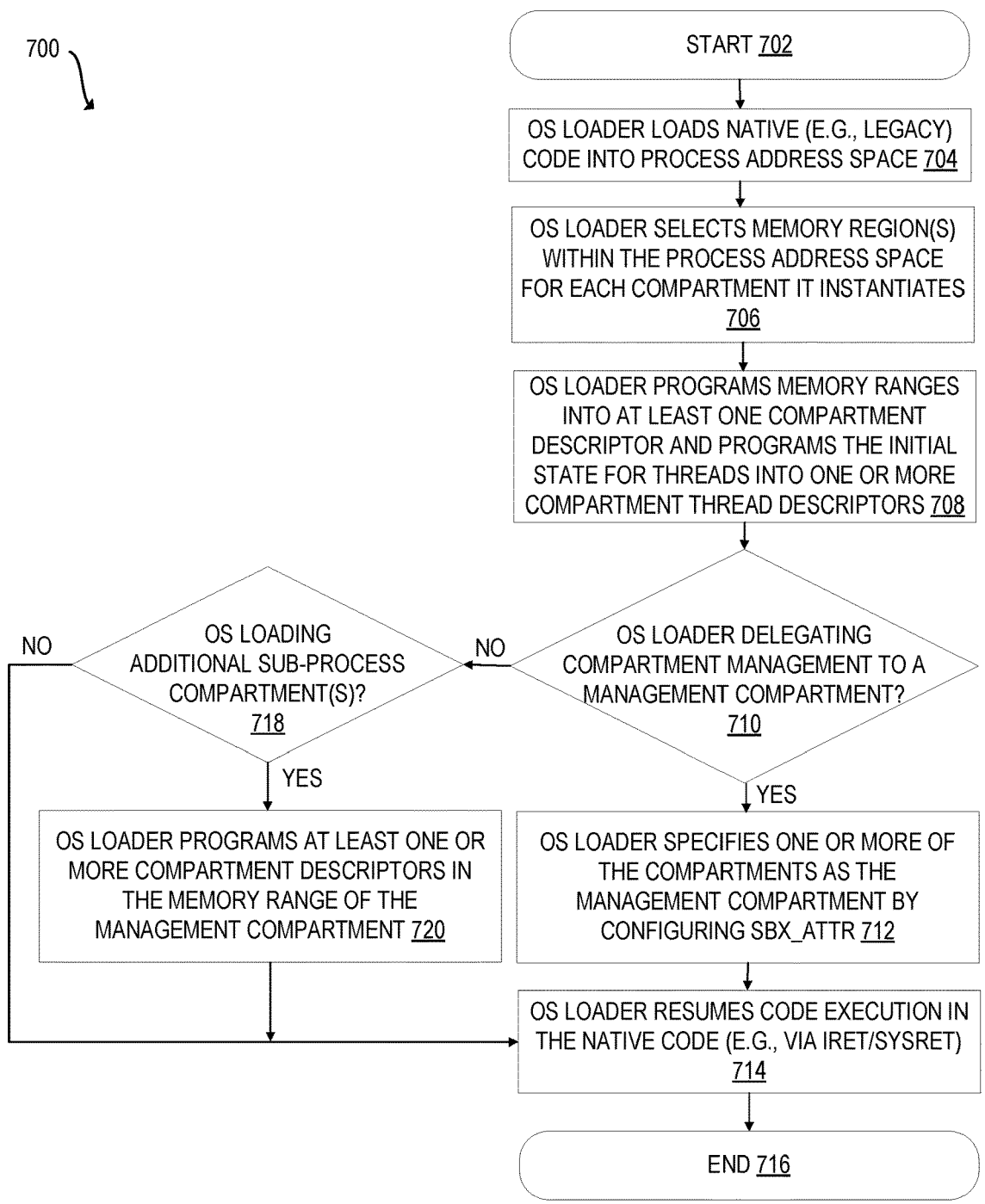
FIG. 7 illustrates a method of instantiating one or more compartments according to embodiments of the disclosure.

FIG. 7 illustrates a method 700 of instantiating one or more compartments according to embodiments of the disclosure. Method flow 700 includes starting at 702, an OS loader loading native (e.g., legacy) code into a process address space at 704, the OS loader selecting memory region(s) (e.g., one or more slices) within the process address space for each compartment it instantiates at 706, OS loader programming memory ranges into at least one compartment descriptor (e.g., and programming the initial state for threads into one or more compartment thread descriptors) at 708, checking if the OS loader is delegating compartment management to a management compartment at 710, and, if yes, the OS loader specifies one or more of the compartments as the management compartment (e.g., by configuring SBX_ATTR for each of the one or more specified compartments) at 712 and then the OS loader resumes code execution in the native code (e.g., via executing a return instruction (e.g., IRET/SYSRET)) at 714, and if no at 710, checking if the OS is loading additional (e.g., subprocess) compartment(s) at 718, and if yes at 718, then the OS loader programs at least one or more compartment descriptors in the memory range of the management compartment at 720, and it no at 718, then proceeding to 714. In certain embodiments after 714, the instantiating is ended at 716.

Figure 8:
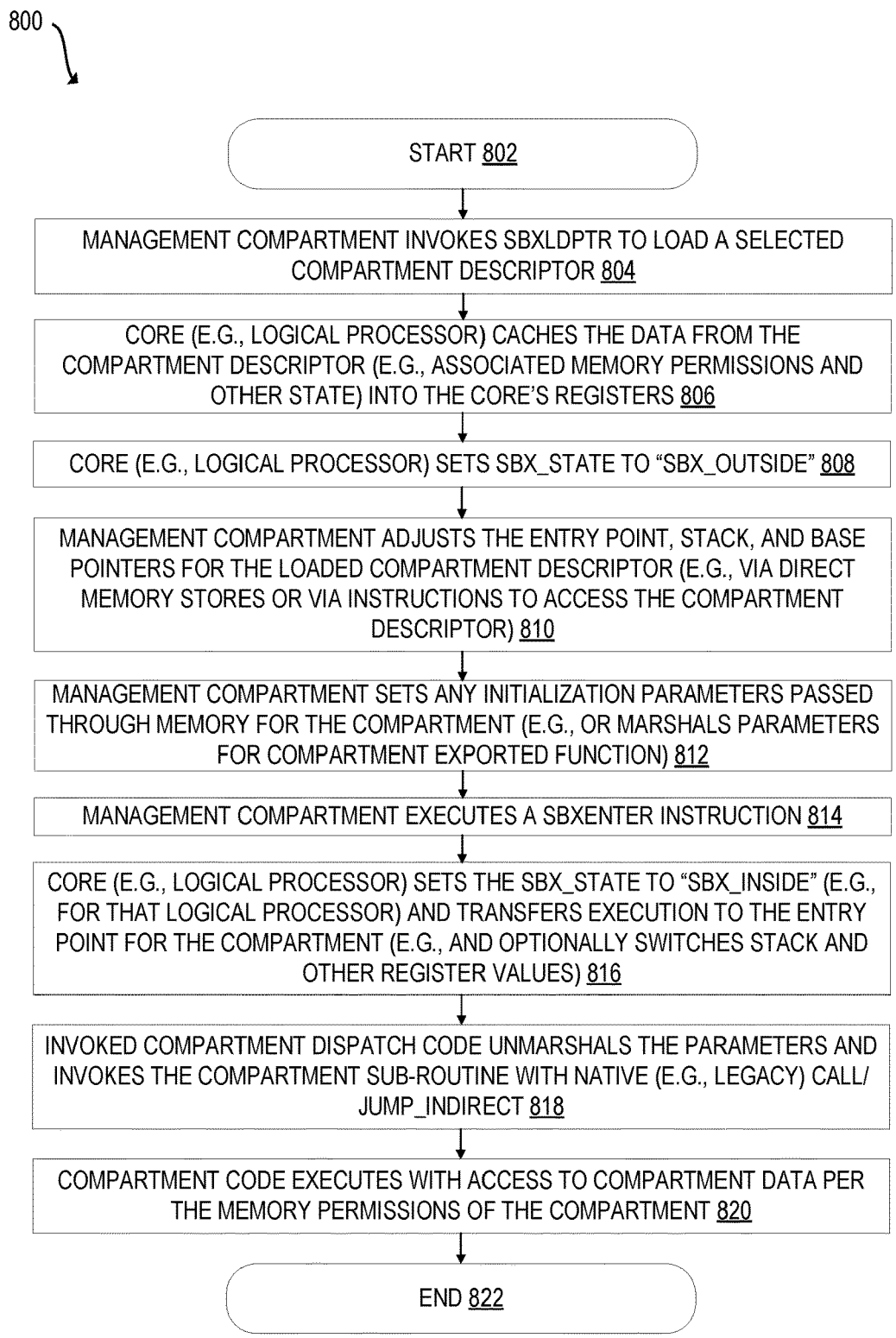
FIG. 8 illustrates a method of utilizing a compartment to execute code within the compartment according to embodiments of the disclosure.

FIG. 8 illustrates a method 800 of utilizing a compartment to execute code within the compartment according to embodiments of the disclosure. Method flow 800 includes starting at 802, management compartment invokes a compartment load pointer instruction (e.g., SBXLDPTR) to load a selected compartment descriptor at 804, core (e.g., logical processor) caches the data from the compartment descriptor (e.g., associated memory permissions and other state) into the core (e.g., core's registers) at 806, core (e.g., logical processor) sets SBX_STATE to "SBX_OUTSIDE" at 808, management compartment adjusts the entry point, stack, and base pointers for the loaded compartment descriptor (e.g., via direct memory stores or via instructions to access the compartment descriptor) at 810, management compartment sets any initialization parameters passed through memory for the compartment (e.g., or marshals parameters for compartment exported function) at 812, management compartment executes a compartment enter instruction (e.g., SBX-ENTER) at 814, core (e.g., logical processor) sets the SBX_STATE to "SBX_INSIDE" (e.g., for that logical processor) and transfers execution to the entry point for the compartment (e.g., and optionally switches stack and other register values) at 816, the invoked compartment dispatch code unmarshals the parameters and invokes the compartment sub-routine with native (e.g., legacy) call/jump_indirect at 818, and compartment code executes with access to compartment data per the memory permissions of the compartment at 820. In certain embodiments after 820, the flow 800 is ended at 822.

Figure 9:
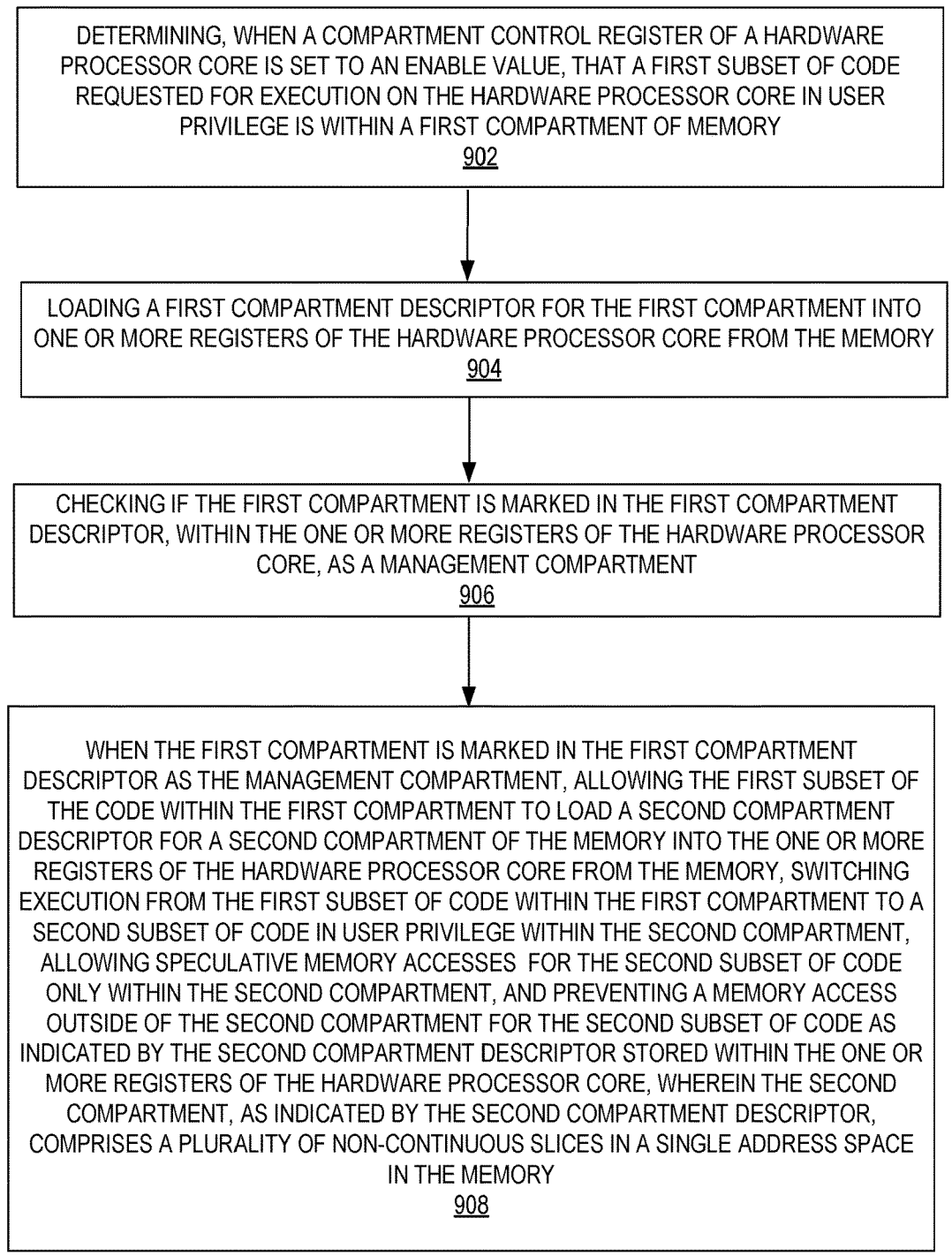
FIG. 9 illustrates a method of a processor managing the utilizing of a compartment according to embodiments of the disclosure.

FIG. 9 illustrates a method 900 of a processor managing the utilizing of a compartment according to embodiments of the disclosure. Method flow 900 includes determining, when a compartment control register of a hardware processor core is set to an enable value, that a first subset of code requested for execution on the hardware processor core in user privilege is within a first compartment of memory at 902, loading a first compartment descriptor for the first compartment into one or more registers of the hardware processor core from the memory at 904, checking if the first compartment is marked in the first compartment descriptor, within the one or more registers of the hardware processor core, as a management compartment at 906; and, when the first compartment is marked in the first compartment descriptor as the management compartment, allowing the first subset of the code within the first compartment to load a second compartment descriptor for a second compartment of the memory into the one or more registers of the hardware processor core from the memory, switching execution from the first subset of code within the first compartment to a second subset of code in user privilege within the second compartment, allowing speculative memory accesses for the second subset of code only within the second compartment, and preventing a memory access outside of the second compartment for the second subset of code as indicated by the second compartment descriptor stored within the one or more registers of the hardware processor core, wherein the second compartment, as indicated by the second compartment descriptor, comprises a plurality of non-continuous (e.g., discontinuous) slices in a single address space in the memory 908.

Figure 10:
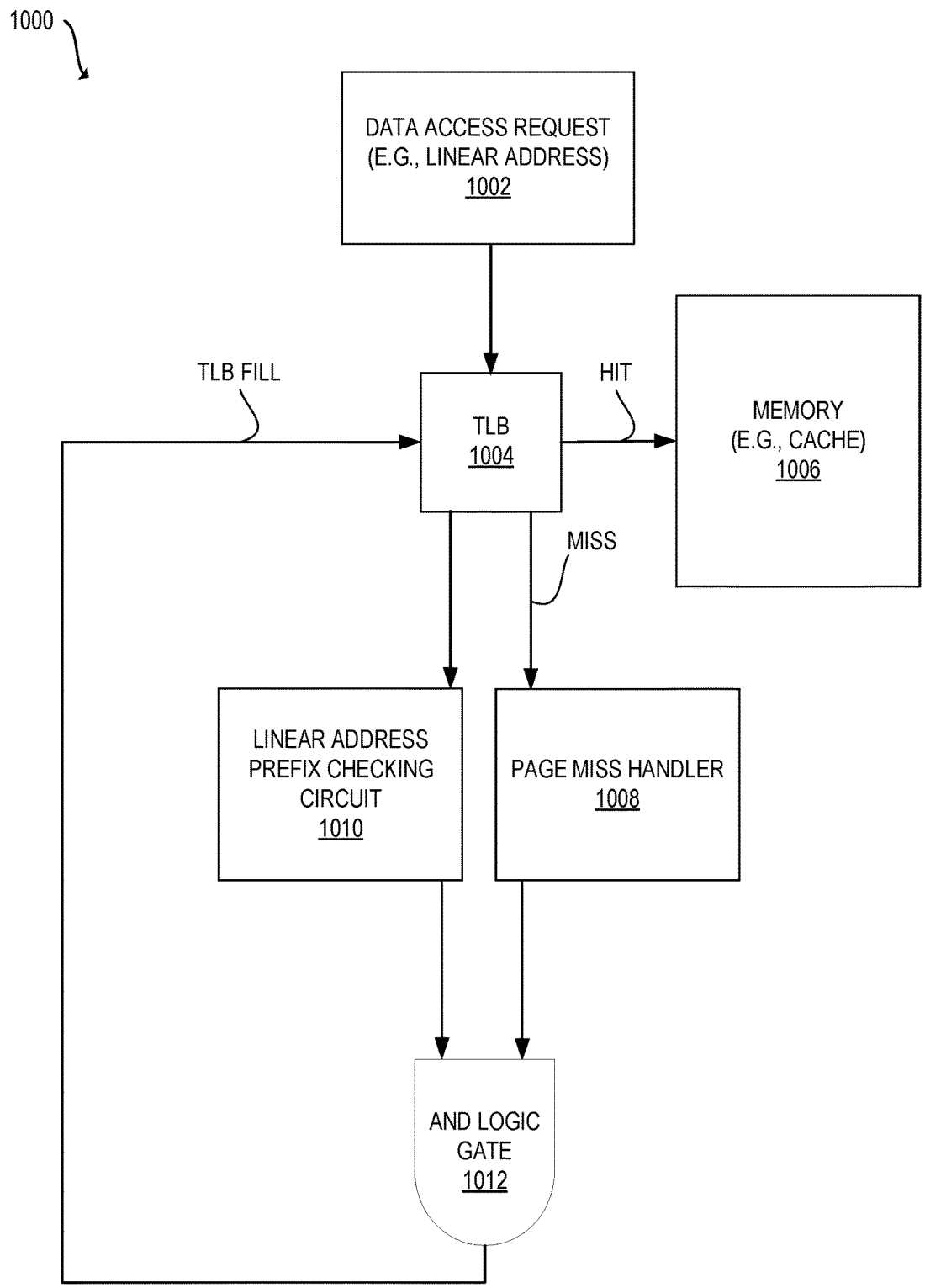
FIG. 10 illustrates a block diagram of circuitry including a linear address prefix checking circuit according to embodiments of the disclosure.

FIG. 10 illustrates a block diagram of circuitry 1000 including a linear address prefix checking circuit 1010 according to embodiments of the disclosure. Circuity 100 includes an input 1002 to receive a data access request (e.g., from an execution circuit), for example, a linear address for the data to be accessed (e.g., loaded and/or stored). In one embodiment, the linear address is checked within translation lookaside buffer (TLB) 1004 for its corresponding physical address in memory (e.g., cache) 1006. If present (e.g., a "hit") in TLB 1004 then the data access occurs at that physical address is memory 1006 in certain embodiments. If not present in TLB 1004 (e.g., a "miss") then the linear address is sent to page miss handler 1008 to determine (e.g., "fill") the corresponding physical address (e.g., via a page walk) in certain embodiments. In certain embodiments, for a miss, the linear address is checked to see if it is within a compartment (e.g., if the access to that address is allowed per the compartment hardware disclosed herein). In one embodiment, this places the linear address checking behind the TLB match instead of putting it in the critical path at runtime. One benefit is that the address checking (e.g., by linear address prefix checking circuit 1010) does not have to be triggered in these embodiments if a hit in the TLB, e.g., and for any TLB miss the linear address prefix checking circuit 1010 is triggered. In one embodiment, if linear address checking is passed, and PMH has occurred (e.g., returning the physical address) (e.g., with these two conditions determined by AND logic gate 1012 taking a respective status input from linear address prefix checking circuit 1010 and page miss handler 1008), then the TLB will have a tag (e.g., for the fill) corresponding to a compartment of the current thread. In certain embodiments, having the linear address prefix checking circuit 1010 logically behind a TLB match increases the TLB pressure if a thread switching across multiple compartments are all accessing similar/same native memory regions. To alleviate that, certain embodiments herein only tag the TLB within a compartment address but not native memory. For security reason, certain embodiments herein provide an instruction that flushes the TLB when switching compartments.

In certain embodiments, an error may occur within a compartment (e.g., when executing code at an address within the compartment. Table 1 below depicts nine possible error codes and their descriptions.

TABLE 1

ERROR HANDLING IN A COMPARTMENT

| Numeric Id. | Mnemonic | Description |
| --- | --- | --- |
| 0 | SBX_REASON_AVAIL | This reason is available for software use, and hardware will not (e.g., ever) use this reason |
| 1 | SBX_REASON_SBX_EXIT | Software inside the compartment |

TABLE 1-continued

ERROR HANDLING IN A COMPARTMENT

| Numeric Id. | Mnemonic | Description |
|---|---|---|
| 2 | SBX_REASON_ILLEGAL_ACCESS | executed SBX_EXIT instruction Software inside the compartment performed an illegal access Linear address of the illegal access is provided in SBX_EXIT_QUAL field of the compartment descriptor |
| 3 | SBX_REASON_SYSCALL | Software inside the compartment executed this instruction |
| 4 | SBX_REASON_SYSENTER | Software inside the compartment executed this instruction |
| 5 | SBX_REASON_VMCALL | Software inside the compartment executed this instruction |
| 6 | SBX_REASON_INT_N | Software inside the compartment executed this instruction |
| 7 | SBX_REASON_SEGREG_WRITE | SBX_EXIT_QUAL field contains numeric identifier of the segreg 0→DS 1→ES 2→FS 3→GS 4→SS |
| 8 | SBX_REASON_CP | Control flow violation due to indirect call/jmp |

In one embodiment, corrective action for 2-9 (e.g., but not for 0 or 1) of the above error reasons in Table 1 is handled by an OS (or VMM).

While in a compartment, memory accesses outside the compartment range(s) are not permitted by the core (e.g., CPU) in certain embodiments. An example memory access enforcement model when a compartment is executing is described below.

As one example, three options are possible for memory access violation reporting with the disclosed instructions and hardware herein:
Pseudocode of Approach 1:
Set lp.sbx_mode to SBX_SUSPENDED
Deliver #GP(0)
Pseudocode of Approach 2:
Set lp.sbx_mode to SBX_SUSPENDED
Deliver a new exception #CV (e.g., Compartment Violation)
Pseudocode of Approach 3:
lp.sbx_desc_ptr→SBX_RIP←lp.RIP
lp.sbx_desc_ptr→EXIT_REASON←EXIT_REASON_ILLEGAL_ACCESS
lp.sbx_desc_ptr→EXIT_QUAL←(ACCESS_TYPE, ACCESS_LinearAddress)
lp.RIP←sbx_desc_ptr→SBX_EXIT_RIP
lp.sbx_mode←SBX_OUTSIDE In certain embodiments, the pseudocode for operation for a compartment when experiencing an Interrupt/Exception/Virtual Machine Exit (VMEXIT), or System Management Interrupt (SMI) Operation is:
if (lp.sbx_mode==SBX_INSIDE)
lp.sbx_mode←SBX_SUSPENDED
Continue with the interrupt/exception/vmexit/SMI flow In certain embodiments, the pseudocode for operation for a compartment when experiencing an Interrupt Return (IRET), Resuming a Virtual Machine (VMRESUME), a Launch of a Virtual Machine (VMLAUNCH), or a Resume from System Management Mode (RSM) Operation is:
if(lp.sbx_mode==SBX_SUSPENDED)
lp.sbx_mode←SBX_INSIDE
Continue with IRET/VMRESUME/VMLAUNCH/RSM flow Note: Exception handling utilizes special OS enabling in certain embodiments. For example, the OS may execute an interrupt return (IRET) instruction to deliver exception to the exception handler, and this will enable the compartment without going into the compartment. In another embodiment, an OS ensures that the exception handler is outside of all the compartment ranges, and an interrupt return (IRET) instruction to this location causes EXIT_REASON_ILLEGAL_ACCESS exit from compartment (e.g., which can be used by software to unwind with additional information from the core).

The following discussed examples of software's use of one or more compartmentalization instructions.

Software may call into a compartment: using the management compartment and/or protected runtime to adjust stack and base pointers, using the management compartment and/or protected runtime to marshals the parameters, using the management compartment and/or protected runtime to sets compartment entry (e.g., SBX_ENTRY) to point to the entry point of an unprotected runtime, using the management compartment and/or protected runtime to execute a compartment enter instruction (e.g., SBXENTER), using a compartment unprotected runtime to unmarshal the parameters, using a compartment unprotected runtime to call the appropriate plugin function, using software to handle parameters between a management compartment (and/or protected runtime) and a compartment (and/or unprotected runtime).

Software may call a compartment using a stack. In one embodiment, all parameters are passed on stack. Additionally or alternatively, register-based parameter passing can be used. For example, a compartment code may implement two example functions: foo and bar, each taking two parameters. In one embodiment, software uses a register (e.g., RAX register) to indicate which function inside the compartment is desired, e.g., where RAX=0 for "foo" and RAX=1 for "bar". In certain embodiments, management runtime performs the following actions: push all parameters on the stack and/or push pointer to appropriate compartment descriptor on the stack.

Software may return from use of a compartment. For example, by the compartment code executing a return instruction that transfers control to the unprotected runtime (e.g., still inside compartment), to the instruction after "call" that was executed by the unprotected runtime. In one embodiment, unprotected runtime sets up appropriate "reason code" inside the compartment memory. In one embodiment, unprotected runtime executes a compartment exit instruction (e.g., "SBXEXIT"). In one embodiment, control transfers to the (e.g., SBX_EXIT) routine inside the protected runtime, for example, where this routine adjusts the stack and base pointers and returns. In some embodiments, operands are passed to SBXEXIT to, optionally, flush, clear, and/or re-key common shared hardware state (such as Branch predictors, micro-architectural buffers, etc.) to prevent one compartment from causing speculative execution in another compartment, for example, and enforce a load fence to resolve any pending loads before the target compartment starts executing.

Embodiments herein provide compartmentalization of memory that uses low memory overhead per compartment and/or a low entry/exit cost. Embodiments herein provide that compartments can share protected memory, compartments do not create new CPL rings, multiple threads can execute, a compartment can call into an OS, a compartment can take interrupts, and the compartments can share a (e.g., single) application address space. Certain embodiments herein provide linear compartments with multiple prefix registers for software compartmentalization.

Certain embodiments herein allow for software compartmentalization. Compartmentalization may be utilized to maintain memory safety, e.g., to avoid memory corruption to prevent code (e.g., a software application) from being hijacked but at the same time retaining highest performance. Compartmentalization may be utilized for side channel prevention, e.g., preventing speculative memory accesses from other compartments for software running in one compartment. Embodiments herein provide compartmentalization that is scalable to a large number of (e.g., 1000 or more) compartments. Embodiments herein provide compartmentalization that has little to no observable performance penalty in normal execution (e.g., performance at native speed) and/or little to no performance overhead on transition between compartments or compartment and non-compartments. Embodiments herein provide hardware compartmentalization that does not require changes in software, e.g., so that developers can make their software architectures more consistent across all platforms. Embodiments herein provide compartmentalization that is not as simple as defining a region of code and data, for example, where software uses different resources in different memory regions and/or indicating setting up memory permission of different locations at different time, the hardware is to allow software to set up different permissions to different memory ranges. Embodiments herein provide compartmentalization that supports numerous compartments (e.g., more than 1000, 2000, 3000, 4000 (e.g., 4096), 5000, etc. compartments). Embodiments herein provide compartmentalization that has little to no overhead on normal program execution (e.g., inside compartment or outside) and/or has little to no time added for switching memory permission view. Embodiments herein provide compartmentalization that is not intrusive on existing software architecture. Embodiments herein provide compartmentalization does not force the usage of compartments in the whole address space but only using a small portion of it with configurable size. Embodiments herein provide compartmentalization that provides a flexible view on various situations when a program is running in a compartment or outside of a compartment. Embodiments herein provide compartmentalization that do not conflict with memory tagging, for example, in embodiments that only uses valid linear address bits instead of the top bits of a linear address, they are not conflicting with any techniques that leverage the top linear address bits such as memory tagging. Embodiments herein provide compartmentalization that is greater than about sixteen, e.g., memory domains. Embodiments herein provide compartmentalization that is not merely process isolation, e.g., where process-based isolation does not scale because of its high usage of kernel resources. Embodiments herein provide compartmentalization that does not require any virtualization to be turned on or that all guest physical memory allocated. Embodiments herein provide compartmentalization that is power efficient.

Certain embodiments herein provide linear compartments (e.g., with multiple prefixes) via linear memory access control hardware. Embodiments herein allow user applications (e.g., code) to sandbox their components into different memory ranges, for example, such that code and data in each range is isolated (e.g., no access allowed) or selectively connected (e.g., limited access allowed) from the remaining part of the application code running outside.

Certain embodiments herein use linear compartments as a hardware mechanism for memory isolation within one address space, e.g., where running multiple instances using only one process saves resources from OS and allows applications to have better launch time and runtime performance.

One difficulty of a proper hardware design is how to handle software complexities in a simple manner, given that 1) certain software allocates memory from various places and 2) the memory to be compartmentalized may be scattered around the whole address space. The below discussed a software case and a confused deputy attack, linear compartments design, and then OS and software enabling.

Certain embodiments herein provide compartmentalization hardware (e.g., and/or instructions) that has a small overhead, low extra power cos, and minimum software changes for enabling, e.g., as a software vendor may be reluctant to have their software architecture fragmented to fit hardware features that are only available in some types of processors and/or ISAs. Certain embodiments herein provide compartmentalization hardware (e.g., and/or instructions) that provides speculation safety, e.g., code running in compartment A should not be able to use side channel code to read content of any other compartments).

The below example is a use case for a scripting language engine, e.g., which can be used to build a content delivery network (CDN). One key limitation of running multiple instances within one address space is the lack of security. Certain embodiments herein reuse a proper subset of linear address bits for compartmentalization, for example, with a hardware mechanism (e.g., one or more instructions of a processor ISA) to create/check/destroy compartments.

A scripting language (e.g., in contrast to a general purpose language such as, but not limited to C or C++) may use a scripting language engine to run multiple instances within the same address space. The scripting language runtime may support intermediate formats that are interpreted code or ahead-of-time compiled code compilation (e.g, such as but not limited to a WebAssembly (WASM) standard).

Figure 11:
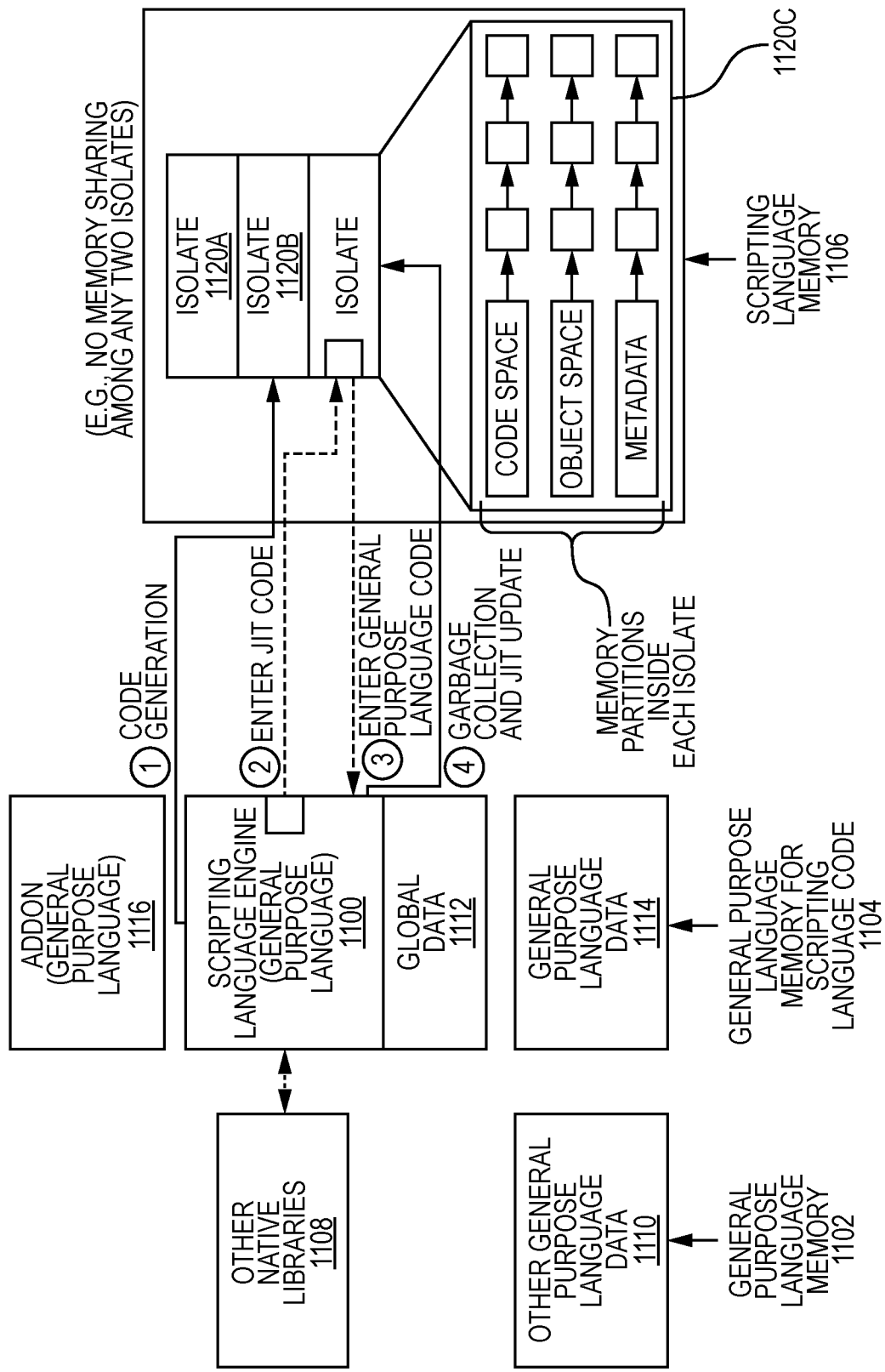
FIG. 11 illustrates three types of memory used by a scripting language engine according to embodiments of the disclosure.

FIG. 11 illustrates three types of memory 1102, 1104, 1106 used by a scripting language engine 1100 according to embodiments of the disclosure. Memory 1102 is a general purpose language memory, e.g., to store other native libraries 1108 or data 1110. Memory 1104 is a general purpose language memory for scripting language code, e.g., to store scripting language engine 1100, its global data 1112, addons 1116, an d data 1114 (e.g., the memory that is used to support the running of a scripting language engine 1100 instance). Memory 1106 is a scripting language memory, e.g., to store a plurality of scripting language code (e.g., a plurality of isolates 1120A-1120C). Zoomed-in view of isolate 1120C illustrates a code space, an object space, and metadata.

A scripting language engine 1000 may utilize a memory hierarchy as follows: (i) an isolate (e.g., isolate 1120C) represents one scripting language virtual machine (VM) instance (e.g., in certain embodiments, each isolate includes one scripting language heap), (ii) a space that represents one type of scripting language object within an isolate, and (iii) a page that is a chunk of memory (e.g., 512K or 1 MB) that contains a sequence of scripting language objects. In certain embodiments, the terms isolate, space and page are logical and they are defined by the scripting language engine 1100 itself. Each isolate may thus represents one scripting language instance, e.g., one entity to be compartmentalized. However, an isolate may not be continuous in memory, instead it may be classified into several spaces and each spaces is further fragmented into a collection of memory chunks. In one embodiment, the scripting language engine 1100 is to guaranty there is no linear memory sharing across any two different isolates. At circle (1) the scripting language engine 1100 creates just-in-time code in isolate 1120C, at circle (2) the just-in-time code is entered, at circle (3), the general purpose language code is entered, and at circle (4), the garbage collection (GC) begins (e.g., to reclaim memory) and just-in-time data is updated.

Figure 12:
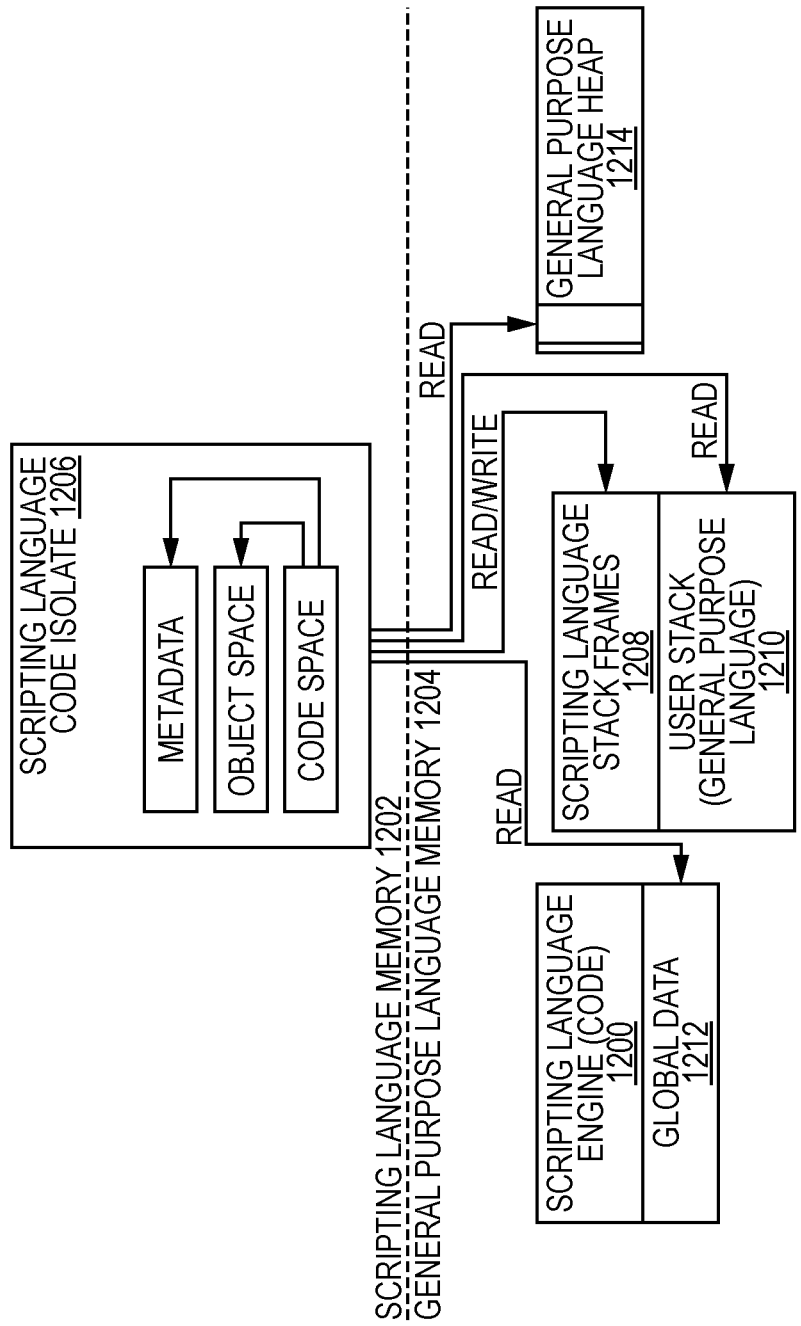
FIG. 12 illustrates scripting language memory and general purpose language memory according to embodiments of the disclosure.

FIG. 12 illustrates scripting language memory 1202 and general purpose language memory 1204 according to embodiments of the disclosure. In certain embodiments, scripting language code running in an isolate 1206 is to access memory (e.g., general purpose language memory 1204) outside of where it is stored (e.g., outside of scripting language memory 1202). In FIG. 12, general purpose language memory 1204 stores the scripting language engine 1200, global data 1212 for isolates (e.g., to be read by isolate 1206), scripting language stack frames 1208 (e.g., to be read or written to by isolate 1206), user stack 1210 (e.g., to be read by isolate 1206), and heap 1214 (e.g., to be read by isolate 1206) (e.g., where the allocation and deallocation of the heap is by a programmer).

Figure 13A:
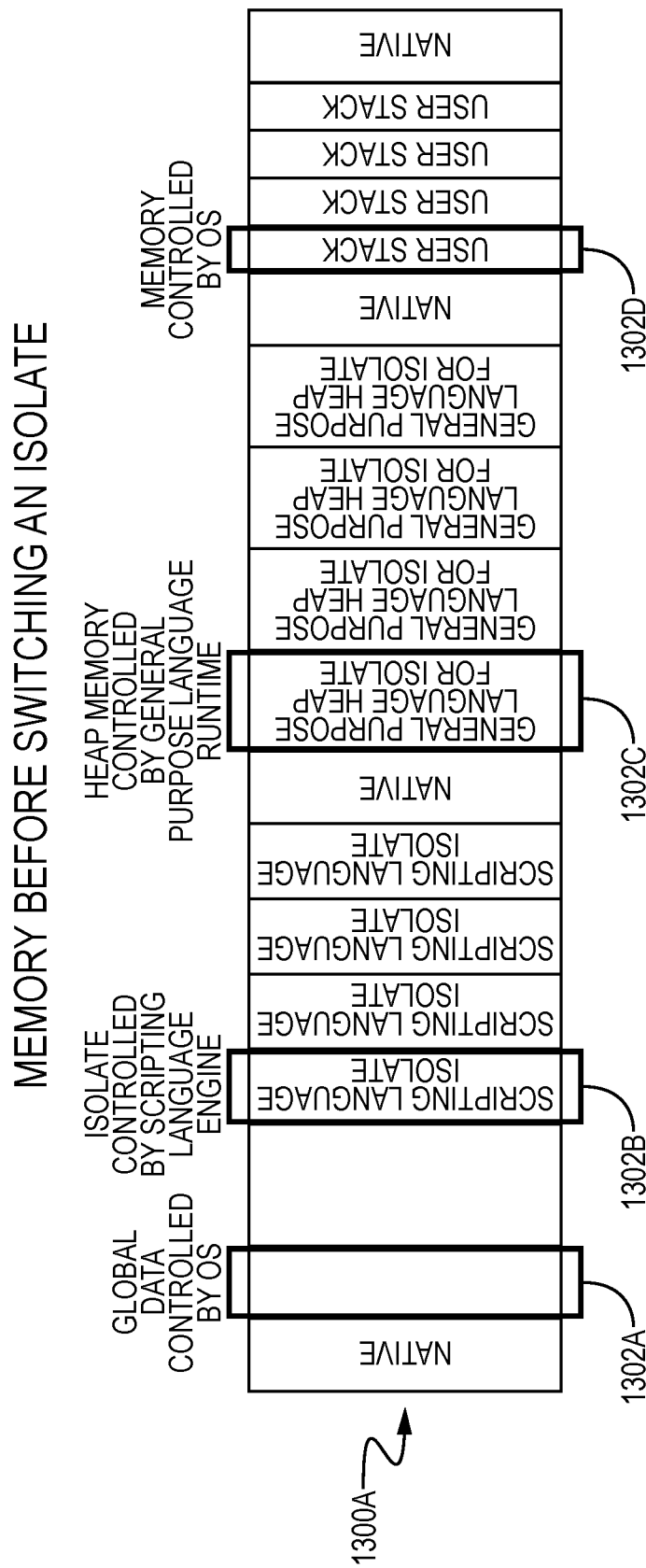
FIG. 13A illustrates memory before a switch of a first isolate to a second isolate.
Figure 13B:
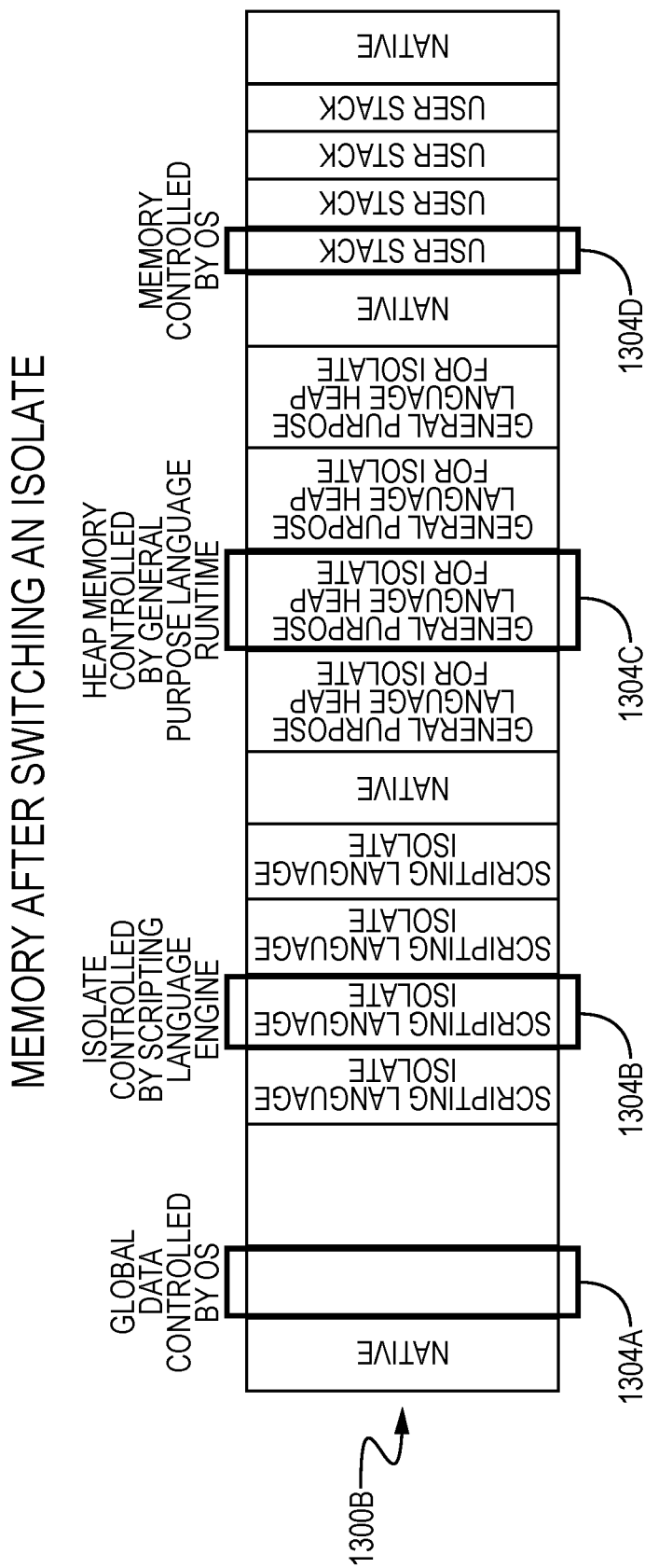
FIG. 13B illustrates the memory after the switch of the first isolate to the second isolate according to embodiments of the disclosure.

In one embodiment, each isolate could only occupy one running thread and each running thread is allowed to switch to another isolate. However, the problem is that when switching isolate, in certain embodiments the thread does not switch stack, and thus not all memory regions are attached permanently to an isolate. Certain embodiments herein overcome these issues. FIGS. 13A-13B demonstrates the situation when a thread switches its isolate.

FIG. 13A illustrates memory 1300A before a switch of a first isolate 1302B to a second isolate, and FIG. 13B illustrates the memory 1300B after the switch of the first isolate 1302B to the second isolate 1304B according to embodiments of the disclosure. First isolate 1302B is to access four slices of memory, e.g., one each from global data controlled by the OS 1302A, from first isolate controlled by scripting language engine 1302B, from heap memory controlled by general purpose language runtime 1302C, and global memory controlled by the OS 1302D (e.g., user stack). After switching to second isolate 1304B, second isolate 1304B is to access four slices of memory, e.g., one each from global data controlled by the OS 1304A, from second isolate controlled by scripting language engine 1304B, from heap memory controlled by general purpose language runtime 1304C, and global memory controlled by the OS 1304D (e.g., user stack). In one embodiment, each scripting language thread owns its own scripting language memory and its own stack, but shares the same (e.g., C++) heap and global data (e.g., user stack), for example, such that heap is in fact virtual now because there is so far no compartmentalization implementation even in software.

From the previous section, the example high level memory layout of each scripting language thread has at least 4 pieces (e.g., slices) of memory that it needs to access. In addition to that, in embodiments the isolate is not self-contained, e.g., anything related to the system requires an application programming interface (API) call(s) outside of the isolate. In certain embodiments, each thread has two states: (1) inside isolate and (2) outside of isolate. However, in certain embodiments, a scripting language code can call into the whole address space of general purpose language code as shown in the confused deputy attack in FIGS. 14 and 15.

Figure 14:
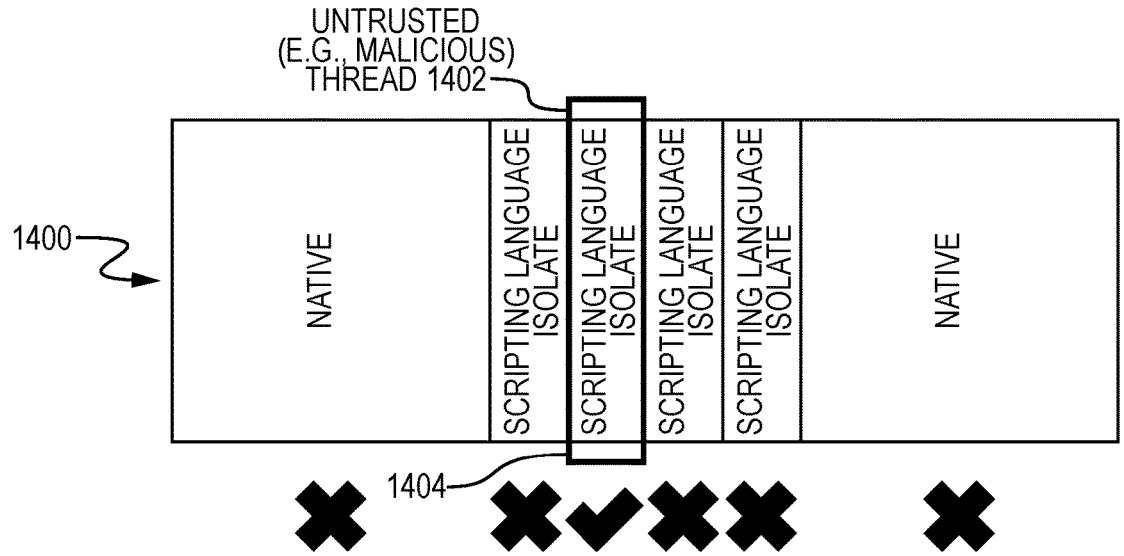
FIG. 14 illustrates an untrusted scripting language thread constrained within an isolate according to embodiments of the disclosure.

FIG. 14 illustrates an untrusted scripting language thread 1402 constrained within an isolate 1404 according to embodiments of the disclosure. In certain embodiments, the untrusted scripting language thread 1402 is not allowed to call into another isolate or native code.

Figure 15:
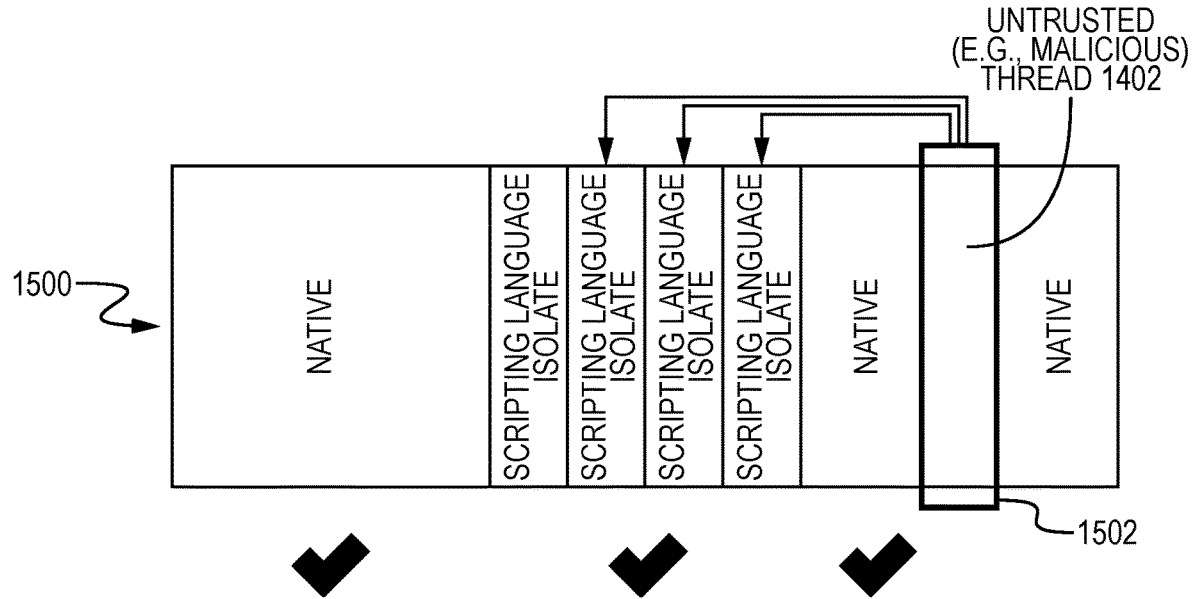
FIG. 15 illustrates an untrusted scripting language thread calling out into general purpose language code according to embodiments of the disclosure.

FIG. 15 illustrates an untrusted scripting language thread 1402 calling out into general purpose language code 1502 according to embodiments of the disclosure. In this embodiment, the general purpose language code 1502 is allowed to call into another isolate or native code, and thus an exit from the isolate has given a (e.g., untrusted) running thread 1402 full access control capability (e.g., and may allow the thread 1402 to corrupt/leak code/data in other isolates).

Certain embodiments herein overcome these issues by using hardware compartmentalization of memory.

Figure 16:
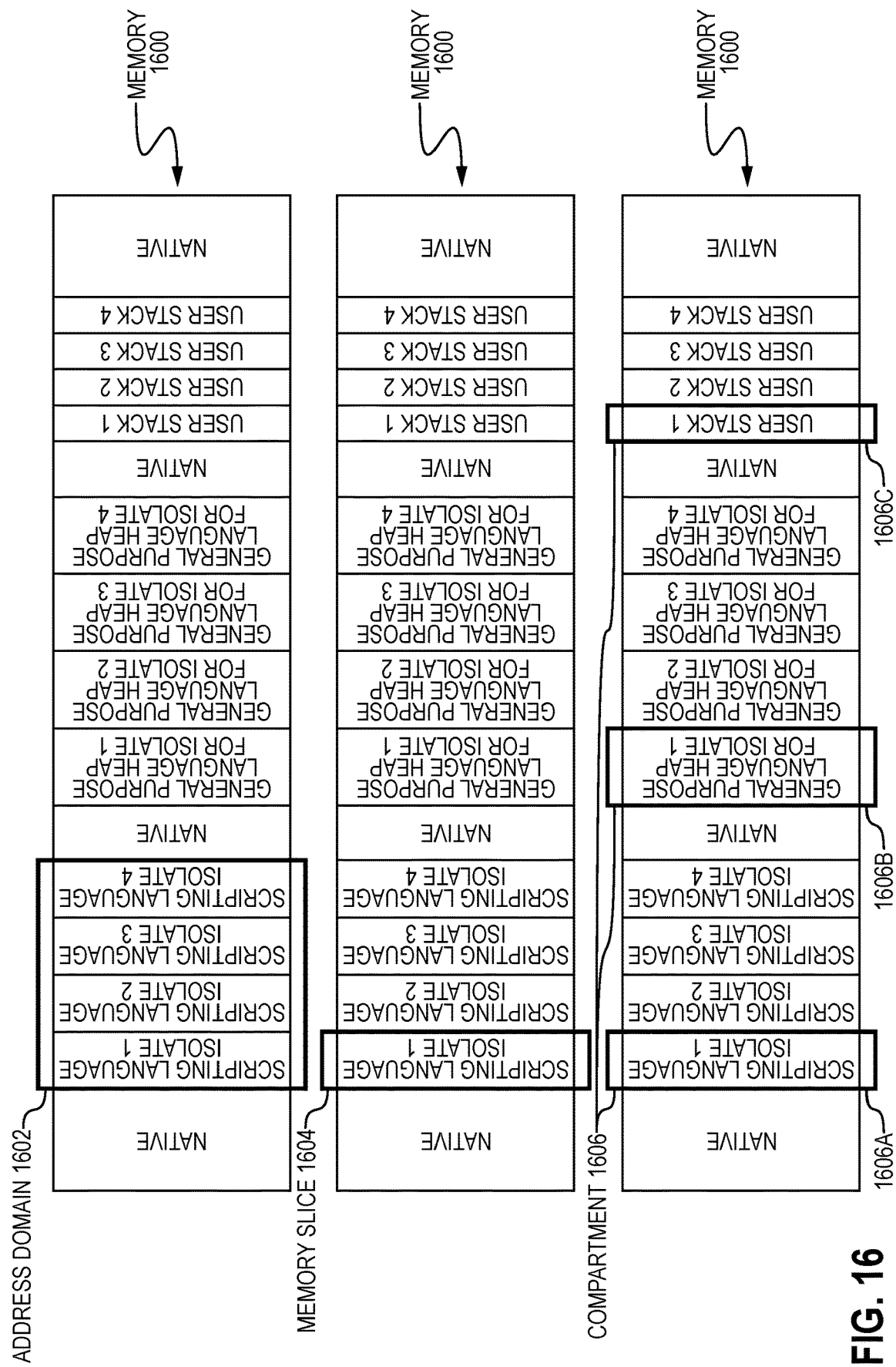
FIG. 16 illustrates an address domain in memory, a memory slice in the address domain, and a compartment that includes multiple memory slices according to embodiments of the disclosure.

FIG. 16 illustrates an address domain 1602 in memory 1600, a memory slice 1604 in the address domain 1602, and a compartment 1606 that includes multiple memory slices 1606A-C according to embodiments of the disclosure. In one embodiment, memory slice 1606A of single compartment 1606 stores an isolate, memory slice 1606B of single compartment 1606 stores the heap for that isolate, and memory slice 1606C of single compartment 1606 stores the user stack for that isolate.

In one embodiment, an address domain is a contiguous linear address space of memory that needs to be isolated (e.g., to prevent a confused deputy attack), a memory slice is a contiguous address range that can be isolated from other ranges within the same address domain, and/or a compartment is a logical entity that consists of a collection of memory slices. In certain embodiments, a compartment can span across several address domains, a compartment can have multiple memory slices, and/or a compartment should not change its linear memory boundaries by itself.

In certain embodiments, a hardware compartment is aware of address domains as well as memory slices. Thus, certain embodiments herein utilize two-level linear address checking to satisfy this two-level awareness, e.g., as shown in the following FIG. 17.

Figure 17:
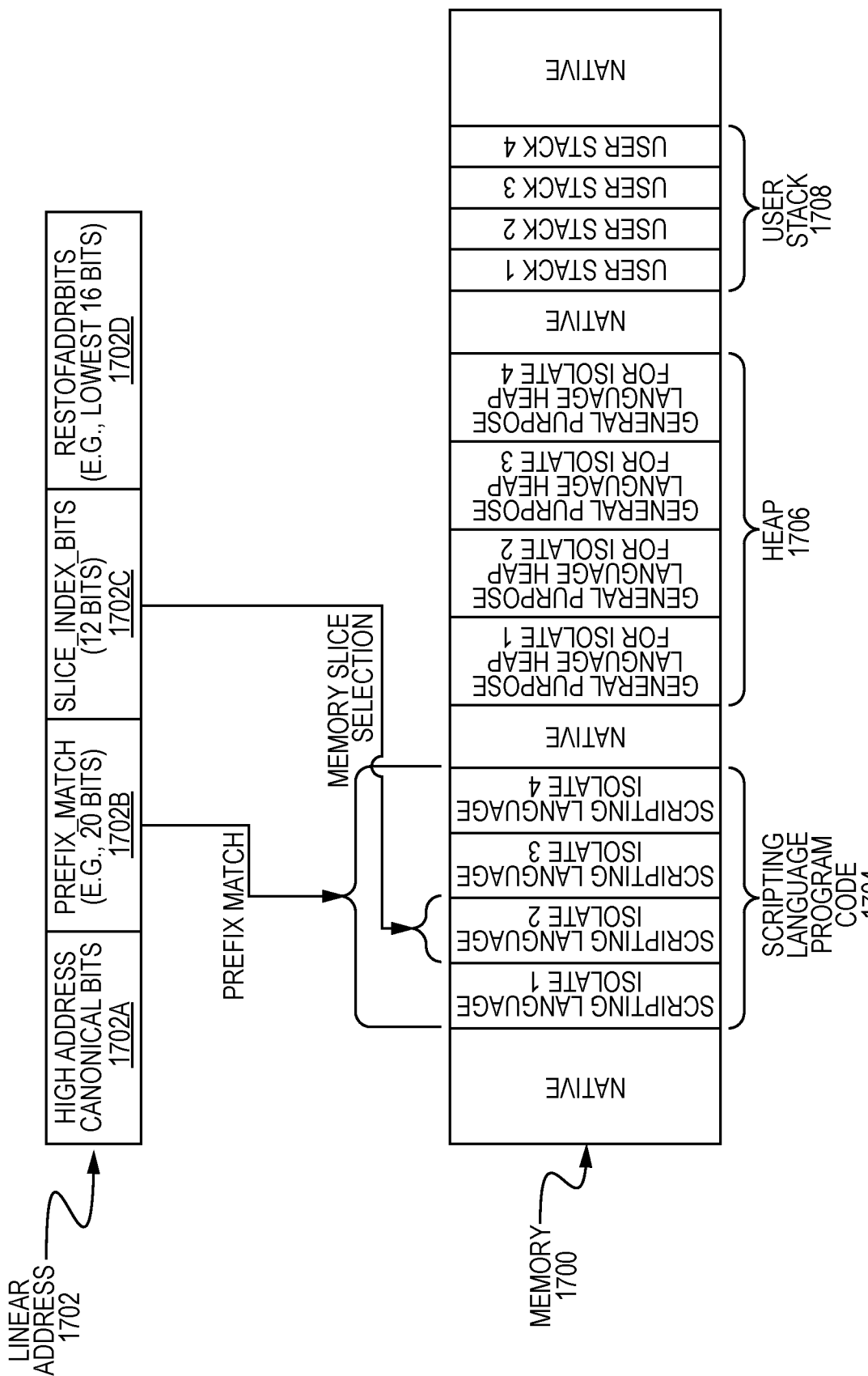
FIG. 17 illustrates two level hardware address checking for an access request to memory according to embodiments of the disclosure.

FIG. 17 illustrates two level hardware address checking for an access request 1702 to memory 1700 according to embodiments of the disclosure. Depicted access request is a linear address 1702 including high address canonical bits 1702A, a field 1702B to perform a prefix match on, a field 1702C to perform a slice match on, and a field 1702D for the rest of the linear address 1702. Depicted memory includes isolates stored in slices within scripting language program code 1704 domain of memory 1700, a heap 1706 domain, and a user stack 1708 domain. Thus, a memory access request (e.g., from an execution circuit at the request of code) may check linear address 1702 to ensure that the code requesting the access matches its prefix 1702B to the prefix(es) allowed to be accessed by that code and matches its slice index 1702C to the slice index(es) allowed to be accessed by that code.

Thus, certain embodiments herein utilize two level address checking, e.g., a check of a "prefix" match to an address domain and within each address domain, a check of a "slice index" match to a slice number. In one embodiment with N (where N is any positive integer greater than one) address domains, a compartment could have N memory slices. To achieve compartment address checking, one embodiment would use N number of prefix registers for address domain bit matching and memory slice selection in equal size. In other embodiment, only one prefix register is used for address domain matching and N number of slice registers are used for slice matching. The following FIG. 18 shows an example of this.

Figure 18:
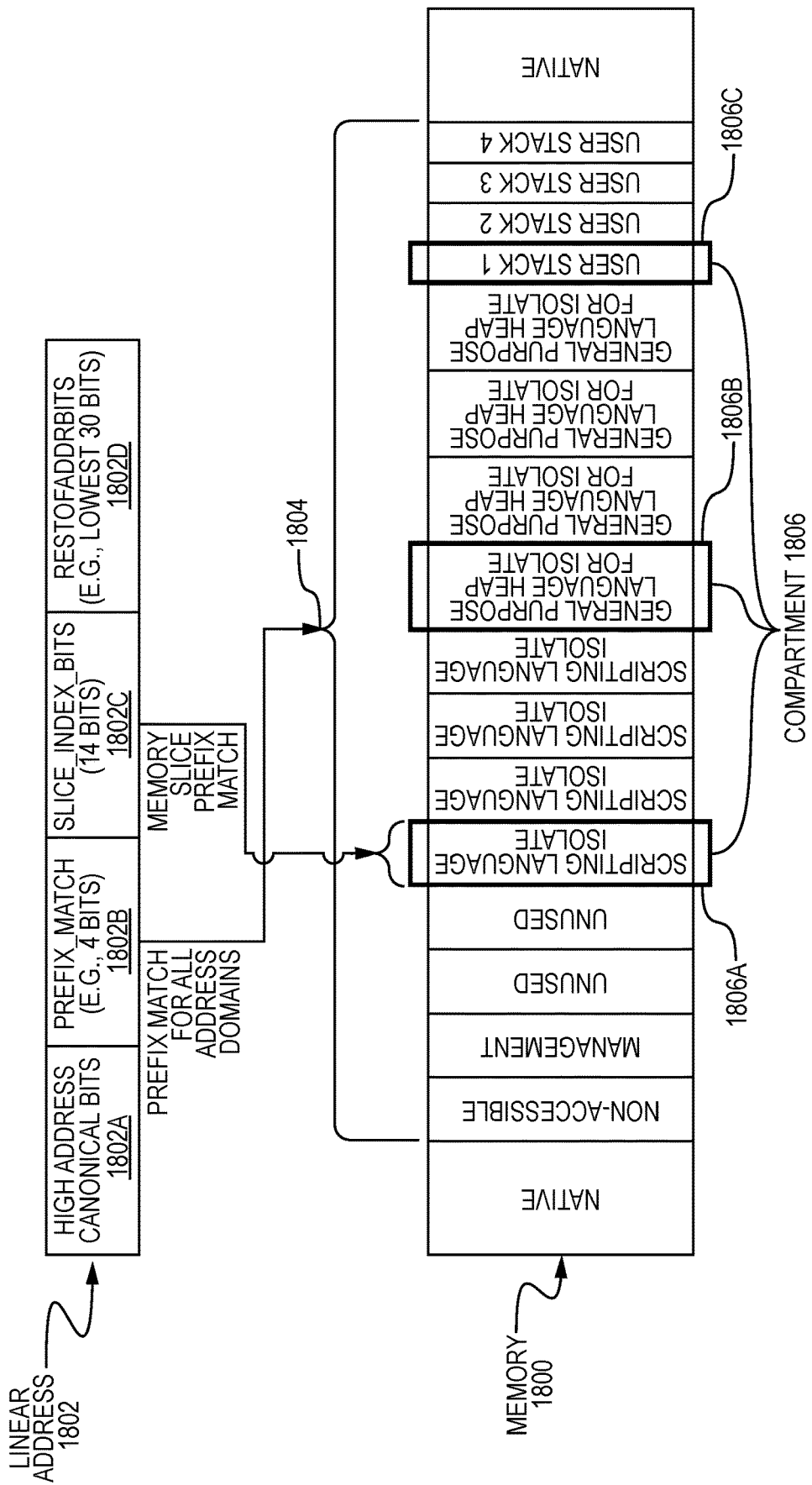
FIG. 18 illustrates two level hardware address checking within one address domain for an access request to memory according to embodiments of the disclosure.

FIG. 18 illustrates two level hardware address checking within one address domain 1804 for an access request 1802 to memory 1800 according to embodiments of the disclosure. Compartment 1806 includes a slice 1806A for an isolate, a slice 1806B for the isolate's heap, and a slice 1806C for isolate's stack. Depicted access request is a linear address 1802 including high address canonical bits 1802A, a field 1802B to perform a prefix match on, a field 1802C to perform a slice match on, and a field 1802D for the rest of the linear address 1802. Thus, a memory access request (e.g., from an execution circuit at the request of code) may check linear address 1802 to ensure that the code requesting the access matches its prefix 1802B to the domain allowed to be accessed by that code and matches its slice index 1702C to the slice(s) index(es) allowed to be accessed by that code. An example of linear address checking registers is discussed in reference to FIG. 2. In certain embodiments, domain configuration register 202 and domain prefix register 204 are managed by an OS and initially setup by applications (e.g., assuming the OS manages the contents within these two registers). In certain embodiments, the slice prefix register 206 is set by user level code, e.g., not only set by the OS.

FIG. 19 illustrates linear address checking management data structures according to embodiments of the disclosure. Depicted data structures include a compartment table 1902, for example, with compartment table entry 1902A including a plurality of entries (e.g., where each entry includes permissions bits (e.g., a bit for WD permission, a bit for AD permission, and/or a bit for XD permission for that slice) and slice index bits indicating the particular slice of that particular compartment, e.g., for a plurality (e.g., 8) slices). In certain embodiments, the compartment table 1902 is used purely for management purpose, but there is a permission table 1904 in exactly the same format, for example, with a key difference being that the permission table is used by each thread, and thus they are thread local and it is used by the core to enforce a permission check at runtime. In one embodiment, entry 1904A in table 1904 corresponds to the same location (i.e., table entry 1902A) in table 1902. In certain embodiments, separating the permission table 1904 from the compartment table 1902 provides the benefits of least privilege, e.g., even if there are four compartments allocated, thread one could only use compartment four. Depicted data structures include an allocation table 1906 showing the allocation status of each memory slice (e.g., with the filled in boxes being allocated memory slices), for example, with allocation table 1906 used by a linear memory slice allocator to satisfy address range allocation and potential sharing purposes.

The above discussed examples of how each compartment boundary and permission is managed (e.g., using the data structures in FIG. 19).

In certain embodiments, these data structure are managed and updated at runtime, e.g., the memory of those data structures is to be writable for some period of time. In certain embodiments, to provide memory security, the data structures are managed by a management compartment. In certain embodiments, a given memory slice (e.g., slice 0) of the management compartment includes the data structures in FIG. 19, e.g., and any code and data to support running a local thread. In one embodiment, the thread running inside a management compartment is responsible for handling a request for compartment creation/destruction, memory slice allocation/deallocation, etc. To ensure that its own memory slice is not accessible by other threads, this thread in the management compartment ensures that any compartment/slice allocation will not use the slices used by the management compartment in certain embodiments, for example, to ensure the management compartment's memory is not accessible by any threads (e.g., other than the management thread itself in ring-3).

The following instructions may be utilized to manage the data structures discussed herein, for example, to keep an attacker from switching to other compartments and corrupting their memory (e.g., such that an attacker cannot abuse the privilege provided by the ISA to corrupt native memory).

A compartment setup instruction may take an operand of either a compartment table 1902 or a permission table 1904 and setup the values (e.g., populate the entries) in that table. In one embodiment, the core will record the table address as the base for compartment selection. In certain embodiments, this instruction can only be executed in ring-0 to prevent itself from being abused.

A compartment enter instruction may set the InCompartment bit 204D of the domain prefix register 204 in FIG. 2 to turn off the access permission towards external (e.g., from the compartment) memory, e.g., and the instruction may take no operands in certain embodiments.

A compartment exit instruction may set the InCompartment bit 204D of the domain prefix register 204 in FIG. 2 to turn on the access permission towards external (e.g., from the compartment) memory, e.g., and the instruction may take no operands in certain embodiments. In certain embodiments, the core is expected to execute an instruction outside of any compartment memory. In certain embodiments, the compartment exit instruction is privileged instruction in ring-3 because it turns on the access to native memory and its usage should be controlled (e.g., by preventing execution of instructions in that compartment's memory after execution of the compartment exit instruction. This may be achieved by including a special prefix for opcodes of indirect call/jump or a return.

A compartment switch instruction may take one (e.g., integer) operand, used by the core as an index to the permission table previously setup. In certain embodiments, the index is bound-checked. To prevent untrusted code from maliciously switching compartments, certain embodiments herein disallow any execution of this instruction within compartment memory, e.g., the compartment switch instruction cannot be executed in scripting language (e.g., JITed) code. In one embodiment, a compartment switch instruction reads memory of the permission table, which may be located in memory slice 0, as mentioned above. In an embodiment where threads other than the management thread in the management compartment cannot access memory in that slice, compartment switch instruction temporarily allows access to slice 0, reads the data, and disables the access to slice 0 (e.g., with these three operations done sequentially in an atomic transaction).

Exemplary architectures, systems, etc. that the above may be used in are detailed below.

At least some embodiments of the disclosed technologies can be described in view of the following examples:

Example 1. A hardware processor comprising:
a decoder to decode instructions into decoded instructions;
an execution circuit to execute the decoded instructions to generate one or more memory accesses to memory; and
a compartment manager circuit to:
  determine, when a compartment control register of a processor core is set to an enable value, that a first subset of code requested for execution on the processor core in user privilege is within a first compartment of the memory,
  load a first compartment descriptor for the first compartment into one or more registers of the processor core from the memory,
  check if the first compartment is marked in the first compartment descriptor, within the one or more registers of the processor core, as a management compartment, and
  when the first compartment is marked in the first compartment descriptor as the management compartment, allow the first subset of the code within the first compartment to load a second compartment descriptor for a second compartment of the memory into the one or more registers of the processor core from the memory, switch execution from the first subset of code within the first compartment to a second subset of code in user privilege within the second compartment, allow speculative memory accesses for the second subset of code only within the second compartment, and prevent a memory access outside of the second compartment for the second subset of code as indicated by the second compartment descriptor stored within the one or more registers of the processor core, wherein the second compartment, as indicated by the second compartment descriptor, comprises a plurality of non-continuous slices in a single address space in the memory.

Example 2. The hardware processor of example 1, wherein the compartment manager circuit is to switch execution from the first subset of code in user privilege to the second subset of code in user privilege without switching the processor core to supervisor privilege.

Example 3. The hardware processor of example 1, wherein the decoder is to decode a first instruction into a decoded first instruction and the execution circuit is to execute the decoded first instruction to load a pointer for the second compartment descriptor into a compartment pointer register of the processor core and set a compartment mode register of the processor core to an outside mode that causes the processor core to prevent memory accesses within the second compartment of the memory.

Example 4. The hardware processor of example 3, wherein the decoder is to decode a second instruction into a decoded second instruction and the execution circuit is to execute the decoded second instruction to store the pointer for the second compartment descriptor from the compartment pointer register of the processor core to memory without altering any value in the compartment mode register.

Example 5. The hardware processor of example 3, wherein, for a request from the first compartment marked as the management compartment, the decoder is to decode a second instruction into a decoded second instruction and the execution circuit is to execute the decoded second instruction to load the second compartment descriptor from a location specified by the pointer in the compartment pointer register into the one or more registers of the processor core and set the compartment mode register of the processor core to an inside mode that causes the processor core to only allow memory accesses within the second compartment of the memory.

Example 6. The hardware processor of example 5, wherein, for a request from the second compartment, the decoder is to decode a third instruction into a decoded third instruction and the execution circuit is to execute the decoded third instruction to remove the second compartment descriptor from the one or more registers of the processor core and set the compartment mode register of the processor core to the outside mode that causes the processor core to prevent memory accesses within the second compartment of the memory.

Example 7. The hardware processor of example 3, wherein, for a request from the first compartment marked as the management compartment, the decoder is to decode a second instruction into a decoded second instruction and the execution circuit is to execute the decoded second instruction to load the second compartment descriptor from a location specified by the pointer in the compartment pointer register into the one or more registers of the processor core and set the compartment mode register of the processor core to an inside mode that causes the processor core to only allow memory accesses within the second compartment of the memory and to memory that is not marked as a compartment.

Example 8. The hardware processor of example 1, wherein the decoder is to decode an instruction into a decoded instruction and the execution circuit is to execute the decoded instruction to remove the second compartment from the memory.

Example 9. A method comprising:
determining, when a compartment control register of a hardware processor core is set to an enable value, that a first subset of code requested for execution on the hardware processor core in user privilege is within a first compartment of memory;
loading a first compartment descriptor for the first compartment into one or more registers of the hardware processor core from the memory;
checking if the first compartment is marked in the first compartment descriptor, within the one or more registers of the hardware processor core, as a management compartment; and
when the first compartment is marked in the first compartment descriptor as the management compartment, allowing the first subset of the code within the first compartment to load a second compartment descriptor for a second compartment of the memory into the one or more registers of the hardware processor core from the memory, switching execution from the first subset of code within the first compartment to a second subset of code in user privilege within the second compartment, allowing speculative memory accesses for the second subset of code only within the second compartment, and preventing a memory access outside of the second compartment for the second subset of code as indicated by the second compartment descriptor stored within the one or more registers of the hardware processor core, wherein the second compartment, as indicated by the second compartment descriptor, comprises a plurality of non-continuous slices in a single address space in the memory.

Example 10. The method of example 9, wherein the switching execution is switching execution from the first subset of code in user privilege to the second subset of code in user privilege without switching the hardware processor core to supervisor privilege.

Example 11. The method of example 9, further comprising decoding a first instruction into a decoded first instruction with a decoder of the hardware processor core, and executing the decoded first instruction with an execution circuit of the hardware processor core to load a pointer for the second compartment descriptor into a compartment pointer register of the hardware processor core and set a compartment mode register of the hardware processor core to an outside mode that causes the hardware processor core to prevent memory accesses within the second compartment of the memory.

Example 12. The method of example 11, further comprising decoding a second instruction into a decoded second instruction with the decoder of the hardware processor core, and executing the decoded second instruction with the execution circuit of the hardware processor core to store the pointer for the second compartment descriptor from the compartment pointer register of the hardware processor core to memory without altering any value in the compartment mode register.

Example 13. The method of example 11, further comprising, for a request from the first compartment marked as the management compartment, decoding a second instruction into a decoded second instruction with the decoder of the hardware processor core, and executing the decoded second instruction with the execution circuit of the hardware processor core to load the second compartment descriptor from a location specified by the pointer in the compartment pointer register into the one or more registers of the hardware processor core and set the compartment mode register of the hardware processor core to an inside mode that causes the hardware processor core to only allow memory accesses within the second compartment of the memory.

Example 14. The method of example 13, further comprising, for a request from the second compartment, decoding a third instruction into a decoded third instruction with the decoder of the hardware processor core, and executing the decoded third instruction with the execution circuit of the hardware processor core to remove the second compartment descriptor from the one or more registers of the hardware processor core and set the compartment mode register of the hardware processor core to the outside mode that causes the hardware processor core to prevent memory accesses within the second compartment of the memory.

Example 15. The method of example 11, further comprising, for a request from the first compartment marked as the management compartment, decoding a second instruction into a decoded second instruction with the decoder of the hardware processor core, and executing the decoded second instruction with the execution circuit of the hardware processor core to load the second compartment descriptor from a location specified by the pointer in the compartment pointer register into the one or more registers of the hardware processor core and set the compartment mode register of the hardware processor core to an inside mode that causes the hardware processor core to only allow memory accesses within the second compartment of the memory and to memory that is not marked as a compartment.

Example 16. The method of example 9, further comprising decoding an instruction into a decoded instruction with a decoder of the hardware processor core, and executing the decoded instruction with an execution circuit of the hardware processor core to remove the second compartment from the memory.

Example 17. A non-transitory machine readable medium that stores program code that when executed by a machine causes the machine to perform a method comprising:
determining, when a compartment control register of a hardware processor core is set to an enable value, that a first subset of code requested for execution on the hardware processor core in user privilege is within a first compartment of memory;
loading a first compartment descriptor for the first compartment into one or more registers of the hardware processor core from the memory;
checking if the first compartment is marked in the first compartment descriptor, within the one or more registers of the hardware processor core, as a management compartment; and
when the first compartment is marked in the first compartment descriptor as the management compartment, allowing the first subset of the code within the first compartment to load a second compartment descriptor for a second compartment of the memory into the one or more registers of the hardware processor core from the memory, switching execution from the first subset of code within the first compartment to a second subset of code in user privilege within the second compartment, allowing speculative memory accesses for the second subset of code only within the second compartment, and preventing a memory access outside of the second compartment for the second subset of code as indicated by the second compartment descriptor stored within the one or more registers of the hardware processor core, wherein the second compartment, as indicated by the second compartment descriptor, comprises a plurality of non-continuous slices in a single address space in the memory.

Example 18. The non-transitory machine readable medium of example 17, wherein the switching execution is switching execution from the first subset of code in user privilege to the second subset of code in user privilege without switching the hardware processor core to supervisor privilege.

Example 19. The non-transitory machine readable medium of example 17, wherein the method further comprises decoding a first instruction into a decoded first instruction with a decoder of the hardware processor core, and executing the decoded first instruction with an execution circuit of the hardware processor core to load a pointer for the second compartment descriptor into a compartment pointer register of the hardware processor core and set a compartment mode register of the hardware processor core to an outside mode that causes the hardware processor core to prevent memory accesses within the second compartment of the memory.

Example 20. The non-transitory machine readable medium of example 19, wherein the method further comprises decoding a second instruction into a decoded second instruction with the decoder of the hardware processor core, and executing the decoded second instruction with the execution circuit of the hardware processor core to store the pointer for the second compartment descriptor from the compartment pointer register of the hardware processor core to memory without altering any value in the compartment mode register.

Example 21. The non-transitory machine readable medium of example 19, wherein the method further comprises, for a request from the first compartment marked as the management compartment, decoding a second instruction into a decoded second instruction with the decoder of the hardware processor core, and executing the decoded second instruction with the execution circuit of the hardware processor core to load the second compartment descriptor from a location specified by the pointer in the compartment pointer register into the one or more registers of the hardware processor core and set the compartment mode register of the hardware processor core to an inside mode that causes the hardware processor core to only allow memory accesses within the second compartment of the memory.

Example 22. The non-transitory machine readable medium of example 21, wherein the method further comprises, for a request from the second compartment, decoding a third instruction into a decoded third instruction with the decoder of the hardware processor core, and executing the decoded third instruction with the execution circuit of the hardware processor core to remove the second compartment descriptor from the one or more registers of the hardware processor core and set the compartment mode register of the hardware processor core to the outside mode that causes the hardware processor core to prevent memory accesses within the second compartment of the memory.

Example 23. The non-transitory machine readable medium of example 19, wherein the method further comprises, for a request from the first compartment marked as the management compartment, decoding a second instruction into a decoded second instruction with the decoder of the hardware processor core, and executing the decoded second instruction with the execution circuit of the hardware processor core to load the second compartment descriptor from a location specified by the pointer in the compartment pointer register into the one or more registers of the hardware processor core and set the compartment mode register of the hardware processor core to an inside mode that causes the hardware processor core to only allow memory accesses within the second compartment of the memory and to memory that is not marked as a compartment.

Example 24. The non-transitory machine readable medium of example 17, wherein the method further comprises decoding an instruction into a decoded instruction with a decoder of the hardware processor core, and executing the decoded instruction with an execution circuit of the hardware processor core to remove the second compartment from the memory.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 20A:
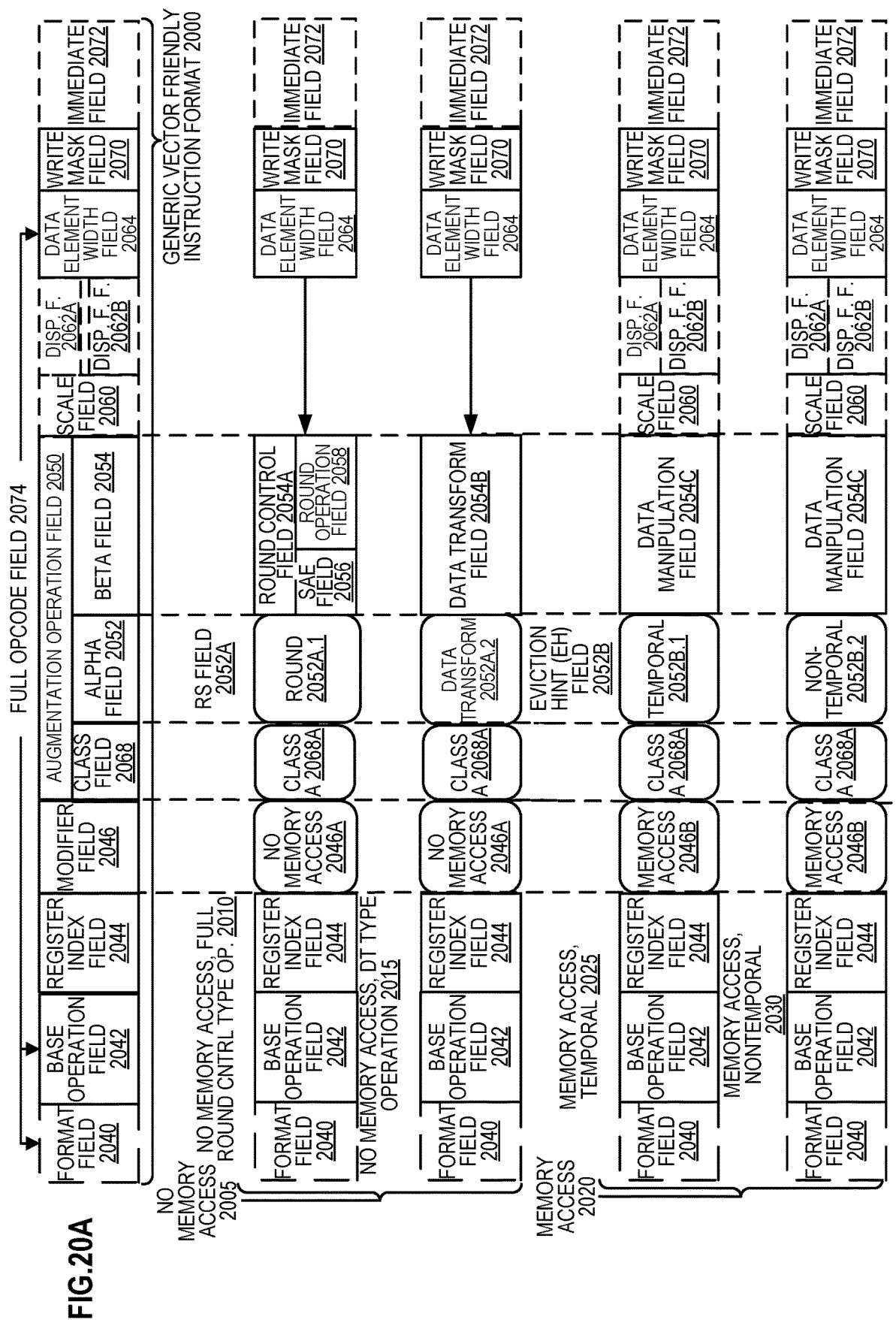
FIG. 20A is a block diagram illustrating a generic vector friendly instruction format and class A instruction templates thereof according to embodiments of the disclosure.
Figure 20B:
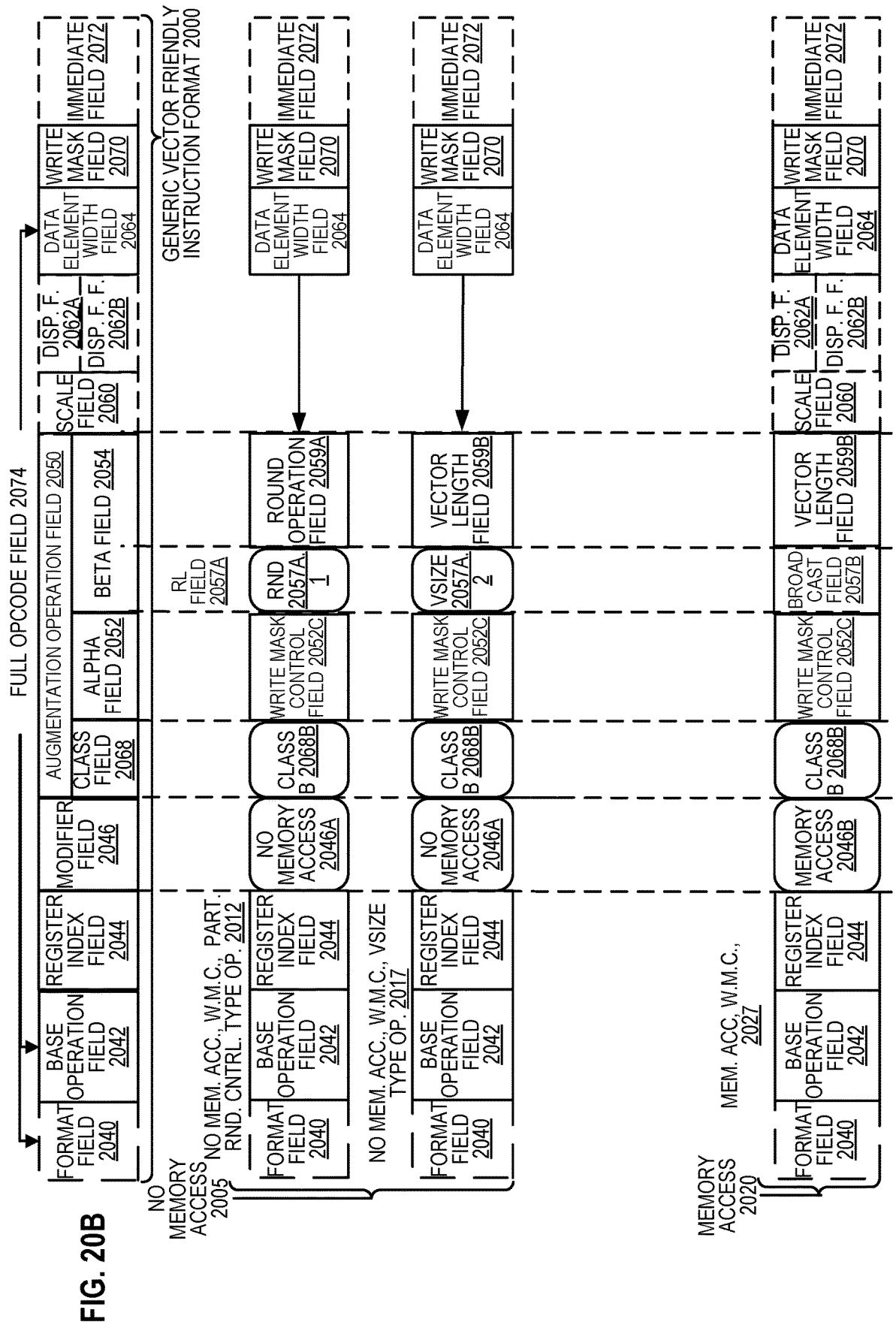
FIG. 20B is a block diagram illustrating the generic vector friendly instruction format and class B instruction templates thereof according to embodiments of the disclosure.

FIGS. 20A-20B are block diagrams illustrating a generic vector friendly instruction format and instruction templates thereof according to embodiments of the disclosure. FIG. 20A is a block diagram illustrating a generic vector friendly instruction format and class A instruction templates thereof according to embodiments of the disclosure; while FIG. 20B is a block diagram illustrating the generic vector friendly instruction format and class B instruction templates thereof according to embodiments of the disclosure. Specifically, a generic vector friendly instruction format 2000 for which are defined class A and class B instruction templates, both of which include no memory access 2005 instruction templates and memory access 2020 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 20A include: 1) within the no memory access 2005 instruction templates there is shown a no memory access, full round control type operation 2010 instruction template and a no memory access, data transform type operation 2015 instruction template; and 2) within the memory access 2020 instruction templates there is shown a memory access, temporal 2025 instruction template and a memory access, non-temporal 2030 instruction template. The class B instruction templates in FIG. 20B include: 1) within the no memory access 2005 instruction templates there is shown a no memory access, write mask control, partial round control type operation 2012 instruction template and a no memory access, write mask control, vsize type operation 2017 instruction template; and 2) within the memory access 2020 instruction templates there is shown a memory access, write mask control 2027 instruction template.

The generic vector friendly instruction format 2000 includes the following fields listed below in the order illustrated in FIGS. 20A-20B.

Format field 2040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2042—its content distinguishes different base operations.

Register index field 2044—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2046—its content distinguishes occurrences of instructions in the generic vector instruction format that specify memory access from those that do not; that is, between no memory access 2005 instruction templates and memory access 2020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2050—its content distinguishes which one of a variety of different operations to be performed in addition to the base operation. This field is context specific. In one embodiment of the disclosure, this field is divided into a class field 2068, an alpha field 2052, and a beta field 2054. The augmentation operation field 2050 allows common groups of operations to be performed in a single instruction rather than 2, 3, or 4 instructions.

Scale field 2060—its content allows for the scaling of the index field's content for memory address generation (e.g., for address generation that uses $2^{scale}*index+base$).

Displacement Field 2062A—its content is used as part of memory address generation (e.g., for address generation that uses $2^{scale}*index+base+displacement$).

Displacement Factor Field 2062B (note that the juxtaposition of displacement field 2062A directly over displacement factor field 2062B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2074 (described later herein) and the data manipulation field 2054C. The displacement field 2062A and the displacement factor field 2062B are optional in the sense that they are not used for the no memory access 2005 instruction templates and/or different embodiments may implement only one or none of the two.

Data element width field 2064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2070 allows for partial vector operations, including loads, stores, arithmetic, logical, etc. While embodiments of the disclosure are described in which the write mask field's 2070 content selects one of a number of write mask registers that contains the write mask to be used (and thus the write mask field's 2070 content indirectly identifies that masking to be performed), alternative embodiments instead or additional allow the mask write field's 2070 content to directly specify the masking to be performed.

Immediate field 2072—its content allows for the specification of an immediate. This field is optional in the sense that is it not present in an implementation of the generic vector friendly format that does not support immediate and it is not present in instructions that do not use an immediate.

Class field 2068—its content distinguishes between different classes of instructions. With reference to FIGS. 20A-B, the contents of this field select between class A and class B instructions. In FIGS. 20A-B, rounded corner squares are used to indicate a specific value is present in a field (e.g., class A 2068A and class B 2068B for the class field 2068 respectively in FIGS. 20A-B).

Instruction Templates of Class A

In the case of the non-memory access 2005 instruction templates of class A, the alpha field 2052 is interpreted as an RS field 2052A, whose content distinguishes which one of the different augmentation operation types are to be performed (e.g., round 2052A.1 and data transform 2052A.2 are respectively specified for the no memory access, round type operation 2010 and the no memory access, data transform type operation 2015 instruction templates), while the beta field 2054 distinguishes which of the operations of the specified type is to be performed. In the no memory access 2005 instruction templates, the scale field 2060, the displacement field 2062A, and the displacement scale filed 2062B are not present.

No-Memory Access Instruction Templates—Full Round Control Type Operation

In the no memory access full round control type operation 2010 instruction template, the beta field 2054 is interpreted as a round control field 2054A, whose content(s) provide static rounding. While in the described embodiments of the disclosure the round control field 2054A includes a suppress all floating point exceptions (SAE) field 2056 and a round operation control field 2058, alternative embodiments may support may encode both these concepts into the same field or only have one or the other of these concepts/fields (e.g., may have only the round operation control field 2058).

SAE field 2056—its content distinguishes whether or not to disable the exception event reporting; when the SAE field's 2056 content indicates suppression is enabled, a given instruction does not report any kind of floating-point exception flag and does not raise any floating point exception handler.

Round operation control field 2058—its content distinguishes which one of a group of rounding operations to perform (e.g., Round-up, Round-down, Round-towards-zero and Round-to-nearest). Thus, the round operation control field 2058 allows for the changing of the rounding mode on a per instruction basis. In one embodiment of the disclosure where a processor includes a control register for specifying rounding modes, the round operation control field's 2050 content overrides that register value.

No Memory Access Instruction Templates—Data Transform Type Operation

In the no memory access data transform type operation 2015 instruction template, the beta field 2054 is interpreted as a data transform field 2054B, whose content distinguishes which one of a number of data transforms is to be performed (e.g., no data transform, swizzle, broadcast).

In the case of a memory access 2020 instruction template of class A, the alpha field 2052 is interpreted as an eviction hint field 2052B, whose content distinguishes which one of the eviction hints is to be used (in FIG. 20A, temporal 2052B.1 and non-temporal 2052B.2 are respectively specified for the memory access, temporal 2025 instruction template and the memory access, non-temporal 2030 instruction template), while the beta field 2054 is interpreted as a data manipulation field 2054C, whose content distinguishes which one of a number of data manipulation operations (also known as primitives) is to be performed (e.g., no manipulation; broadcast; up conversion of a source; and down conversion of a destination). The memory access 2020 instruction templates include the scale field 2060, and optionally the displacement field 2062A or the displacement scale field 2062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2052 is interpreted as a write mask control (Z) field 2052C, whose content distinguishes whether the write masking controlled by the write mask field 2070 should be a merging or a zeroing.

In the case of the non-memory access 2005 instruction templates of class B, part of the beta field 2054 is interpreted as an RL field 2057A, whose content distinguishes which one of the different augmentation operation types are to be performed (e.g., round 2057A.1 and vector length (VSIZE) 2057A.2 are respectively specified for the no memory access, write mask control, partial round control type operation 2012 instruction template and the no memory access, write mask control, VSIZE type operation 2017 instruction template), while the rest of the beta field 2054 distinguishes which of the operations of the specified type is to be performed. In the no memory access 2005 instruction templates, the scale field 2060, the displacement field 2062A, and the displacement scale filed 2062B are not present.

In the no memory access, write mask control, partial round control type operation 2010 instruction template, the rest of the beta field 2054 is interpreted as a round operation field 2059A and exception event reporting is disabled (a given instruction does not report any kind of floating-point exception flag and does not raise any floating point exception handler).

Round operation control field 2059A—just as round operation control field 2058, its content distinguishes which one of a group of rounding operations to perform (e.g., Round-up, Round-down, Round-towards-zero and Round-to-nearest). Thus, the round operation control field 2059A allows for the changing of the rounding mode on a per instruction basis. In one embodiment of the disclosure where a processor includes a control register for specifying rounding modes, the round operation control field's 2050 content overrides that register value.

In the no memory access, write mask control, VSIZE type operation 2017 instruction template, the rest of the beta field 2054 is interpreted as a vector length field 2059B, whose content distinguishes which one of a number of data vector lengths is to be performed on (e.g., 128, 256, or 512 byte).

In the case of a memory access 2020 instruction template of class B, part of the beta field 2054 is interpreted as a broadcast field 2057B, whose content distinguishes whether or not the broadcast type data manipulation operation is to be performed, while the rest of the beta field 2054 is interpreted the vector length field 2059B. The memory access 2020 instruction templates include the scale field 2060, and optionally the displacement field 2062A or the displacement scale field 2062B.

With regard to the generic vector friendly instruction format 2000, a full opcode field 2074 is shown including the format field 2040, the base operation field 2042, and the data element width field 2064. While one embodiment is shown where the full opcode field 2074 includes all of these fields, the full opcode field 2074 includes less than all of these fields in embodiments that do not support all of them. The full opcode field 2074 provides the operation code (opcode).

The augmentation operation field 2050, the data element width field 2064, and the write mask field 2070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 21 is a block diagram illustrating an exemplary specific vector friendly instruction format according to embodiments of the disclosure. FIG. 21 shows a specific vector friendly instruction format 2100 that is specific in the sense that it specifies the location, size, interpretation, and order of the fields, as well as values for some of those fields. The specific vector friendly instruction format 2100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 20 into which the fields from FIG. 21 map are illustrated.

It should be understood that, although embodiments of the disclosure are described with reference to the specific vector friendly instruction format 2100 in the context of the generic vector friendly instruction format 2000 for illustrative purposes, the disclosure is not limited to the specific vector friendly instruction format 2100 except where claimed. For example, the generic vector friendly instruction format 2000 contemplates a variety of possible sizes for the various fields, while the specific vector friendly instruction format 2100 is shown as having fields of specific sizes. By way of specific example, while the data element width field 2064 is illustrated as a one bit field in the specific vector friendly instruction format 2100, the disclosure is not so limited (that is, the generic vector friendly instruction format 2000 contemplates other sizes of the data element width field 2064).

The generic vector friendly instruction format 2000 includes the following fields listed below in the order illustrated in FIG. 21A.

EVEX Prefix (Bytes 0-3) 2102—is encoded in a four-byte form.

Format Field 2040 (EVEX Byte 0, bits [7:0])—the first byte (EVEX Byte 0) is the format field 2040 and it contains 0x62 (the unique value used for distinguishing the vector friendly instruction format in one embodiment of the disclosure).

The second-fourth bytes (EVEX Bytes 1-3) include a number of bit fields providing specific capability.

REX field 2105 (EVEX Byte 1, bits [7-5])—consists of a EVEX.R bit field (EVEX Byte 1, bit [7]—R), EVEX.X bit field (EVEX byte 1, bit [6]—X), and 2057BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 2010—this is the first part of the REX' field 2010 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2115 (EVEX byte 1, bits [3:0]—mmmm)—its content encodes an implied leading opcode byte (0F, 0F 38, or 0F 3).

Data element width field 2064 (EVEX byte 2, bit [7]—W)—is represented by the notation EVEX.W. EVEX.W is used to define the granularity (size) of the datatype (either 32-bit data elements or 64-bit data elements).

EVEX.vvvv 2120 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 2120 encodes the 4 low-order bits of the first source register specifier stored in inverted (1s complement) form. Depending on the instruction, an extra different EVEX bit field is used to extend the specifier size to 32 registers.

EVEX.U 2068 Class field (EVEX byte 2, bit [2]—U)—If EVEX.U=0, it indicates class A or EVEX.U0 if EVEX.U=1, it indicates class B or EVEX.U1.

Prefix encoding field 2125 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2052 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 2054 (EVEX byte 3, bits [6:4]—SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 2010—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2070 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 2130 (Byte 4) is also known as the opcode byte. Part of the opcode is specified in this field.

MOD R/M Field 2140 (Byte 5) includes MOD field 2142, Reg field 2144, and R/M field 2146. As previously described, the MOD field's 2142 content distinguishes between memory access and non-memory access operations. The role of Reg field 2144 can be summarized to two situations: encoding either the destination register operand or a source register operand, or be treated as an opcode extension and not used to encode any instruction operand. The role of RIM field 2146 may include the following: encoding the instruction operand that references a memory address, or encoding either the destination register operand or a source register operand.

Scale, Index, Base (SIB) Byte (Byte 6)—As previously described, the scale field's 2050 content is used for memory address generation. SIB.xxx 2154 and SIB.bbb 2156—the contents of these fields have been previously referred to with regard to the register indexes Xxxx and Bbbb.

Displacement field 2062A (Bytes 7-10)—when MOD field 2142 contains 10, bytes 7-10 are the displacement field 2062A, and it works the same as the legacy 32-bit displacement (disp32) and works at byte granularity.

Displacement factor field 2062B (Byte 7)—when MOD field 2142 contains 01, byte 7 is the displacement factor field 2062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2062B is a reinterpretation of disp8; when using displacement factor field 2062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2062B substitutes the legacy x86 instruction set 8-bit displacement. Thus, the displacement factor field 2062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 2072 operates as previously described.

Full Opcode Field

FIG. 21B is a block diagram illustrating the fields of the specific vector friendly instruction format 2100 that make up the full opcode field 2074 according to one embodiment of the disclosure. Specifically, the full opcode field 2074 includes the format field 2040, the base operation field 2042, and the data element width (W) field 2064. The base operation field 2042 includes the prefix encoding field 2125, the opcode map field 2115, and the real opcode field 2130.

Register Index Field

FIG. 21C is a block diagram illustrating the fields of the specific vector friendly instruction format 2100 that make up the register index field 2044 according to one embodiment of the disclosure. Specifically, the register index field 2044 includes the REX field 2105, the REX' field 2110, the MODR/M.reg field 2144, the MODR/M.r/m field 2146, the VVVV field 2120, xxx field 2154, and the bbb field 2156.

format 2100 operates on these overlaid register file as illustrated in the below tables.

| Adjustable Vector Length | Class | Operations | Registers |
|---|---|---|---|
| Instruction Templates that do not include the vector length field 2059B | A (FIG. 20A; U = 0) | 2010, 2015, 2025, 2030 | zmm registers (the vector length is 64 byte) |
| | B (FIG. 20B; U = 1) | 2012 | zmm registers (the vector length is 64 byte) |
| Instruction templates that do include the vector length field 2059B | B (FIG. 20B; U = 1) | 2017, 2027 | zmm, ymm, or xmm registers (the vector length is 64 byte, 32 byte, or 16 byte) depending on the vector length field 2059B |

Augmentation Operation Field

Figure 21D:
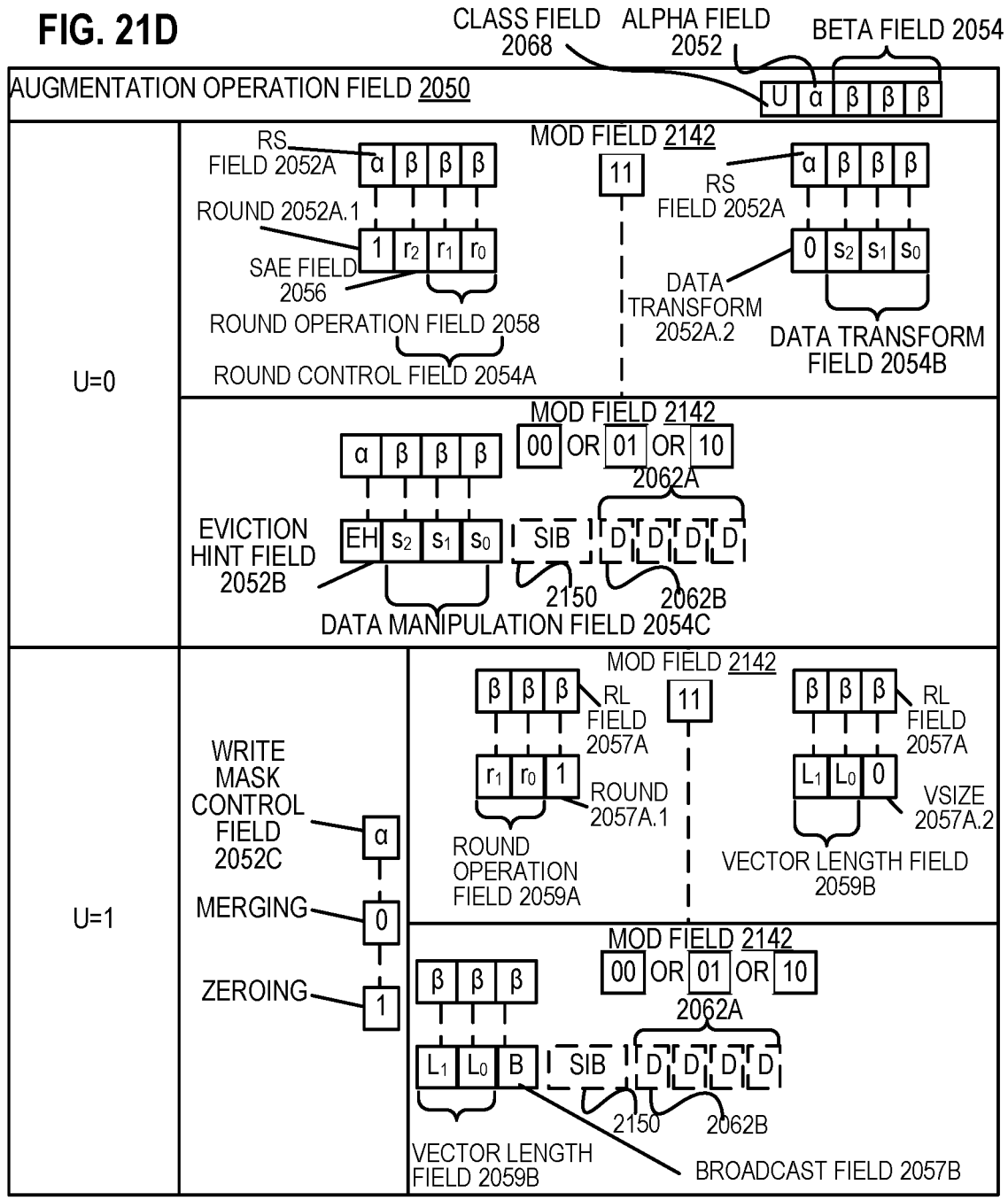
FIG. 21D is a block diagram illustrating the fields of the specific vector friendly instruction format in FIG. 21A that make up the augmentation operation field 2050 according to one embodiment of the disclosure.

FIG. 21D is a block diagram illustrating the fields of the specific vector friendly instruction format 2100 that make up the augmentation operation field 2050 according to one embodiment of the disclosure. When the class (U) field 2068 contains 0, it signifies EVEX.U0 (class A 2068A); when it contains 1, it signifies EVEX.U1 (class B 2068B). When U=0 and the MOD field 2142 contains 11 (signifying a no memory access operation), the alpha field 2052 (EVEX byte 3, bit [7]—EH) is interpreted as the rs field 2052A. When the rs field 2052A contains a 1 (round 2052A.1), the beta field 2054 (EVEX byte 3, bits [6:4]—SSS) is interpreted as the round control field 2054A. The round control field 2054A includes a one bit SAE field 2056 and a two bit round operation field 2058. When the rs field 2052A contains a 0 (data transform 2052A.2), the beta field 2054 (EVEX byte 3, bits [6:4]—SSS) is interpreted as a three bit data transform field 2054B. When U=0 and the MOD field 2142 contains 00, 01, or 10 (signifying a memory access operation), the alpha field 2052 (EVEX byte 3, bit [7]—EH) is interpreted as the eviction hint (EH) field 2052B and the beta field 2054 (EVEX byte 3, bits [6:4]—SSS) is interpreted as a three bit data manipulation field 2054C.

When U=1, the alpha field 2052 (EVEX byte 3, bit [7]—EH) is interpreted as the write mask control (Z) field 2052C. When U=1 and the MOD field 2142 contains 11 (signifying a no memory access operation), part of the beta field 2054 (EVEX byte 3, bit [4]—$S_0$) is interpreted as the RL field 2057A; when it contains a 1 (round 2057A.1) the rest of the beta field 2054 (EVEX byte 3, bit [6-5]—$S_{2-1}$) is interpreted as the round operation field 2059A, while when the RL field 2057A contains a 0 (VSIZE 2057.A2) the rest of the beta field 2054 (EVEX byte 3, bit [6-5]—$S_{2-1}$) is interpreted as the vector length field 2059B (EVEX byte 3, bit [6-5]—$L_{1-0}$). When U=1 and the MOD field 2142 contains 00, 01, or 10 (signifying a memory access operation), the beta field 2054 (EVEX byte 3, bits [6:4]—SSS) is interpreted as the vector length field 2059B (EVEX byte 3, bit [6-5]—$L_{1-0}$) and the broadcast field 2057B (EVEX byte 3, bit [4]—B).

Exemplary Register Architecture

Figure 22:
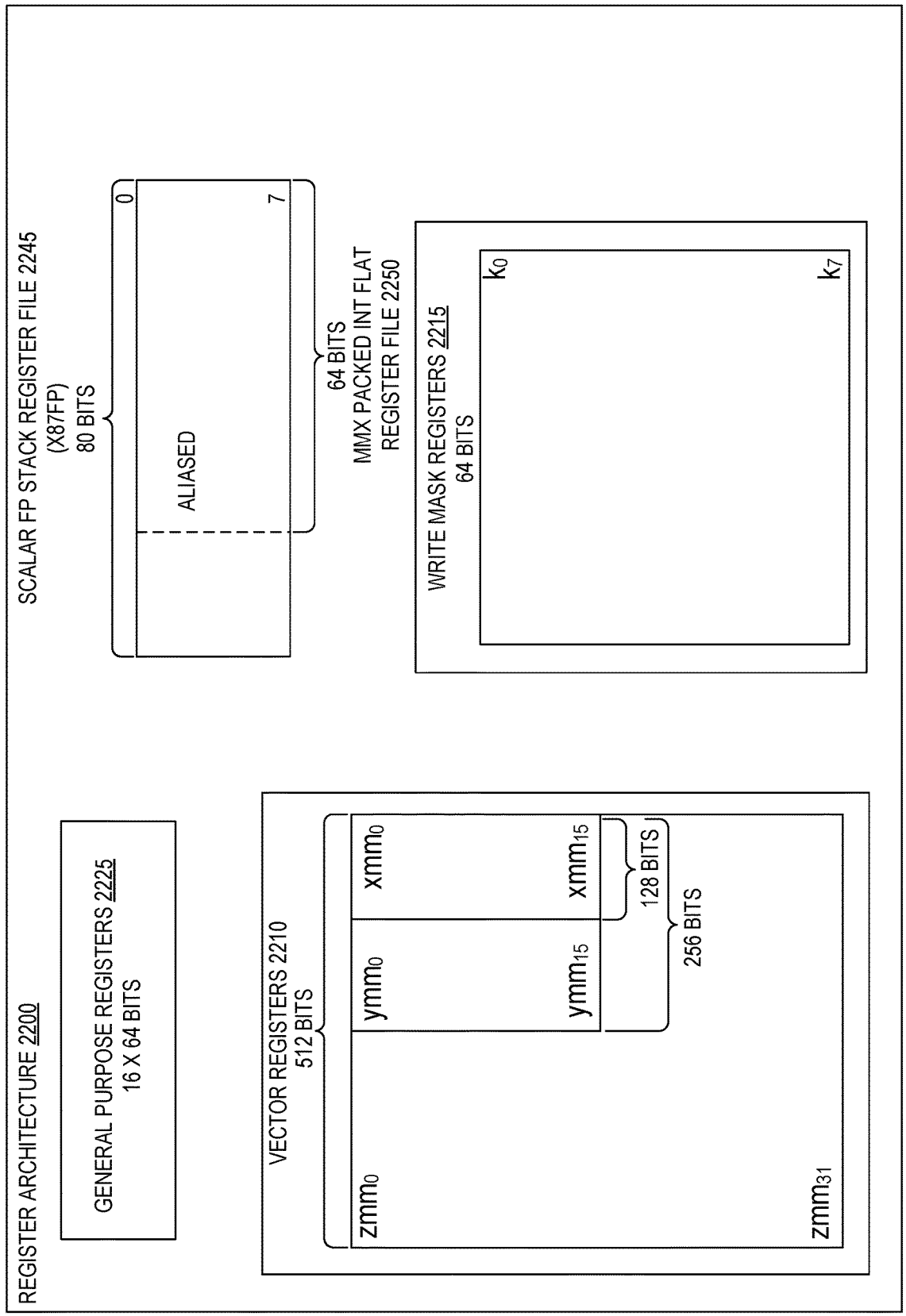
FIG. 22 is a block diagram of a register architecture according to one embodiment of the disclosure

FIG. 22 is a block diagram of a register architecture 2200 according to one embodiment of the disclosure. In the embodiment illustrated, there are 32 vector registers 2210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction In other words, the vector length field 2059B selects between a maximum length and one or more other shorter lengths, where each such shorter length is half the length of the preceding length; and instructions templates without the vector length field 2059B operate on the maximum vector length. Further, in one embodiment, the class B instruction templates of the specific vector friendly instruction format 2100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2215—in the embodiment illustrated, there are 8 write mask registers (k0 through k7), each 64 bits in size. In an alternate embodiment, the write mask registers 2215 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 2225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2245, on which is aliased the MMX packed integer flat register file 2250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 23A is a block diagram illustrating both an exemplary in-order pipeline and an exemplary register renaming, out-of-order issue/execution pipeline according to embodiments of the disclosure. FIG. 23B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 23A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 23A, a processor pipeline 2300 includes a fetch stage 2302, a length decode stage 2304, a decode stage 2306, an allocation stage 2308, a renaming stage 2310, a scheduling (also known as a dispatch or issue) stage 2312, a register read/memory read stage 2314, an execute stage 2316, a write back/memory write stage 2318, an exception handling stage 2322, and a commit stage 2324.

FIG. 23B shows processor core 2390 including a front end unit 2330 coupled to an execution engine unit 2350, and both are coupled to a memory unit 2370. The core 2390 may be a reduced instruction set computing (RISC) core, a complex instruction set computing (CISC) core, a very long instruction word (VLIW) core, or a hybrid or alternative core type. As yet another option, the core 2390 may be a special-purpose core, such as, for example, a network or communication core, compression engine, coprocessor core, general purpose computing graphics processing unit (GPGPU) core, graphics core, or the like.

The front end unit 2330 includes a branch prediction unit 2332 coupled to an instruction cache unit 2334, which is coupled to an instruction translation lookaside buffer (TLB) 2336, which is coupled to an instruction fetch unit 2338, which is coupled to a decode unit 2340. The decode unit 2340 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 2340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2390 includes a microcode ROM or other medium that stores microcode for certain macro-instructions (e.g., in decode unit 2340 or otherwise within the front end unit 2330). The decode unit 2340 is coupled to a rename/allocator unit 2352 in the execution engine unit 2350.

The execution engine unit 2350 includes the rename/allocator unit 2352 coupled to a retirement unit 2354 and a set of one or more scheduler unit(s) 2356. The scheduler unit(s) 2356 represents any number of different schedulers, including reservations stations, central instruction window, etc. The scheduler unit(s) 2356 is coupled to the physical register file(s) unit(s) 2358. Each of the physical register file(s) units 2358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2358 comprises a vector registers unit, a write mask registers unit, and a scalar registers unit. These register units may provide architectural vector registers, vector mask registers, and general purpose registers. The physical register file(s) unit(s) 2358 is overlapped by the retirement unit 2354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2354 and the physical register file(s) unit(s) 2358 are coupled to the execution cluster(s) 2360. The execution cluster(s) 2360 includes a set of one or more execution units 2362 and a set of one or more memory access units 2364. The execution units 2362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2356, physical register file(s) unit(s) 2358, and execution cluster(s) 2360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2364). It should also be understood that where separate pipelines are used, one or more of these pipelines may be out-of-order issue/execution and the rest in-order.

The set of memory access units 2364 is coupled to the memory unit 2370, which includes a data TLB unit 2372 coupled to a data cache unit 2374 coupled to a level 2 (L2) cache unit 2376. In one exemplary embodiment, the memory access units 2364 may include a load unit, a store address unit, and a store data unit, each of which is coupled to the data TLB unit 2372 in the memory unit 2370. The instruction cache unit 2334 is further coupled to a level 2 (L2) cache unit 2376 in the memory unit 2370. The L2 cache unit 2376 is coupled to one or more other levels of cache and eventually to a main memory.

In certain embodiments, a prefetch circuit 2378 is included to prefetch data, for example, to predict access addresses and bring the data for those addresses into a cache or caches (e.g., from memory 2380).

By way of example, the exemplary register renaming, out-of-order issue/execution core architecture may implement the pipeline 2300 as follows: 1) the instruction fetch 2338 performs the fetch and length decoding stages 2302 and 2304; 2) the decode unit 2340 performs the decode stage 2306; 3) the rename/allocator unit 2352 performs the allocation stage 2308 and renaming stage 2310; 4) the scheduler unit(s) 2356 performs the schedule stage 2312; 5) the physical register file(s) unit(s) 2358 and the memory unit 2370 perform the register read/memory read stage 2314; the execution cluster 2360 perform the execute stage 2316; 6) the memory unit 2370 and the physical register file(s) unit(s) 2358 perform the write back/memory write stage 2318; 7) various units may be involved in the exception handling stage 2322; and 8) the retirement unit 2354 and the physical register file(s) unit(s) 2358 perform the commit stage 2324.

The core 2390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 2334/2374 and a shared L2 cache unit 2376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 24B:
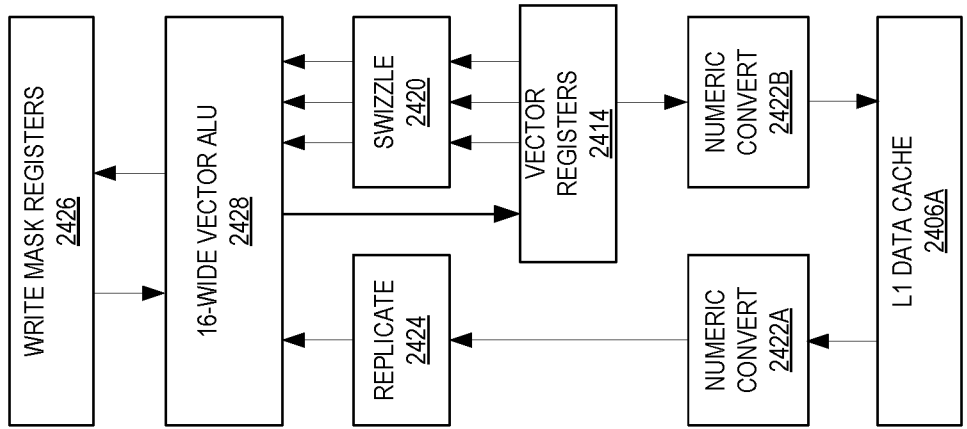
FIG. 24B is an expanded view of part of the processor core in FIG. 24A according to embodiments of the disclosure.
Figure 24A:
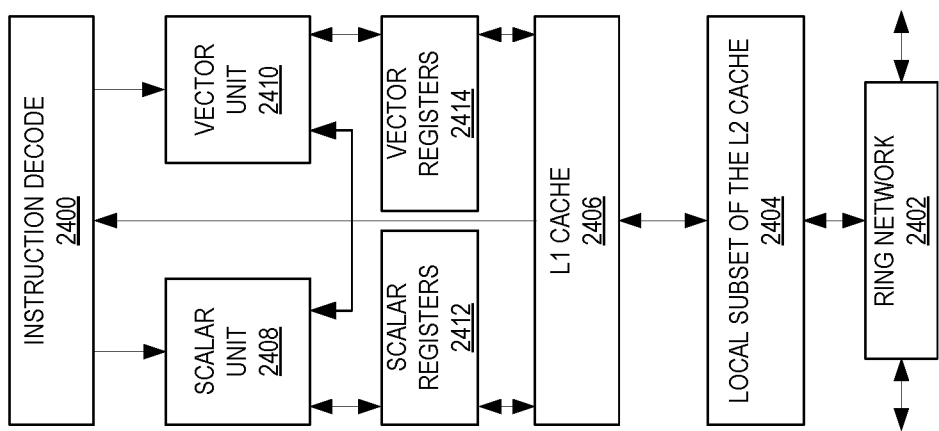
FIG. 24A is a block diagram of a single processor core, along with its connection to the on-die interconnect network and with its local subset of the Level 2 (L2) cache, according to embodiments of the disclosure.

FIGS. 24A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 24A is a block diagram of a single processor core, along with its connection to the on-die interconnect network 2402 and with its local subset of the Level 2 (L2) cache 2404, according to embodiments of the disclosure. In one embodiment, an instruction decode unit 2400 supports the x86 instruction set with a packed data instruction set extension. An L1 cache 2406 allows low-latency accesses to cache memory into the scalar and vector units. While in one embodiment (to simplify the design), a scalar unit 2408 and a vector unit 2410 use separate register sets (respectively, scalar registers 2412 and vector registers 2414) and data transferred between them is written to memory and then read back in from a level 1 (L1) cache 2406, alternative embodiments of the disclosure may use a different approach (e.g., use a single register set or include a communication path that allow data to be transferred between the two register files without being written and read back).

The local subset of the L2 cache 2404 is part of a global L2 cache that is divided into separate local subsets, one per processor core. Each processor core has a direct access path to its own local subset of the L2 cache 2404. Data read by a processor core is stored in its L2 cache subset 2404 and can be accessed quickly, in parallel with other processor cores accessing their own local L2 cache subsets. Data written by a processor core is stored in its own L2 cache subset 2404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 24B is an expanded view of part of the processor core in FIG. 24A according to embodiments of the disclosure. FIG. 24B includes an L1 data cache 2406A part of the L1 cache 2404, as well as more detail regarding the vector unit 2410 and the vector registers 2414. Specifically, the vector unit 2410 is a 16-wide vector processing unit (VPU) (see the 16-wide ALU 2428), which executes one or more of integer, single-precision float, and double-precision float instructions. The VPU supports swizzling the register inputs with swizzle unit 2420, numeric conversion with numeric convert units 2422A-B, and replication with replication unit 2424 on the memory input. Write mask registers 2426 allow predicating resulting vector writes.

Figure 25:
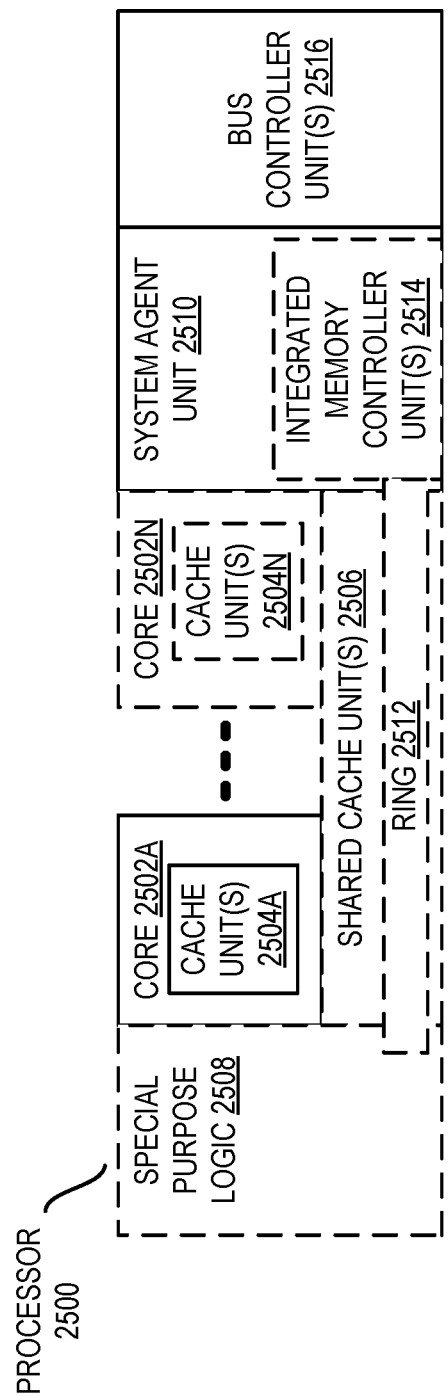
FIG. 25 is a block diagram of a processor that may have more than one core, may have an integrated memory controller, and may have integrated graphics according to embodiments of the disclosure.

FIG. 25 is a block diagram of a processor 2500 that may have more than one core, may have an integrated memory controller, and may have integrated graphics according to embodiments of the disclosure. The solid lined boxes in FIG. 25 illustrate a processor 2500 with a single core 2502A, a system agent 2510, a set of one or more bus controller units 2516, while the optional addition of the dashed lined boxes illustrates an alternative processor 2500 with multiple cores 2502A-N, a set of one or more integrated memory controller unit(s) 2514 in the system agent unit 2510, and special purpose logic 2508.

Thus, different implementations of the processor 2500 may include: 1) a CPU with the special purpose logic 2508 being integrated graphics and/or scientific (throughput) logic (which may include one or more cores), and the cores 2502A-N being one or more general purpose cores (e.g., general purpose in-order cores, general purpose out-of-order cores, a combination of the two); 2) a coprocessor with the cores 2502A-N being a large number of special purpose cores intended primarily for graphics and/or scientific (throughput); and 3) a coprocessor with the cores 2502A-N being a large number of general purpose in-order cores. Thus, the processor 2500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2506, and external memory (not shown) coupled to the set of integrated memory controller units 2514. The set of shared cache units 2506 may include one or more mid-level caches, such as level 2 (L2), level 3 (L3), level 4 (L4), or other levels of cache, a last level cache (LLC), and/or combinations thereof. While in one embodiment a ring based interconnect unit 2512 interconnects the integrated graphics logic 2508, the set of shared cache units 2506, and the system agent unit 2510/integrated memory controller unit(s) 2514, alternative embodiments may use any number of well-known techniques for interconnecting such units. In one embodiment, coherency is maintained between one or more cache units 2506 and cores 2502A-N.

In some embodiments, one or more of the cores 2502A-N are capable of multithreading. The system agent 2510 includes those components coordinating and operating cores 2502A-N. The system agent unit 2510 may include for example a power control unit (PCU) and a display unit. The PCU may be or include logic and components needed for regulating the power state of the cores 2502A-N and the integrated graphics logic 2508. The display unit is for driving one or more externally connected displays.

The cores 2502A-N may be homogenous or heterogeneous in terms of architecture instruction set; that is, two or more of the cores 2502A-N may be capable of execution the same instruction set, while others may be capable of executing only a subset of that instruction set or a different instruction set.

Exemplary Computer Architectures

FIGS. 26-29 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 26:
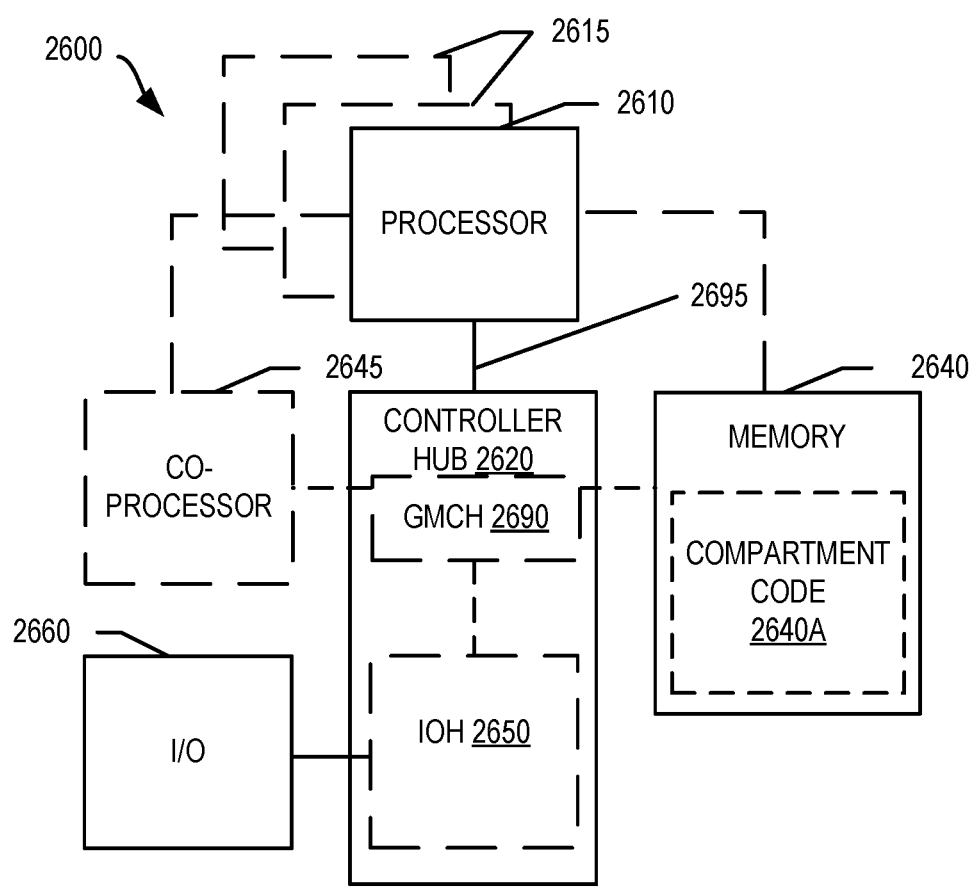
FIG. 26 is a block diagram of a system in accordance with one embodiment of the present disclosure.

Referring now to FIG. 26, shown is a block diagram of a system 2600 in accordance with one embodiment of the present disclosure. The system 2600 may include one or more processors 2610, 2615, which are coupled to a controller hub 2620. In one embodiment the controller hub 2620 includes a graphics memory controller hub (GMCH) 2690 and an Input/Output Hub (IOH) 2650 (which may be on separate chips); the GMCH 2690 includes memory and graphics controllers to which are coupled memory 2640 and a coprocessor 2645; the IOH 2650 is couples input/output (I/O) devices 2660 to the GMCH 2690. Alternatively, one or both of the memory and graphics controllers are integrated within the processor (as described herein), the memory 2640 and the coprocessor 2645 are coupled directly to the processor 2610, and the controller hub 2620 in a single chip with the IOH 2650. Memory 2640 may include compartment code 2640A, for example, to store code that when executed causes a processor to perform any method of this disclosure.

The optional nature of additional processors 2615 is denoted in FIG. 26 with broken lines. Each processor 2610, 2615 may include one or more of the processing cores described herein and may be some version of the processor 2500.

The memory 2640 may be, for example, dynamic random access memory (DRAM), phase change memory (PCM), or a combination of the two. For at least one embodiment, the controller hub 2620 communicates with the processor(s) 2610, 2615 via a multi-drop bus, such as a frontside bus (FSB), point-to-point interface such as Quickpath Interconnect (QPI), or similar connection 2695.

In one embodiment, the coprocessor 2645 is a special-purpose processor, such as, for example, a high-throughput MIC processor, a network or communication processor, compression engine, graphics processor, GPGPU, embedded processor, or the like. In one embodiment, controller hub 2620 may include an integrated graphics accelerator.

There can be a variety of differences between the physical resources 2610, 2615 in terms of a spectrum of metrics of merit including architectural, microarchitectural, thermal, power consumption characteristics, and the like.

In one embodiment, the processor 2610 executes instructions that control data processing operations of a general type. Embedded within the instructions may be coprocessor instructions. The processor 2610 recognizes these coprocessor instructions as being of a type that should be executed by the attached coprocessor 2645. Accordingly, the processor 2610 issues these coprocessor instructions (or control signals representing coprocessor instructions) on a coprocessor bus or other interconnect, to coprocessor 2645. Coprocessor(s) 2645 accept and execute the received coprocessor instructions.

Figure 27:
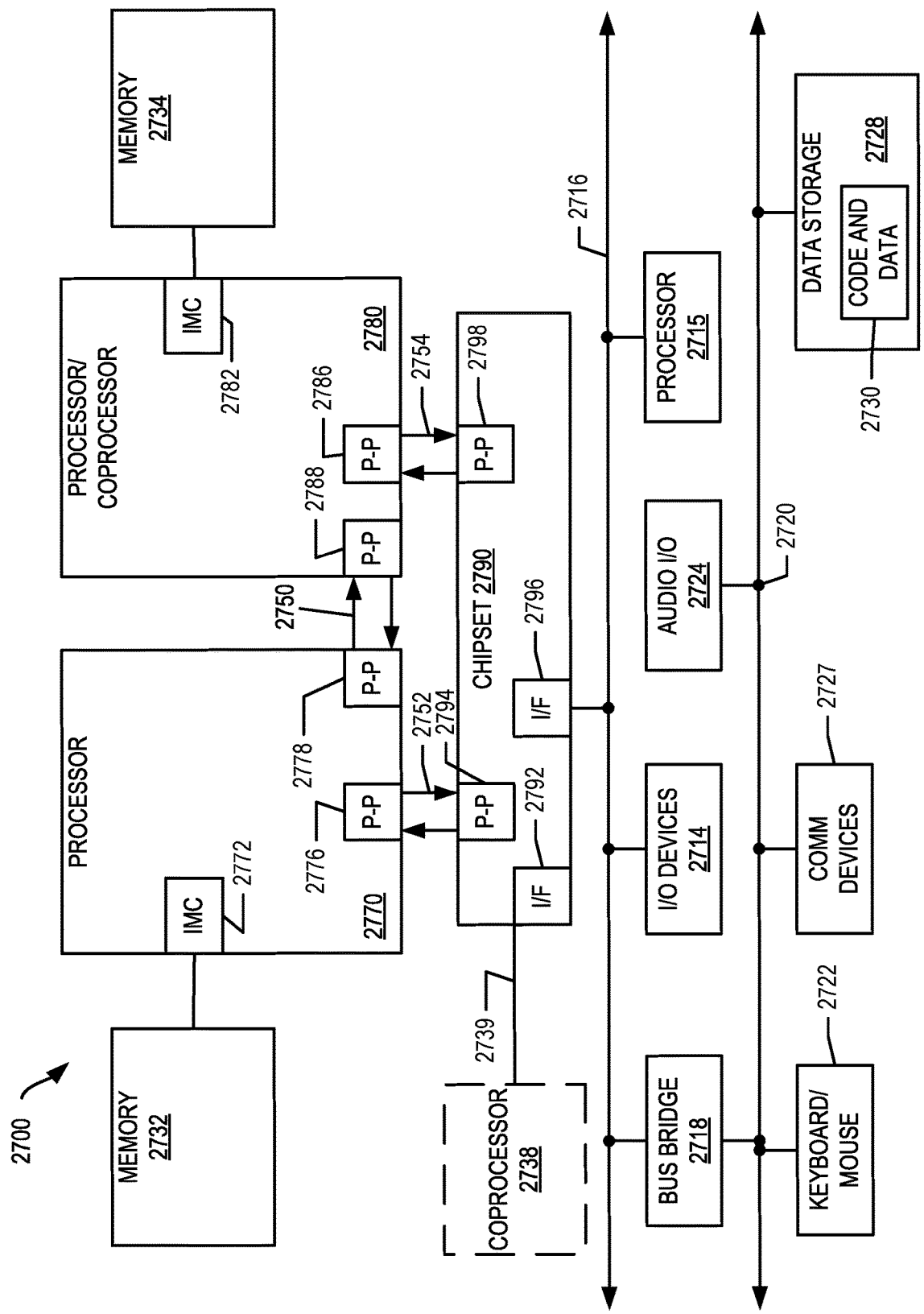
FIG. 27 is a block diagram of a more specific exemplary system in accordance with an embodiment of the present disclosure.

Referring now to FIG. 27, shown is a block diagram of a first more specific exemplary system 2700 in accordance with an embodiment of the present disclosure. As shown in FIG. 27, multiprocessor system 2700 is a point-to-point interconnect system, and includes a first processor 2770 and a second processor 2780 coupled via a point-to-point interconnect 2750. Each of processors 2770 and 2780 may be some version of the processor 2500. In one embodiment of the disclosure, processors 2770 and 2780 are respectively processors 2610 and 2615, while coprocessor 2738 is coprocessor 2645. In another embodiment, processors 2770 and 2780 are respectively processor 2610 coprocessor 2645.

Processors 2770 and 2780 are shown including integrated memory controller (IMC) units 2772 and 2782, respectively. Processor 2770 also includes as part of its bus controller units point-to-point (P-P) interfaces 2776 and 2778; similarly, second processor 2780 includes P-P interfaces 2786 and 2788. Processors 2770, 2780 may exchange information via a point-to-point (P-P) interface 2750 using P-P interface circuits 2778, 2788. As shown in FIG. 27, IMCs 2772 and 2782 couple the processors to respective memories, namely a memory 2732 and a memory 2734, which may be portions of main memory locally attached to the respective processors.

Processors 2770, 2780 may each exchange information with a chipset 2790 via individual P-P interfaces 2752, 2754 using point to point interface circuits 2776, 2794, 2786, 2798. Chipset 2790 may optionally exchange information with the coprocessor 2738 via a high-performance interface 2739. In one embodiment, the coprocessor 2738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2790 may be coupled to a first bus 2716 via an interface 2796. In one embodiment, first bus 2716 may be a Peripheral Component Interconnect (PCI) bus, or a bus such as a PCI Express bus or another third generation I/O interconnect bus, although the scope of the present disclosure is not so limited.

As shown in FIG. 27, various I/O devices 2714 may be coupled to first bus 2716, along with a bus bridge 2718 which couples first bus 2716 to a second bus 2720. In one embodiment, one or more additional processor(s) 2715, such as coprocessors, high-throughput MIC processors, GPGPU's, accelerators (such as, e.g., graphics accelerators or digital signal processing (DSP) units), field programmable gate arrays, or any other processor, are coupled to first bus 2716. In one embodiment, second bus 2720 may be a low pin count (LPC) bus. Various devices may be coupled to a second bus 2720 including, for example, a keyboard and/or mouse 2722, communication devices 2727 and a storage unit 2728 such as a disk drive or other mass storage device which may include instructions/code and data 2730, in one embodiment. Further, an audio I/O 2724 may be coupled to the second bus 2720. Note that other architectures are possible. For example, instead of the point-to-point architecture of FIG. 27, a system may implement a multi-drop bus or other such architecture.

Figure 28:
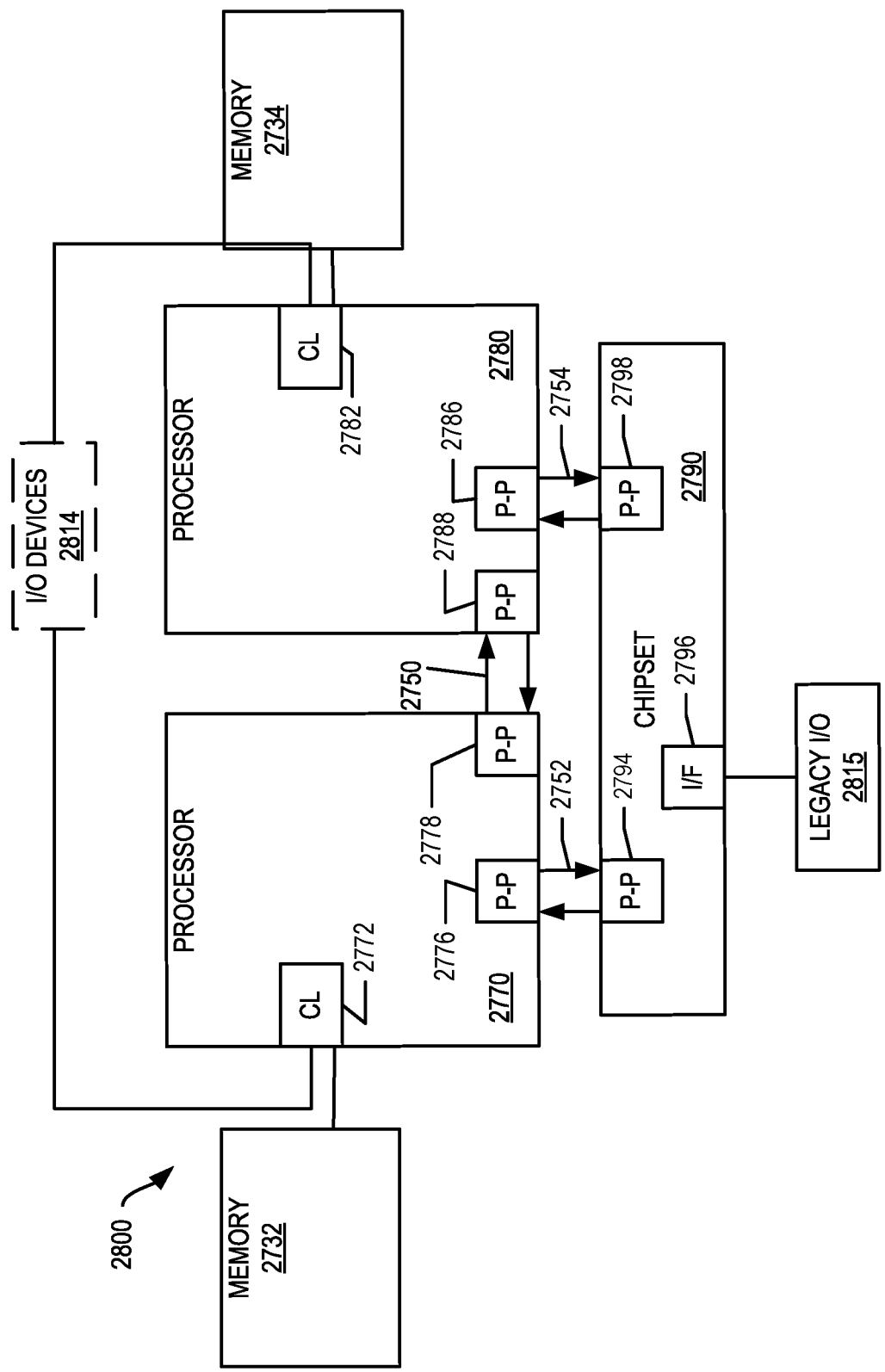
FIG. 28, shown is a block diagram of a second more specific exemplary system in accordance with an embodiment of the present disclosure.

Referring now to FIG. 28, shown is a block diagram of a second more specific exemplary system 2800 in accordance with an embodiment of the present disclosure. Like elements in FIGS. 27 and 28 bear like reference numerals, and certain aspects of FIG. 27 have been omitted from FIG. 28 in order to avoid obscuring other aspects of FIG. 28.

FIG. 28 illustrates that the processors 2770, 2780 may include integrated memory and I/O control logic ("CL") 2772 and 2782, respectively. Thus, the CL 2772, 2782 include integrated memory controller units and include I/O control logic. FIG. 28 illustrates that not only are the memories 2732, 2734 coupled to the CL 2772, 2782, but also that I/O devices 2814 are also coupled to the control logic 2772, 2782. Legacy I/O devices 2815 are coupled to the chipset 2790.

Figure 29:
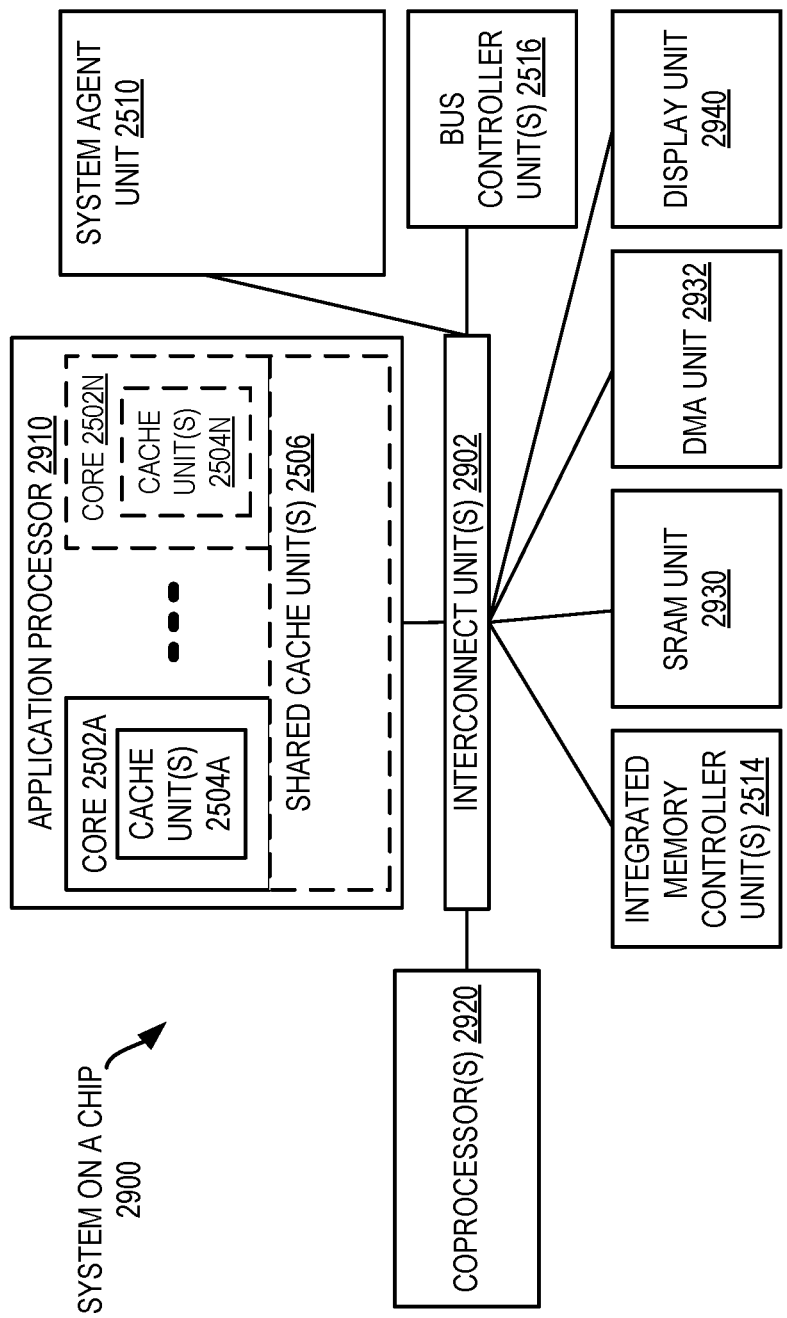
FIG. 29, shown is a block diagram of a system on a chip (SoC) in accordance with an embodiment of the present disclosure.

Referring now to FIG. 29, shown is a block diagram of a SoC 2900 in accordance with an embodiment of the present disclosure. Similar elements in FIG. 25 bear like reference numerals. Also, dashed lined boxes are optional features on more advanced SoCs. In FIG. 29, an interconnect unit(s) 2902 is coupled to: an application processor 2910 which includes a set of one or more cores 202A-N and shared cache unit(s) 2506; a system agent unit 2510; a bus controller unit(s) 2516; an integrated memory controller unit(s) 2514; a set or one or more coprocessors 2920 which may include integrated graphics logic, an image processor, an audio processor, and a video processor; an static random access memory (SRAM) unit 2930; a direct memory access (DMA) unit 2932; and a display unit 2940 for coupling to one or more external displays. In one embodiment, the coprocessor(s) 2920 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2730 illustrated in FIG. 27, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 30:
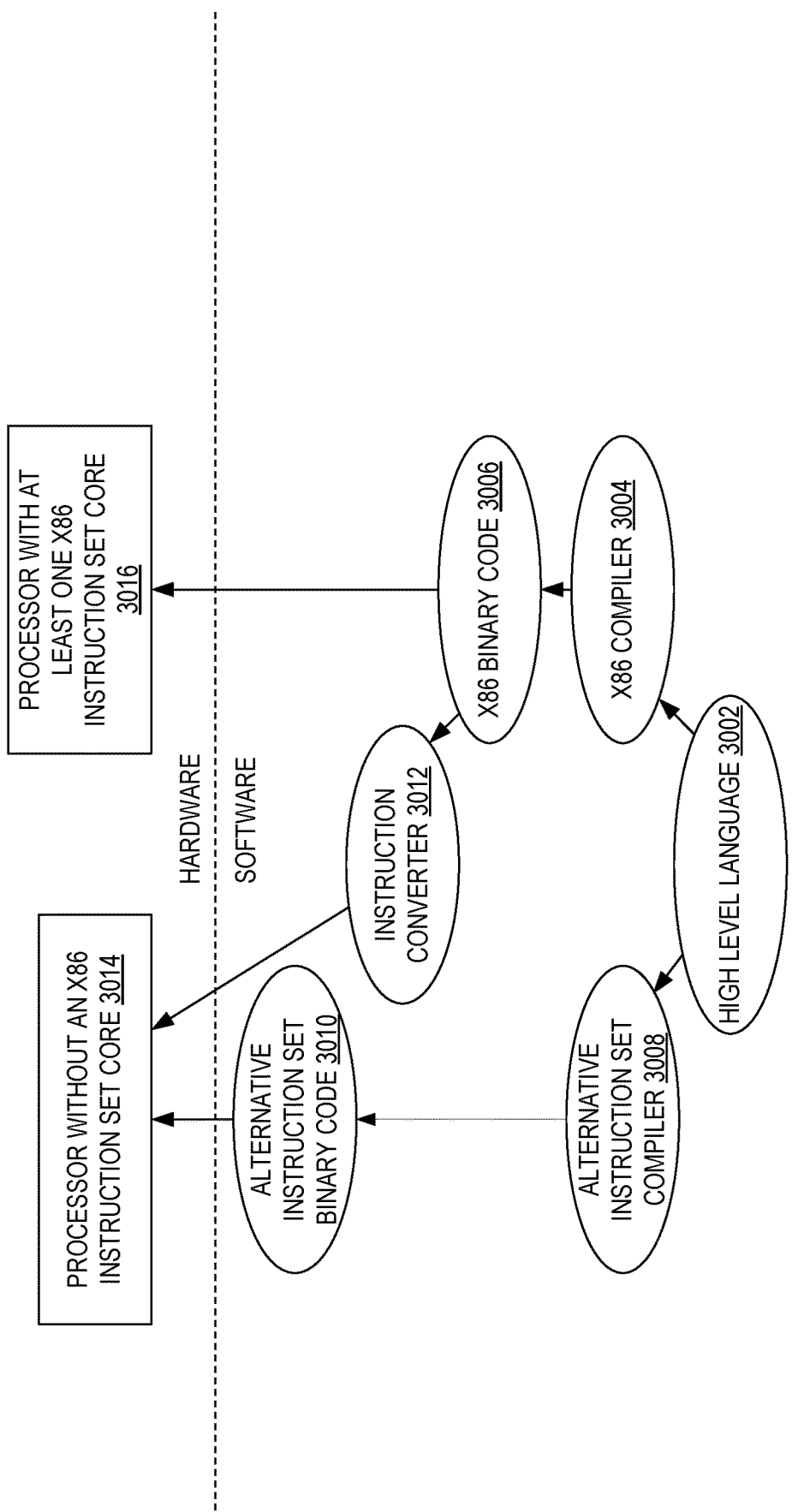
FIG. 30 is a block diagram contrasting the use of a software instruction converter to convert binary instructions in a source instruction set to binary instructions in a target instruction set according to embodiments of the disclosure.

FIG. 30 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 30 shows a program in a high level language 3002 may be compiled using an x86 compiler 3004 to generate x86 binary code 3006 that may be natively executed by a processor with at least one x86 instruction set core 3016. The processor with at least one x86 instruction set core 3016 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 3004 represents a compiler that is operable to generate x86 binary code 3006 (e.g., object code) that can, with or without additional linkage processing, be executed on the processor with at least one x86 instruction set core 3016. Similarly, FIG. 30 shows the program in the high level language 3002 may be compiled using an alternative instruction set compiler 3008 to generate alternative instruction set binary code 3010 that may be natively executed by a processor without at least one x86 instruction set core 3014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3012 is used to convert the x86 binary code 3006 into code that may be natively executed by the processor without an x86 instruction set core 3014. This converted code is not likely to be the same as the alternative instruction set binary code 3010 because an instruction converter capable of this is difficult to make; however, the converted code will accomplish the general operation and be made up of instructions from the alternative instruction set. Thus, the instruction converter 3012 represents software, firmware, hardware, or a combination thereof that, through emulation, simulation or any other process, allows a processor or other electronic device that does not have an x86 instruction set processor or core to execute the x86 binary code 3006.

What is claimed is:

1. A hardware processor comprising:
a compartment manager to:
determine, when a compartment control register of a processor core is set to an enable value, that a first subset of code requested for execution on the processor core in user privilege is within a first compartment of memory,
load a first compartment descriptor for the first compartment into one or more registers of the processor core from the memory, and
check if the first compartment is marked in the first compartment descriptor, within the one or more registers of the processor core, as a management compartment;
a decoder, for a request from the first compartment marked as the management compartment, to decode a first instruction into a decoded first instruction; and
an execution circuit to execute the decoded first instruction to load a second compartment descriptor for a second compartment of the memory from a location specified by a pointer in a compartment pointer register into the one or more registers of the processor core and set a compartment mode register of the processor core to an inside mode that causes a switch of execution from the first subset of code within the first compartment to a second subset of code in user privilege within the second compartment, allows speculative memory accesses for the second subset of code only within the second compartment, and prevents a memory access outside of the second compartment for the second subset of code as indicated by the second compartment descriptor stored within the one or more registers of the processor core.

2. The hardware processor of claim 1, wherein the switch of execution from the first subset of code in user privilege to the second subset of code in user privilege is without switching the processor core to supervisor privilege.

3. The hardware processor of claim 1, wherein the decoder is to decode a second instruction into a decoded second instruction and the execution circuit is to execute the decoded second instruction to set the compartment mode register of the processor core to an outside mode that causes the processor core to prevent memory accesses within the second compartment of the memory.

4. The hardware processor of claim 3, wherein the execution circuit is to execute the decoded second instruction to store the second compartment descriptor from the compartment pointer register of the processor core into the memory.

5. The hardware processor of claim 1, wherein the decoder is to decode a second instruction into a decoded second instruction and the execution circuit is to execute the decoded second instruction to store the second compartment descriptor from the compartment pointer register of the processor core into the memory without altering any value in the compartment mode register.

6. The hardware processor of claim 1, wherein, for a request from the second compartment, the decoder is to decode a second instruction into a decoded second instruction and the execution circuit is to execute the decoded second instruction to remove the second compartment descriptor from the one or more registers of the processor core and set the compartment mode register of the processor core to an outside mode that causes the processor core to prevent memory accesses within the second compartment of the memory.

7. The hardware processor of claim 1, wherein, for the request from the first compartment marked as the management compartment, the execution circuit is to execute the decoded first instruction to set the compartment mode register of the processor core to the inside mode that causes the processor core to only allow memory accesses within the second compartment of the memory and to memory that is not marked as a compartment.

8. The hardware processor of claim 1, wherein the decoder is to decode a second instruction into a decoded second instruction and the execution circuit is to execute the decoded second instruction to remove the second compartment from the memory.

9. A method comprising:
   determining, when a compartment control register of a processor core is set to an enable value, that a first subset of code requested for execution on the processor core in user privilege is within a first compartment of memory;
   loading a first compartment descriptor for the first compartment into one or more registers of the processor core from the memory;
   checking if the first compartment is marked in the first compartment descriptor, within the one or more registers of the processor core, as a management compartment;
   decoding, by a decoder of the processor core in response to the first compartment being marked in the first compartment descriptor as the management compartment for a request from the first compartment, a first instruction into a decoded first instruction; and
   executing, by an execution circuit of the processor core, the decoded first instruction to load a second compartment descriptor for a second compartment of the memory from a location specified by a pointer in a compartment pointer register into the one or more registers of the processor core and set a compartment mode register of the processor core to an inside mode that causes a switch of execution from the first subset of code within the first compartment to a second subset of code in user privilege within the second compartment, allows speculative memory accesses for the second subset of code only within the second compartment, and prevents a memory access outside of the second compartment for the second subset of code as indicated by the second compartment descriptor stored within the one or more registers of the processor core.

10. The method of claim 9, wherein the switch of execution from the first subset of code in user privilege to the second subset of code in user privilege is without switching the processor core to supervisor privilege.

11. The method of claim 9, further comprising:
   decoding, by the decoder, a second instruction into a decoded second instruction; and
   executing, by the execution circuit, the decoded second instruction to set the compartment mode register of the processor core to an outside mode that causes the processor core to prevent memory accesses within the second compartment of the memory.

12. The method of claim 11, wherein the executing the decoded second instruction stores the second compartment descriptor from the compartment pointer register of the processor core into the memory.

13. The method of claim 9, further comprising:
   decoding, by the decoder, a second instruction into a decoded second instruction; and
   executing, by the execution circuit, the decoded second instruction to store the second compartment descriptor from the compartment pointer register of the processor core into the memory without altering any value in the compartment mode register.

14. The method of claim 9, further comprising, for a request from the second compartment:
   decoding, by the decoder, a second instruction into a decoded second instruction; and
   executing, by the execution circuit, the decoded second instruction to remove the second compartment descriptor from the one or more registers of the processor core and set the compartment mode register of the processor core to an outside mode that causes the processor core to prevent memory accesses within the second compartment of the memory.

15. The method of claim 9, wherein, for the request from the first compartment marked as the management compartment, the executing the decoded first instruction sets the compartment mode register of the processor core to the inside mode that causes the processor core to only allow memory accesses within the second compartment of the memory and to memory that is not marked as a compartment.

16. The method of claim 9, further comprising:
   decoding, by the decoder, a second instruction into a decoded second instruction; and
   executing, by the execution circuit, the decoded second instruction to remove the second compartment from the memory.

17. A non-transitory machine readable medium that stores program code that when executed by a machine causes the machine to perform a method comprising:
   determining, when a compartment control register of a processor core is set to an enable value, that a first subset of code requested for execution on the processor core in user privilege is within a first compartment of memory;
   loading a first compartment descriptor for the first compartment into one or more registers of the processor core from the memory;
   checking if the first compartment is marked in the first compartment descriptor, within the one or more registers of the processor core, as a management compartment;
   decoding, by a decoder of the processor core in response to the first compartment being marked in the first compartment descriptor as the management compartment for a request from the first compartment, a first instruction into a decoded first instruction; and
   executing, by an execution circuit of the processor core, the decoded first instruction to load a second compartment descriptor for a second compartment of the memory from a location specified by a pointer in a compartment pointer register into the one or more registers of the processor core and set a compartment mode register of the processor core to an inside mode that causes a switch of execution from the first subset of code within the first compartment to a second subset of code in user privilege within the second compartment, allows speculative memory accesses for the second subset of code only within the second compartment, and prevents a memory access outside of the second compartment for the second subset of code as indicated by the second compartment descriptor stored within the one or more registers of the processor core.

18. The non-transitory machine readable medium of claim 17, wherein the switch of execution from the first subset of code in user privilege to the second subset of code in user privilege is without switching the processor core to supervisor privilege.

19. The non-transitory machine readable medium of claim 17, wherein the method further comprises:
   decoding, by the decoder, a second instruction into a decoded second instruction; and
   executing, by the execution circuit, the decoded second instruction to set the compartment mode register of the processor core to an outside mode that causes the processor core to prevent memory accesses within the second compartment of the memory.

20. The non-transitory machine readable medium of claim 19, wherein the executing the decoded second instruction stores the second compartment descriptor from the compartment pointer register of the processor core into the memory.

21. The non-transitory machine readable medium of claim 17, wherein the method further comprises:
    decoding, by the decoder, a second instruction into a decoded second instruction; and
    executing, by the execution circuit, the decoded second instruction to store the second compartment descriptor from the compartment pointer register of the processor core into the memory without altering any value in the compartment mode register.

22. The non-transitory machine readable medium of claim 17, wherein the method further comprises, for a request from the second compartment:
    decoding, by the decoder, a second instruction into a decoded second instruction; and
    executing, by the execution circuit, the decoded second instruction to remove the second compartment descriptor from the one or more registers of the processor core and set the compartment mode register of the processor core to an outside mode that causes the processor core to prevent memory accesses within the second compartment of the memory.

23. The non-transitory machine readable medium of claim 17, wherein, for the request from the first compartment marked as the management compartment, the executing the decoded first instruction sets the compartment mode register of the processor core to the inside mode that causes the processor core to only allow memory accesses within the second compartment of the memory and to memory that is not marked as a compartment.

24. The non-transitory machine readable medium of claim 17, wherein the method further comprises:
    decoding, by the decoder, a second instruction into a decoded second instruction; and
    executing, by the execution circuit, the decoded second instruction to remove the second compartment from the memory.

* * * * *